(12) United States Patent
Kim et al.

(10) Patent No.: US 9,113,053 B2
(45) Date of Patent: Aug. 18, 2015

(54) INPUT APPARATUS AND METHOD FOR ACQUIRING A SCAN IMAGE

(71) Applicant: LG ELECTRONICS INC., Seoul (KR)

(72) Inventors: Minwoo Kim, Seoul (KR); Jungyong Lee, Seoul (KR); Hyunsu Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 33 days.

(21) Appl. No.: 13/829,267

(22) Filed: Mar. 14, 2013

(65) Prior Publication Data

US 2014/0043658 A1    Feb. 13, 2014

(30) Foreign Application Priority Data

Aug. 10, 2012   (KR) .................. 10-2012-0087664
Aug. 27, 2012   (KR) .................. 10-2012-0093519
Sep. 21, 2012   (KR) .................. 10-2012-0105073

(51) Int. Cl.
| H04N 1/387 | (2006.01) |
| H04N 1/203 | (2006.01) |
| H04N 1/04 | (2006.01) |
| H04N 1/047 | (2006.01) |
| H04N 1/107 | (2006.01) |
| H04N 1/00 | (2006.01) |

(52) U.S. Cl.
CPC ......... *H04N 1/2036* (2013.01); *H04N 1/00702* (2013.01); *H04N 1/047* (2013.01); *H04N 1/0408* (2013.01); *H04N 1/0443* (2013.01); *H04N 1/0455* (2013.01); *H04N 1/107* (2013.01); *H04N 1/3876* (2013.01); *H04N 2201/04713* (2013.01); *H04N 2201/04737* (2013.01); *H04N 2201/04743* (2013.01)

(58) Field of Classification Search
None
See application file for complete search history.

(56) References Cited

U.S. PATENT DOCUMENTS

| 5,854,637 | A | 12/1998 | Sturges |
| 6,044,408 | A | 3/2000 | Engstrom et al. |
| 6,118,553 | A * | 9/2000 | Berg ............................ 358/473 |
| 7,489,298 | B2 * | 2/2009 | Liberty et al. ................ 345/158 |
| 8,046,804 | B2 * | 10/2011 | Kelts .............................. 725/61 |
| 8,441,696 | B2 * | 5/2013 | Zahnert et al. ............... 358/473 |
| 8,488,901 | B2 | 7/2013 | Berestov et al. |
| 8,681,636 | B2 * | 3/2014 | Parizy et al. .................. 370/241 |
| 2002/0093505 | A1 | 7/2002 | Hill et al. |
| 2003/0012560 | A1 | 1/2003 | Mori et al. |
| 2005/0231514 | A1 | 10/2005 | Harper et al. |
| 2006/0290703 | A1 | 12/2006 | White et al. |
| 2007/0002053 | A1 | 1/2007 | Hill et al. |
| 2007/0276184 | A1 | 11/2007 | Okawa |
| 2009/0004948 | A1 | 1/2009 | Ando et al. |
| 2009/0087016 | A1 | 4/2009 | Berestov et al. |

(Continued)

FOREIGN PATENT DOCUMENTS

| EP | 1601189 A2 | 11/2005 |
| JP | 3-6748 U | 11/1991 |

(Continued)

*Primary Examiner* — Steven Kau
(74) *Attorney, Agent, or Firm* — Birch, Stewart, Kolasch & Birch, LLP

(57) ABSTRACT

An input apparatus having a scan function according to the disclosure includes a position detecting unit to acquire position information of each unit image of a scan target object; a unit image acquiring unit to acquire each unit image by using the position information of each unit image; and an object image acquiring unit to acquire an object image of the scan target object by merging the acquired unit images.

17 Claims, 43 Drawing Sheets

(56) References Cited

U.S. PATENT DOCUMENTS

2009/0322764 A1 12/2009 Saini et al.
2009/0323121 A1 12/2009 Valkenburg et al.
2010/0296129 A1 11/2010 Zahnert et al.
2011/0222096 A1* 9/2011 Natori ........................ 358/1.13
2011/0234815 A1 9/2011 Zahnert et al.
2012/0133742 A1 5/2012 Ertl
2013/0033640 A1* 2/2013 Lee ............................. 348/376

FOREIGN PATENT DOCUMENTS

| | | |
|---|---|---|
| JP | 6-303383 A | 10/1994 |
| JP | 9-312739 A | 12/1997 |
| JP | 2002-344705 A | 11/2002 |
| JP | 2003-32629 A | 1/2003 |
| JP | 2005-338352 A | 12/2005 |
| JP | 2007-313170 A | 12/2007 |
| JP | 2009-000158 A | 1/2009 |
| JP | 2010-541009 A | 12/2010 |

* cited by examiner

FIG.2
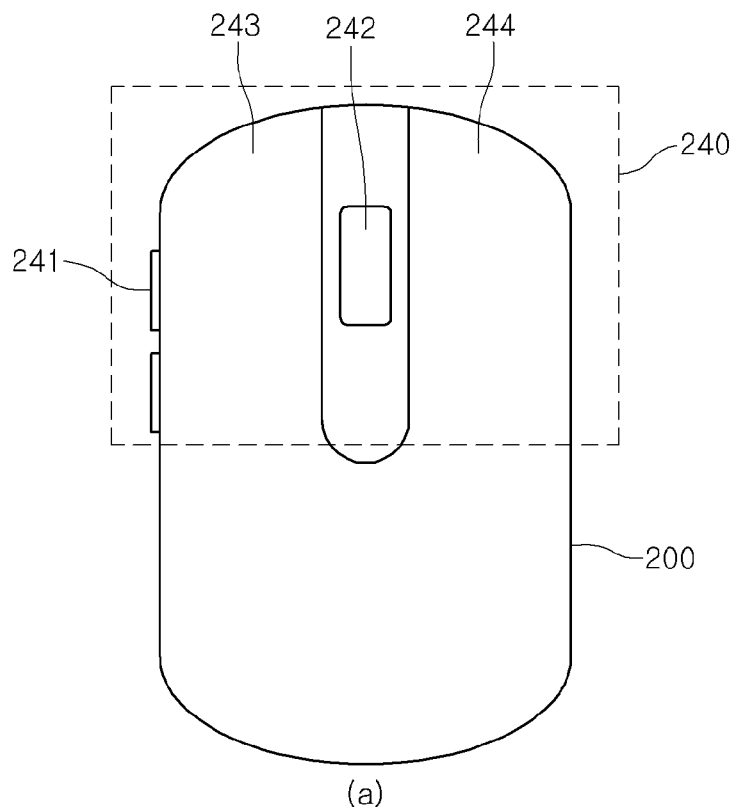
(a)
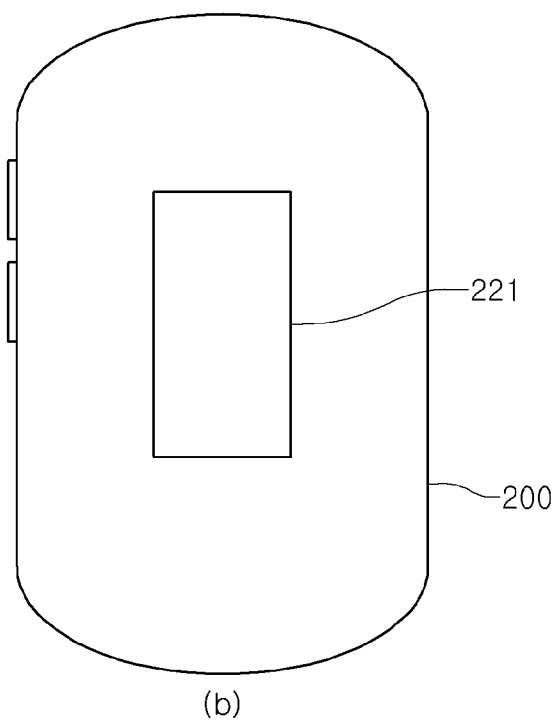
(b)

FIG.8
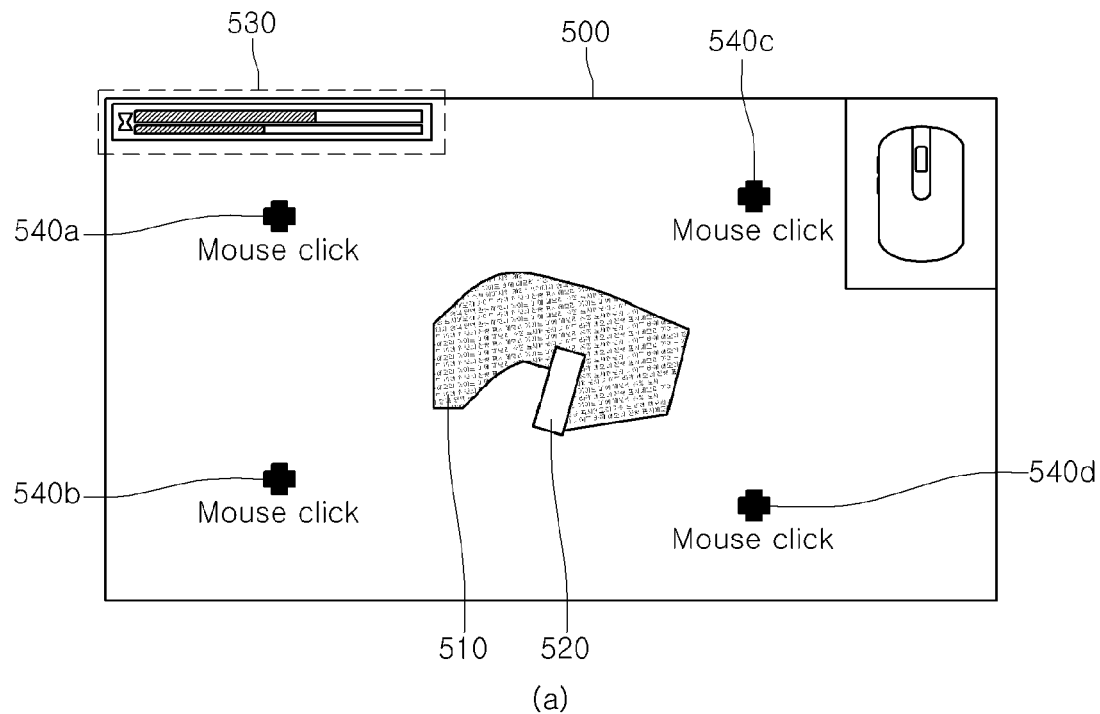
(a)
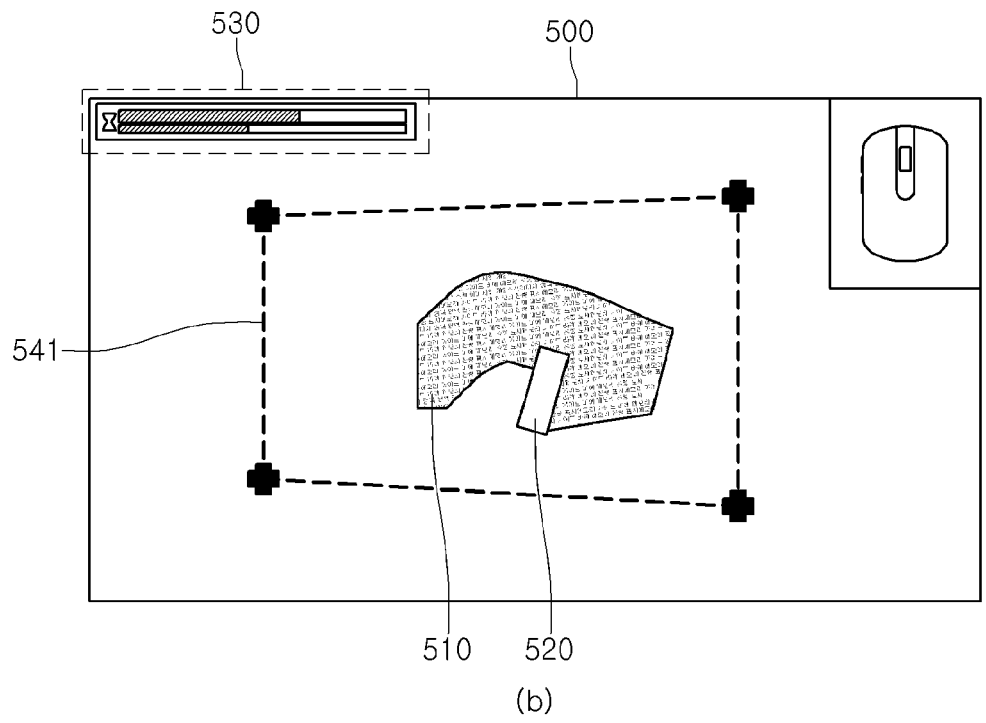
(b)

FIG.9
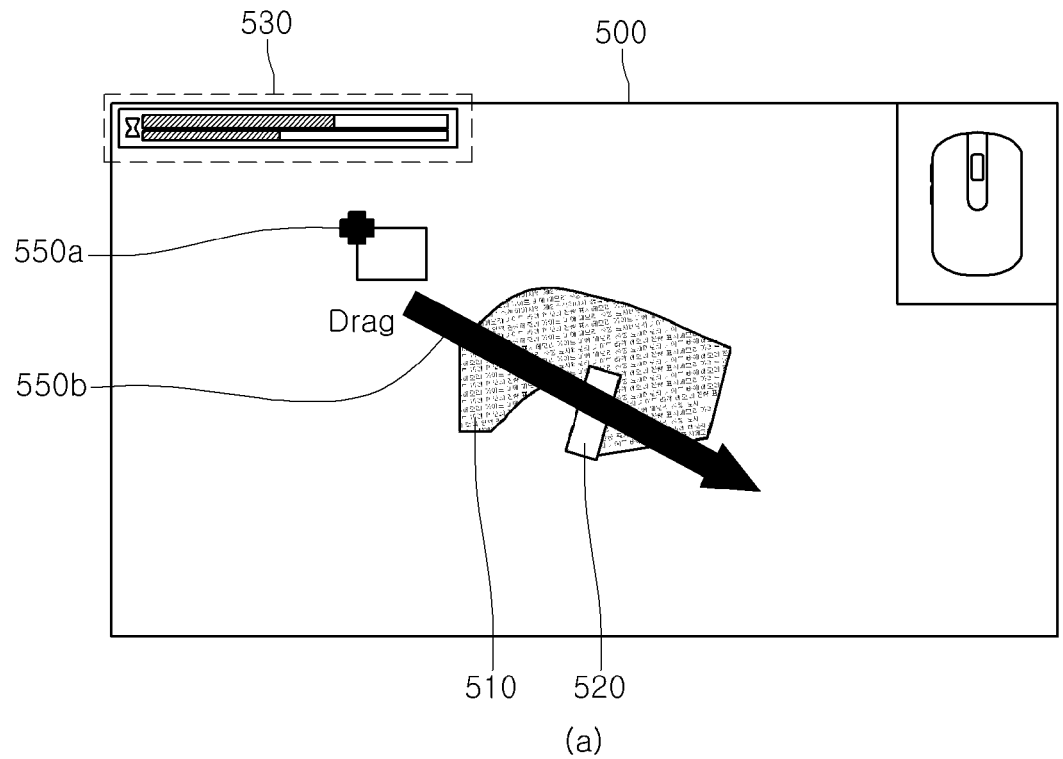
(a)
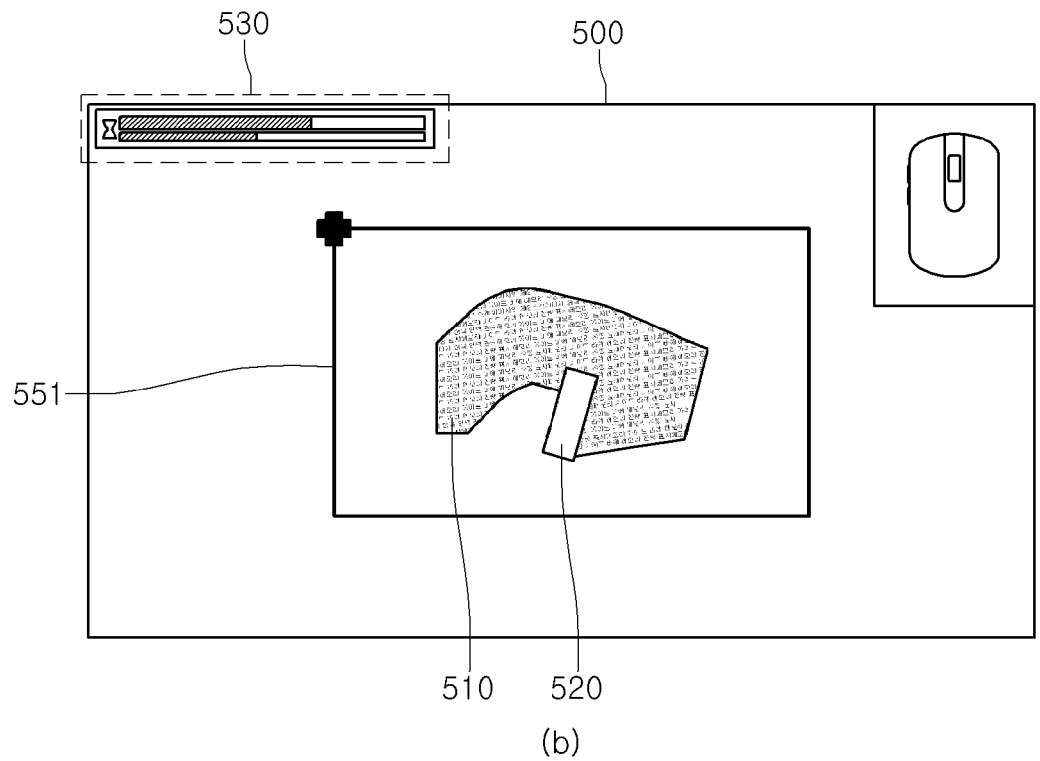
(b)

FIG.14
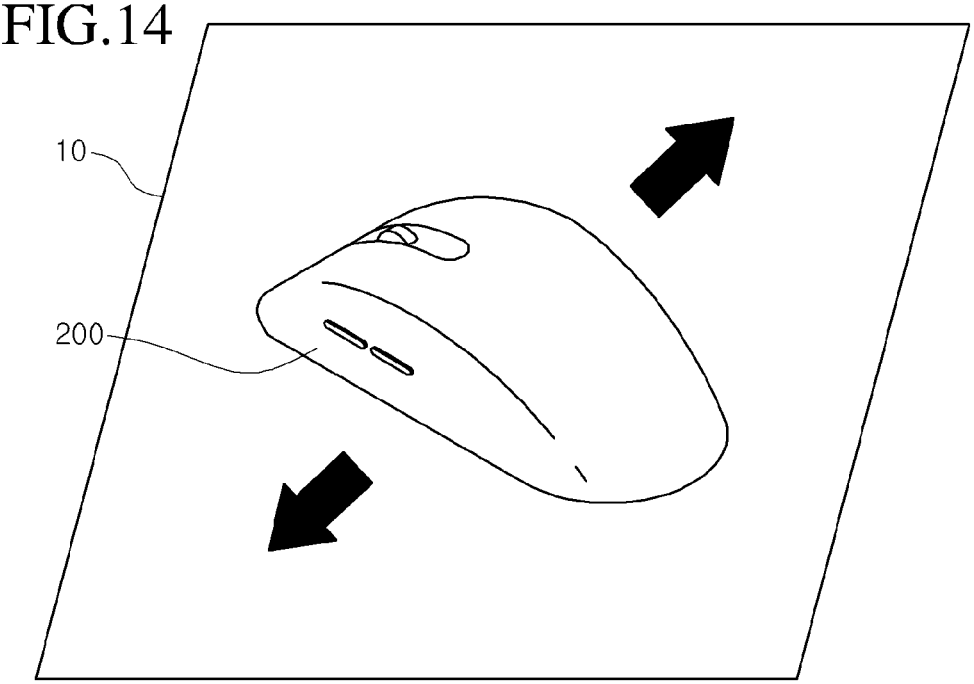
(a)
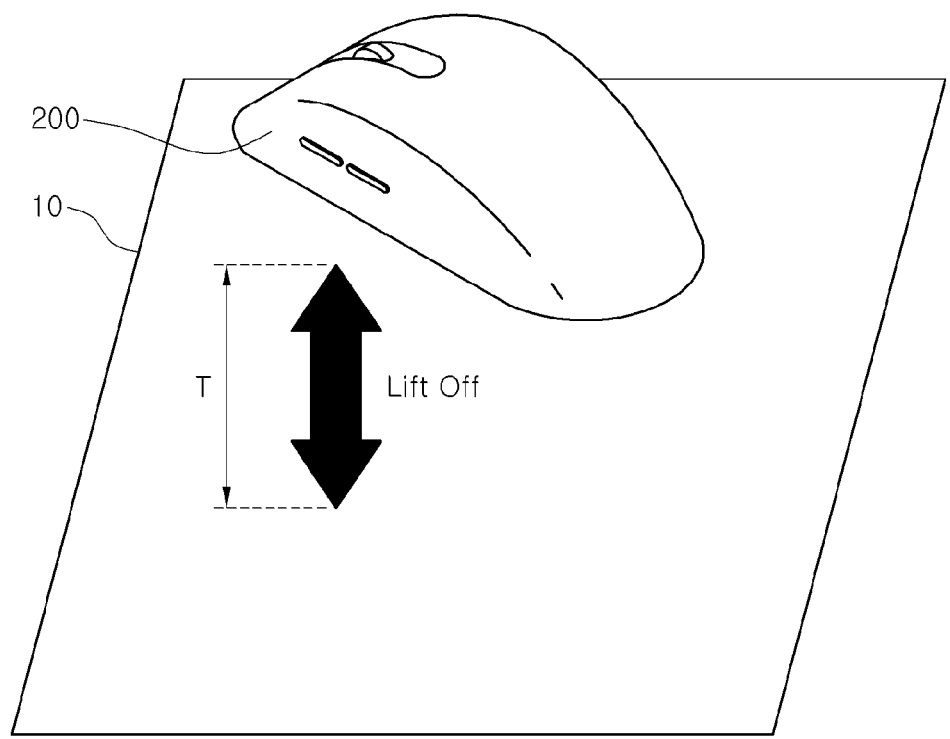
(b)

FIG.18
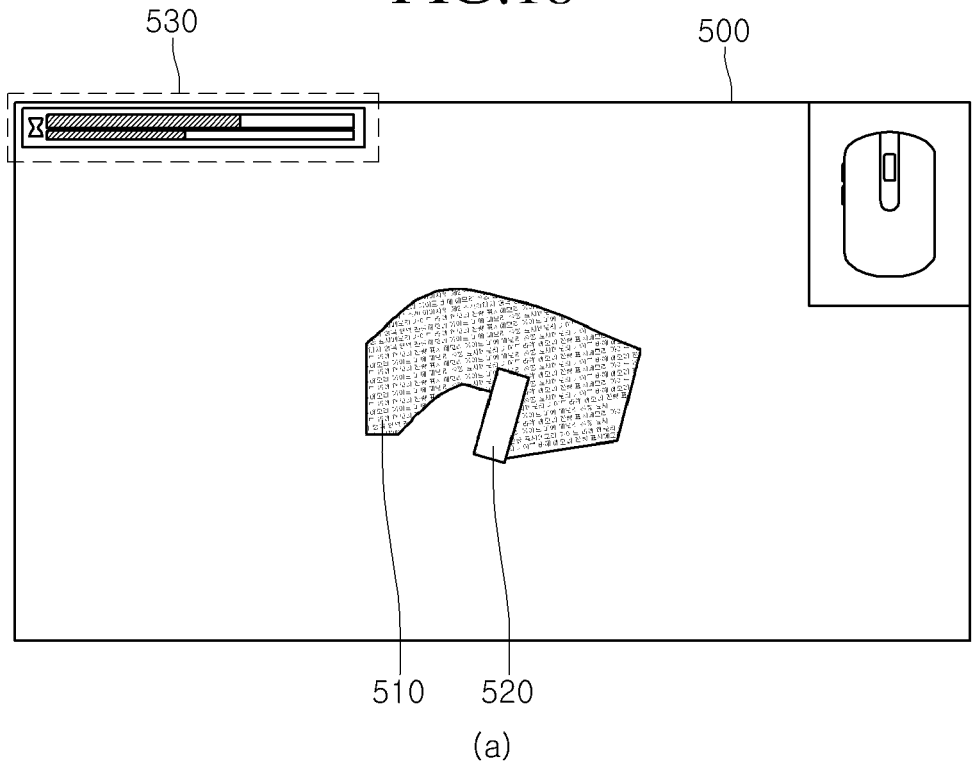
(a)
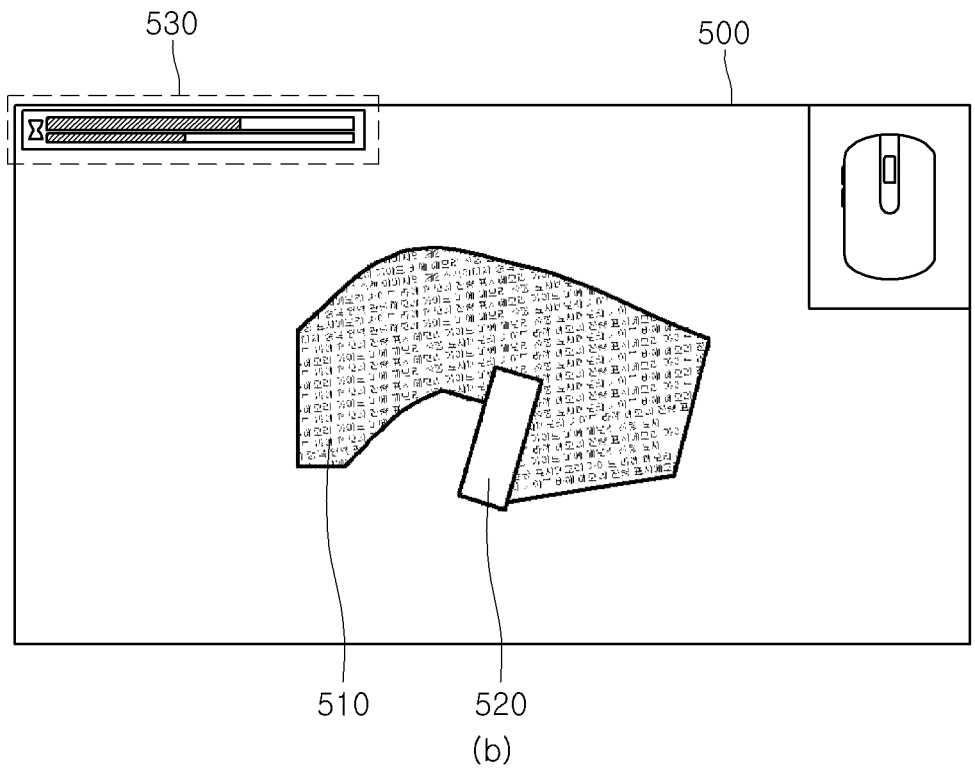
(b)

FIG.19
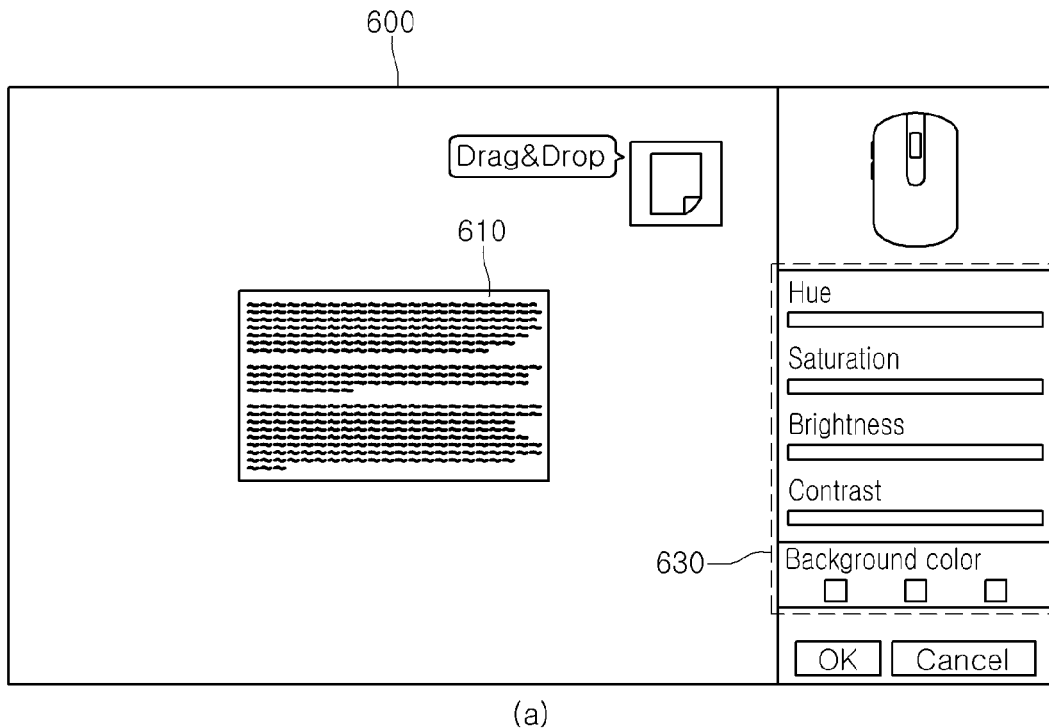
(a)
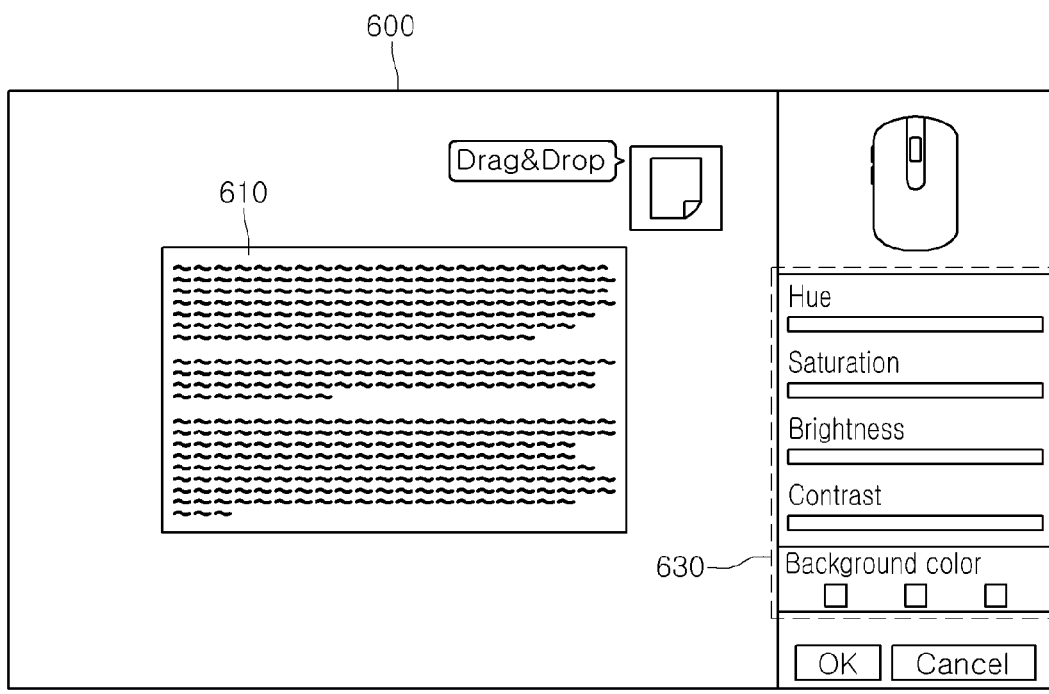
(b)

FIG.28
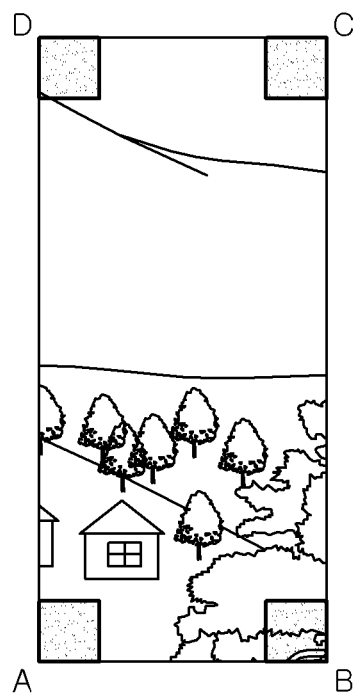
<BEFORE CORRECTION>
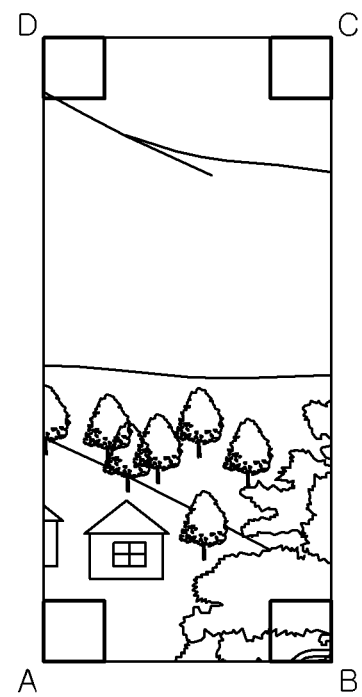
<AFTER CORRECTION>

FIG.38

```
FixedFrameRate=5;
MaxFrameRate=30;
FrameRate=FixedFrameRate;
while(Scan mode()){
   Buffer(X_j,Y_j)=InputImage(x,y);
   if(Buffer(X_j,Y_j) == InputImage(x,y)){
       NotSaveAsChangedImage(ROI);     }
   for(;;){
   Case (S(InputImage(x,y)++):
      then Z++;
   Case (S(InputeImage(x,y)--);
      DPI=EstimateDPI(CurrentFrame,Previous
      ReconstructedDPI);
      if(DPI>CorrectDPI)
             FrameRate=FrameRate/2;
      else if(DPI==CorrectDPI)
             FrameRate=FixedFrameRate();
      else if(DPI<CorrectDPI)
             FrameRate=FrameRate+1;
      if(FrameRate<FixedFrameRate)
             FrameRate=FixedFrameRate();
      else if(FrameRate>MaxFrameRate)
             FramteRate=MaxFramteRate;
}
```

FIG.43

| GRAPHIC MEMORY | | GRAPHIC MEMORY |
|---|---|---|
| EMBEDDED TYPE | EXTERNAL TYPE | openGL V1.4 |
| 384M | 128M | |

FIG.44

| Use ratio of graphic control unit | Use ratio of graphic memory | Use ratio of central processing unit | Rendering scheme |
|---|---|---|---|
| 20% | 30% | 10% | Hardware rendering |
| 40% | 30% | 20% | Hardware rendering |
| 40% | 60% | 30% | Hardware rendering |
| 50% | 60% | 30% | Software rendering |
| 50% | 60% | 80% | Hardware rendering |

INPUT APPARATUS AND METHOD FOR ACQUIRING A SCAN IMAGE

CROSS REFERENCE TO RELATED APPLICATION

This application claims the benefit of Korean Patent Application No. 10-2012-0087664, filed on Aug. 10, 2012 entitled "INPUT DEVICE AND SCAN IMAGE ACQUIRING METHOD THERE OF" and Korean Patent Application No. 10-2012-0093519, filed on Aug. 27, 2012 entitled "INPUT DEVICE AND CONTROLLING METHOD THERE OF" and Korean Patent Application No. 10-2012-0105073, filed on Sep. 21, 2012 entitled "INPUT DEVICE AND CONTROLLING METHOD THERE OF", which are all hereby incorporated by reference in its entirety into this application.

BACKGROUND

The present disclosure relates to an input apparatus and a control method thereof. More particularly, the present disclosure relates to an input apparatus and a control method thereof, capable of acquiring images of scan target objects by selectively applying rendering schemes according to the specification of a terminal connected to the input apparatus, the use state of the input apparatus and the use state of the terminal.

In general, a multifunction apparatus having a scan function reads document data from a page of a document to be scanned, prints the read document data or transmits the read document data to the outside by using a communication apparatus such as a modem. Therefore, the multifunction apparatus in the related art having the scan function is insufficient for scanning documents having a predetermined scan size. Further, since the multifunction apparatus in the related art having the scan function may have limited mobility, an object to be scanned should be moved to the multifunction apparatus that is fixedly installed in order to scan simple images such as a business card photograph, and the like.

Meanwhile, as the digital technologies have been developed, various input apparatuses, such as a mouse, have been equipped with various additional functions so that consumers can fulfill various works by utilizing the additional functions.

However, in the input apparatus having the scan function according to the related art, two laser sensors must be disposed at a predetermined interval, so there is size limitation when designing the input apparatus.

In addition, it may happen that the laser sensors cannot accurately scan the document data so the scan images may not accurately acquired.

Further, the input apparatus having the scan function according to the related art constantly maintains the frame rate regardless of the movement velocity or the resolution of the scanned image, so memories are unnecessarily wasted.

In addition, the input apparatus having the scan function according to the related art scans the images only through a graphic card of a terminal connected to the input apparatus so there are limitations in scan rate and scan range.

SUMMARY

The present disclosure provides a method of accurately detecting position information of a frame even if a laser sensor cannot accurately detect the position information of the frame.

The present disclosure provides a method of overcoming a structural limitation of an input apparatus by using a laser sensor and a gyro sensor.

The present disclosure provides a method of adjusting a frame rate based on an angular velocity of an input apparatus measured by using a gyro sensor.

The present disclosure provides a method of stably acquiring an image of a scan target object by selectively applying a rendering scheme according to the specification of a terminal connected to an input apparatus.

The present disclosure provides a method of improving an image merging speed of a scan target object and widening a scan range by selectively applying a rendering scheme according to the use state of an input apparatus and the use state of a terminal connected to the input apparatus.

An input apparatus having a scan function according to the disclosure includes a position detecting unit to acquire position information of each unit image of a scan target object; a unit image acquiring unit to acquire each unit image by using the position information of each unit image; and an object image acquiring unit to acquire an object image of the scan target object by merging the acquired unit images According to the present disclosure, position information of a frame can be accurately detected even if a laser sensor cannot accurately detect the position information of the frame.

According to the present disclosure, a structural limitation of an input apparatus can be overcome by using a laser sensor and a gyro sensor.

According to the present disclosure, a frame rate can be adjusted based on an angular velocity of an input apparatus measured by using a gyro sensor so that memories can be effectively used.

According to the present disclosure, an image of a scan target object can be stably acquired by selectively applying a rendering scheme according to the specification of a terminal connected to an input apparatus.

According to the present disclosure, an image merging speed of a scan target object can be improved and a scan range can be widened by selectively applying a rendering scheme according to the use state of an input apparatus and the use state of a terminal connected to the input apparatus.

BRIEF DESCRIPTION OF THE DRAWINGS

FIG. 2 is a plan view and a bottom view of an example input apparatus having a scan function.

FIGS. 8 to 12 are diagrams showing a screen providing an example scan UI window displaying a preview scan area for acquiring a scan image.

FIG. 14 is a diagram showing an example state of an input apparatus when a lift-off signal is generated.

FIG. 18 is a diagram showing a screen providing an example scan UI window on which a scan image is displayed depending on a state change signal of an input apparatus.

FIG. 19 is a diagram showing a screen providing an example edition UI window on which an edition image is displayed depending on a state change signal of an input apparatus.

FIG. 28 is a view showing a change of a scan image before and after an example image correction method is applied.

FIG. 38 is a view to explain an algorithm code for implementing a method for controlling an example input apparatus.

FIG. 43 is a view to explain a reference specification of a graphic processing unit.

FIG. 44 is a view to explain a selection of a rendering scheme based on a use ratio of a graphic processing unit and a use ratio of a central processing unit according to an example method for controlling an input apparatus.

DETAILED DESCRIPTION OF THE EMBODIMENTS

Hereinafter, embodiments will be described with reference to accompanying drawings so that those having ordinary skill in the art can readily comprehend the embodiments.

Figure 1:
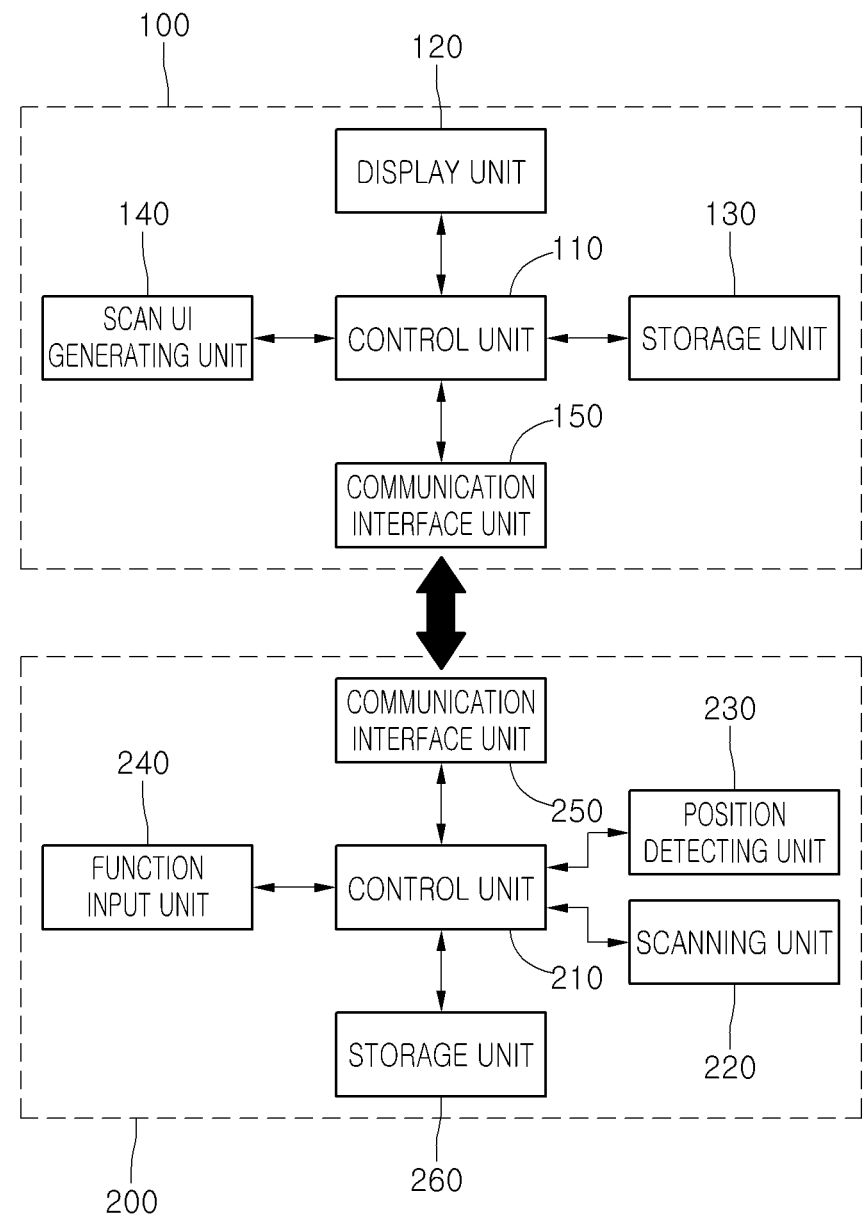
FIG. 1 is a diagram showing an example system.

FIG. 1 illustrates an example scan image forming system.

Referring to FIG. 1, the scan image forming system includes a display apparatus 100 and an input apparatus 200.

The display apparatus 100 may execute a scan driver program in a computer, a digital TV, a cellular phone, and the like and may be any type of apparatus having a display unit.

The display apparatus 100 includes a control unit 110, a display unit 120, a storage unit 130, a scan UI generating unit 140, and a communication interface unit 150.

The control unit 110 may control general operations in the display apparatus 100. For example, the control unit may control the communication interface unit 150 to receive various input signals inputted from the outside and various data transmitted from the outside and may control the communication interface unit 150 to process the various received input signals and received data and display the processed signals or data on the display unit 120 or store the processed signals or data in the storage unit 130.

The display unit 120 converts various image signals, data signals, onscreen display (OSD) signals, and the like processed by the control unit 110 into R, G, and B signals, respectively to generate driving signals.

To this end, the display unit 120 may adopt a plasma display panel (PDP), a liquid crystal display (LCD), an organic light emitting diode display (OLED), a flexible display, a three-dimensional (3D) display, and the like or is constituted by a touch screen to be used as an input apparatus in addition to an output apparatus.

In addition, the display unit 120 may display a scan UI window for displaying a scan image transmitted from the input apparatus 200 to be described below.

The storage unit 130 stores programs for processing and controlling the signals in the control unit 110 and may store an image, a sound, or a data signal which is signal-processed.

Further, the storage unit 130 may serve to temporarily store the image, sound, or data signal inputted from the communication interface unit 150.

In some implementations, the storage unit 130 may store a scan driver program for controlling the display apparatus to perform a scan operation.

The storage unit 130, for example, may include at least one type of storage medium of a flash memory type, a hard disk type, a multimedia card micro type, a card type memory (e.g., an SD or XD memory, or the like), a random access memory (RAM), and a read only memory ROM (EEPROM, or the like).

The scan UI generating unit 140 generates a scan UI window and an edition UI window for displaying an implementation state of the scan driver program on a screen. The generated scan UI window and the edition UI window are displayed on the screen through the display unit 120 and a user controls the scan operation of the input apparatus 200 through the scan UI window. Further, various scan control commands are generated by operating various function setting buttons provided on the scan UI window. In addition, various edition control commands are generated by operating various function setting buttons provided on the edition UI window.

The communication interface unit 150 performs wired/wireless communication with external apparatuses to receive various input signals and image, sound, or data signals from the external apparatuses.

When the communication interface unit 150 performs wired communication with the external apparatuses, the communication interface unit 150 may be constituted by a serial, a PS/2, a USB, and the like and when the communication interface unit 150 performs wireless communication with the external apparatuses, the communication interface unit 150 may be constituted by radio frequency identification (RFID), infrared data association (IrDA), ultra wideband (UWB), zigbee, digital living network alliance (DLNA), and the like.

The input apparatus 200 may be various input apparatuses having a scanner function, e.g., a mouse, a keyboard, a remote controller, and the like. Further, if the input apparatus 200 has the scanner function, the input apparatus 200 may be portable terminals such as the cellular phone, a personal media player (PMP), a personal digital assistant (PDA), and the like.

The input apparatus 200 includes a control unit 210, a scanning unit 220, a position detecting unit 230, a scan function inputting unit 240, a communication interface unit 250, and a storage unit 260.

The control unit 210 may control general operations in the input apparatus 200. For example, the control unit 210 may control a scan image of a scan target object acquired from the scanning unit 220 and positional data acquired from the position detecting unit 230 to be transmitted to external apparatuses through the communication interface unit 250 and may control the scan image and positional data to be stored in the storage unit 260.

Further, the control unit 210 may control signals associated with various functions inputted by the user through the function input unit 240 to be transmitted to the external apparatuses.

The scanning unit 220 serves to acquire scan images corresponding to the predetermined areas of the scan target object by radiating light to the predetermined areas of the scan target object at the same time and detecting light reflected therefrom.

The scan target object represents an object containing information which the user intends to input/store in the input apparatus 200 and may include a document in which characters, figures, and the like are displayed. Further, the predetermined area of the scan target object represents a two-dimensional (2D) area having a predetermined area unlike the existing line scan area.

That is, the scanning unit 220 radiates light to the scan target object and radiates light to the 2D area having the predetermined area at the same time. Some of the radiated light is reflected from the scan target object and inputted into the scanning unit 220. The scanning unit 220 generates scan information by detecting the reflected light. For example, the scanning unit 220 may generate the scan information of a digital type in which a part with the detected reflection light is designated as one and a part with no detected reflection light is designated as zero.

Since the scan information contains information on the light-radiated part, e.g., the 2D area having the predetermined area, the scan image corresponding to the predetermined area of the scan target object can be acquired by imaging some or all of the scan information.

The position detecting unit 230 detects positional movement on X and Y axes with movement of the input apparatus 200. The method of detecting the information on the positional information and the positional information will be described below in more detail. Reference position data is stored in the storage unit 260 by acquiring an X and Y coordinate for a predetermined point. Thereafter, when the input apparatus 200 moves, a step of acquiring an X and Y coordinate for a new point and comparing new positional data with the reference position data stored in the storage unit 260 is repeatedly performed to detect the positional movement of the input apparatus 200.

The detected information on the positional movement of the input apparatus 200 matches the scan image acquired through the scanning unit 220 to be transmitted to the display apparatus 200.

The function input unit 240 may include a scanner function selecting button, a wheel button, and left and right buttons around the wheel button.

When the user inputs the scanner function selecting button, the input apparatus 200 generates a scan start request signal for entering a scan mode and an edition request signal for switching the scan mode to an edition mode.

The wheel button and the left and right buttons generate signals corresponding to functions allocated to each of the scan mode and the edition mode.

The communication interface unit 250 performs wired/wireless communication with external apparatuses and may transmit or receive various input signals and image, sound, or data signals to or from the external apparatuses.

When the communication interface unit 250 performs wired communication with the external apparatuses, the communication interface unit 250 may be constituted by a serial, a PS/2, a USB, and the like and when the communication interface unit 250 performs wireless communication with the external apparatuses, the communication interface unit 250 may be constituted by radio frequency identification (RFID), infrared data association (IrDA), ultra wideband (UWB), zigbee, digital living network alliance (DLNA), and the like.

The storage unit 260 may store the scan image acquired from the scanning unit 220 and the positional data and the information on the positional information acquired from the position detecting unit 230.

The storage unit 260, for example, may include at least one type of storage medium of a flash memory type, a hard disk type, a multimedia card micro type, a card type memory (e.g., an SD or XD memory, or the like), a RAM, and a ROM (EEPROM, or the like).

In addition, although not shown in FIG. 1, the input apparatus 200 may include a display unit. In this case, the display unit may adopt a PDP, an LCD, an OLED, a flexible display, a 3D display, and the like or is constituted by a touch screen to be used as an input apparatus in addition to an output apparatus.

Further, the display unit (not shown) may display the scan image acquired from the scanning unit 220.

FIG. 2 illustrates an example input apparatus having a scan function.

Referring to FIG. 2A, a plan view of a mouse which is one of examples of the input apparatus 200 is shown. The function input unit 240 receiving a plurality of functions is included in a front surface of the mouse 200. The function input unit 240 includes a scanner function selecting button 241, a wheel button 242, and left and right buttons 243 and 244 around the wheel button.

Referring to FIG. 2B, a real scan area 221 for acquiring the scan image from the scan target object is included in a rear surface of the mouse 200. The scanning unit 220 radiates light to the scan target object through the real scan area 221 and some of the radiated light is reflected from the scan target object to be inputted into the scanning unit 220 again.

Figure 3:
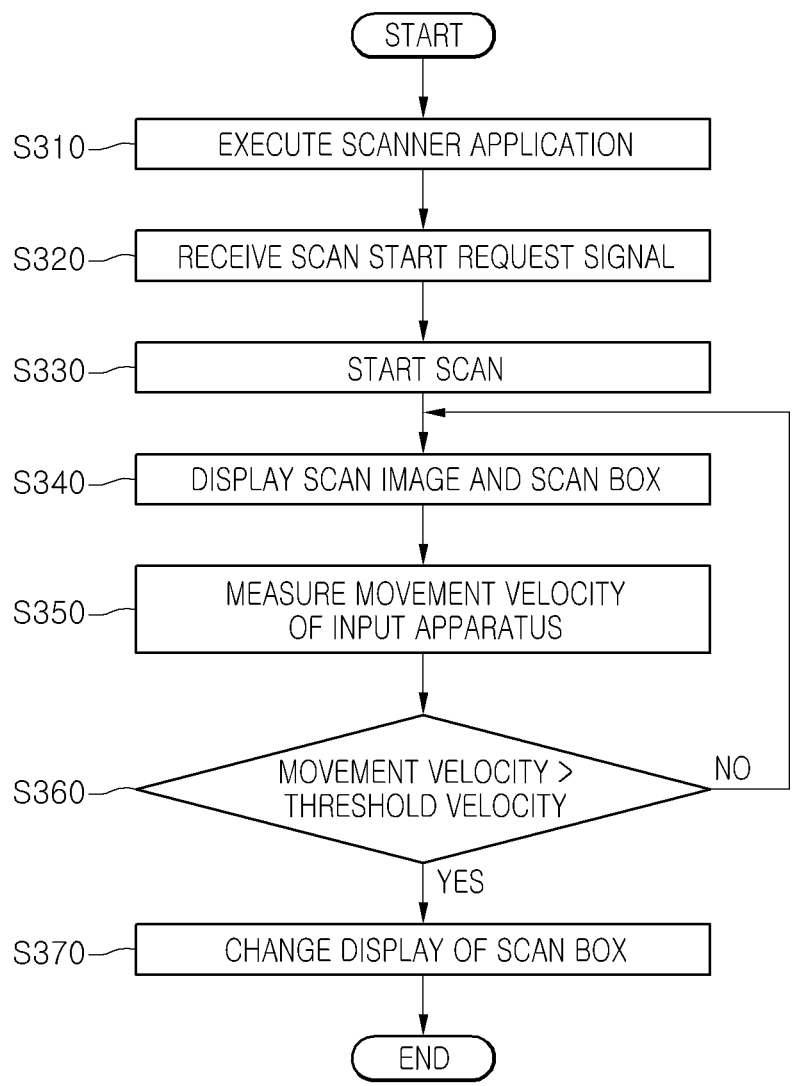
FIG. 3 is a flowchart showing an example method for displaying a scan image.
Figure 4:
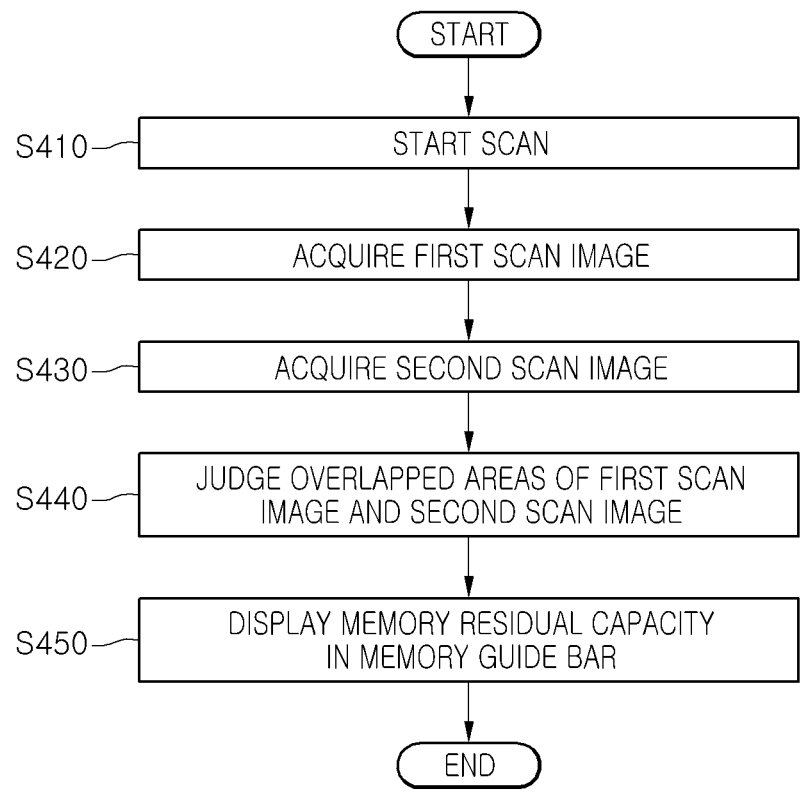
FIG. 4 is a flowchart showing another example method for displaying a scan image.
Figure 5:
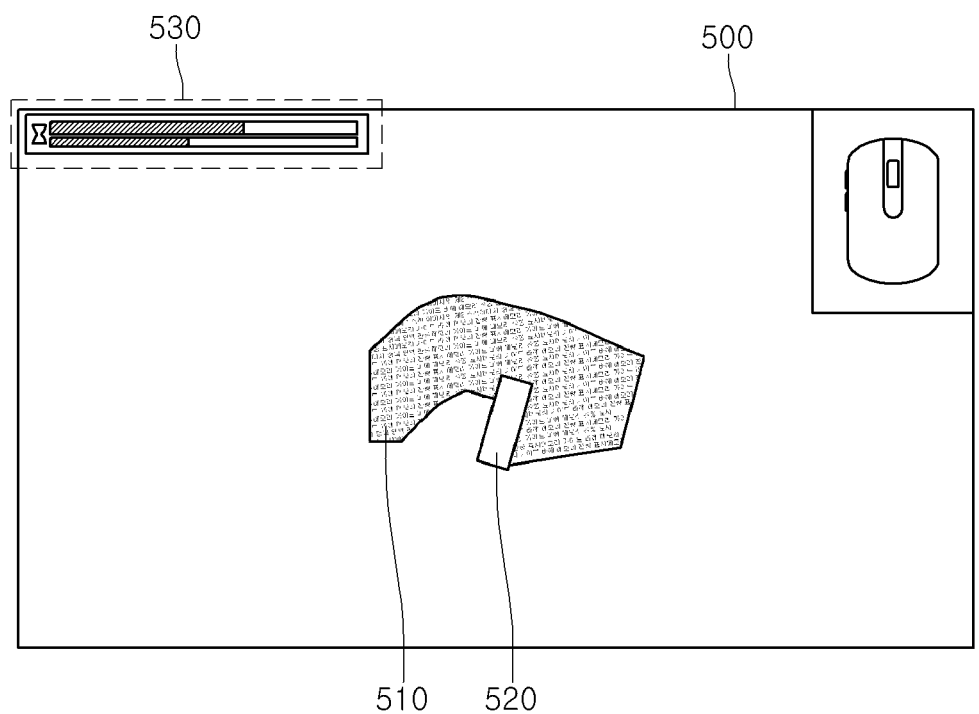
FIG. 5 is a diagram showing a screen providing an example scan user interface (UI) window on which a scan image is displayed.
Figure 6:
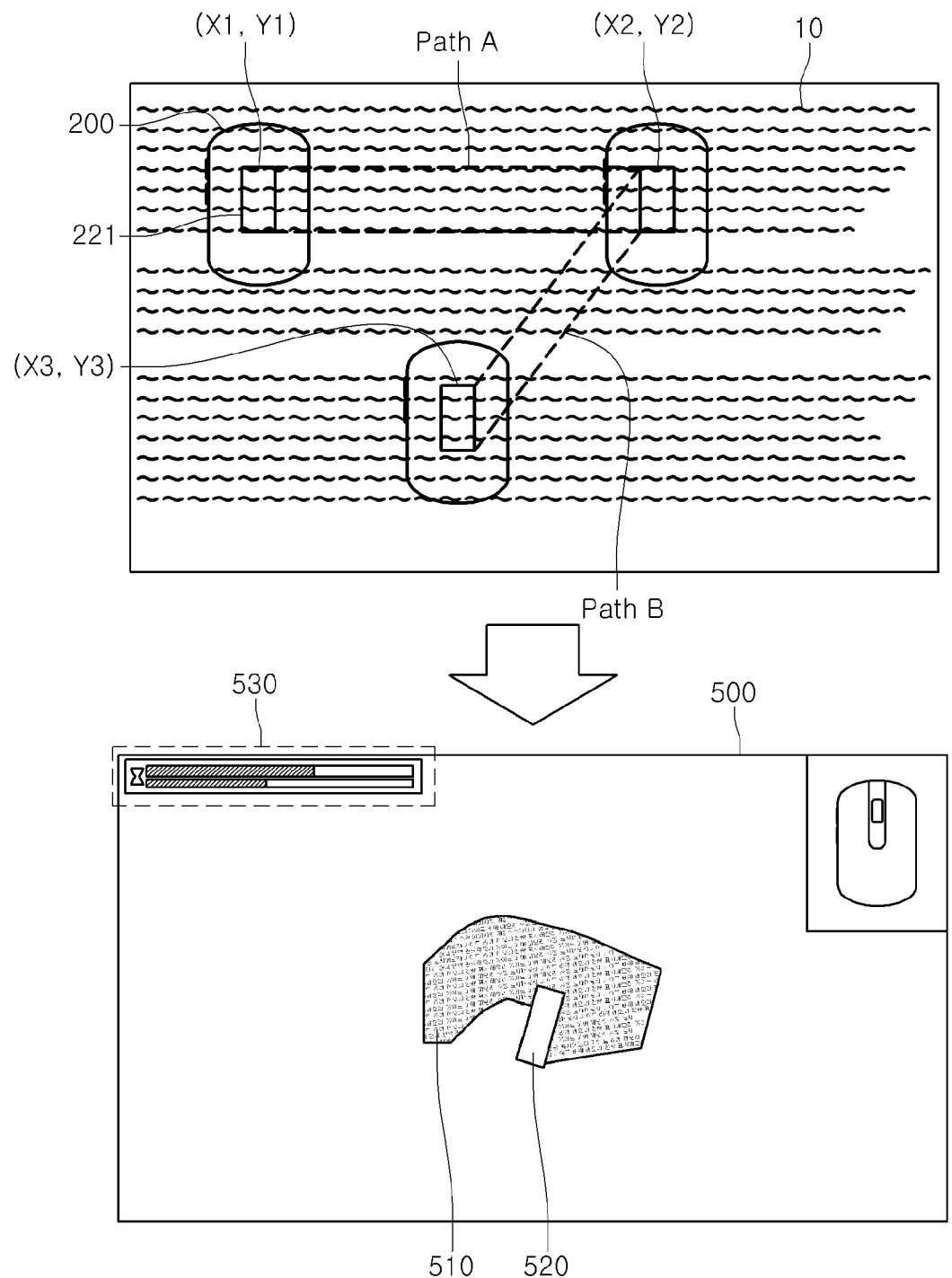
FIG. 6 is a diagram showing a screen providing an example scan UI window displaying a scan image and a memory guide bar.

Hereinafter, referring to FIGS. 3 to 6, an example method for displaying a scan image will be described below. FIG. 3 illustrates a first example method for displaying a scan image. FIG. 4 illustrates a second example method for displaying a scan image. FIG. 5 illustrates an example scan UI window on which the scan image is displayed. FIG. 6 shows a screen providing an example scan UI window displaying a scan image and a memory guide bar.

Referring to FIG. 3, the control unit 110 of the display apparatus 100 executes a scanner application (S310). An execution program of the scanner application may be stored in the storage unit 130 and the scan UI window where the scan image is displayed may be displayed by the execution of the scanner application.

Next, by inputting the scanner function selecting button 241 in the function input unit 240 of the input apparatus 200, the input apparatus 200 generates the scan start request signal and transmits the generated scan start request signal to the display apparatus 100. As a result, the transmitted scan start request signal is received through the communication interface unit 150 of the display apparatus 100 (S320).

The input apparatus 200 enters the scan mode according to the scan start request signal to start a scan for acquiring the scan image from the scan target object (S330).

Meanwhile, although the scan UI window is displayed by executing the scanner application in step S310, step S310 may be omitted and the scan UI window may be displayed by receiving the scan start request signal of step S320.

When the scan starts by entering the scan mode, a scan image 510 acquired and transmitted from the input apparatus 200 is displayed on the scan UI window 500 as shown in FIG. 5. Further, a scan box 520 corresponding to the real scan area 221 (shown in FIG. 2B) positioned on the rear surface of the input apparatus 200 is displayed on the scan UI window 500 (S340).

The scan image 510 is an image which the input apparatus acquires through the scanning unit 220 while moving from any one position to another position and the scan image 510 matches the positional data acquired through the position detecting unit 230 of the input apparatus 200 to be displayed on the scan UI window 500.

Meanwhile, on the scan UI window 500, a memory guide bar 530 displaying a residual capacity of the storage unit 260 of the input apparatus 200 is displayed. The memory guide bar 530 may display a memory residual capacity other than the capacity of the scan image to the total capacity of the input apparatus. The more scan images acquired through the scanning unit 220 of the input apparatus 200, the smaller the residual capacity of the storage unit 260 is displayed.

Meanwhile, the control unit 110 measures a movement velocity in the information on the positional movement of the input apparatus 200 transmitted from the input apparatus 200 (S350) and compares a threshold velocity previously stored in the storage unit 130 with the measured movement velocity of the input apparatus 200 (S360). Herein, the movement velocity represents the movement velocity of the input apparatus 200 and may be a movement velocity of the scan box 520 corresponding to the movement of the input apparatus 200.

As the comparison result, when the movement velocity is lower than the threshold velocity, the scan operation is continued without changing the scan box 520.

Meanwhile, as the comparison result, when the movement velocity is higher than the threshold velocity, the display of the scan box 520 is changed (S370). The display of the scan box 520 may be changed by changing a color of an outer line of the scan box 520 or changing the shape of the outer line of the scan box 520.

For example, if the color of the outer line of the scan box 520 displayed on the scan UI window 500 is a green color when the movement velocity is equal to or lower than the threshold velocity, the color of the outer line of the scan box 520 displayed on the scan UI window 500 may be displayed by changing the green color to a red color.

This is to reduce the likelihood of the scan image being abnormally acquired from the scan target object when the user excessively moves the input apparatus 200. Therefore, the user senses that the color of the outer line of the scan box 520 is changed and decreases the movement velocity of the input apparatus 200 to the threshold velocity or lower to normally acquire the scan image from the scan target object.

Meanwhile, a predetermined warning message may be displayed on the scan UI window 500 as well as the color or shape of the outer line of the scan box 520 is changed and displayed and the case in which the movement velocity of the input apparatus 200 is equal to or higher than the threshold velocity may be notified to the user by outputting a predetermined sound.

Referring to FIGS. 4 and 6, the memory guide bar 530 displayed on the scan UI window 500 will be described in more detail.

Referring to FIG. 4, after the scan mode starts (S410), the input apparatus 200 acquires a first scan image while moving from a first position (X1,Y1) to a second position (X2,Y2) on the scan target object 10 through a first path (path A), as shown in FIG. 6A (S420). Further, the input apparatus 200 acquires a scan image while moving from the second position (X2,Y2) to a third position (X3,Y3) on the scan target object 10 through a second path (path B) (S430).

It is judged whether an overlapped area is present between the first scan image acquired while moving on the first path (path A) and the second image acquired while moving on the second path (path B) (S440) and when the overlapped area is present, the calculated capacity of the total scan image to the total capacity of the input apparatus 200 is displayed to the memory guide bar 530 (S450) by calculating as the capacity of a total scan image a capacity excepting a capacity of the overlapped area from the sum of the capacity of the first scan image and the capacity of the second scan image as shown in FIG. 6B to thereby display the residual capacity of the storage unit 260 of the input apparatus 200.

Figure 7:
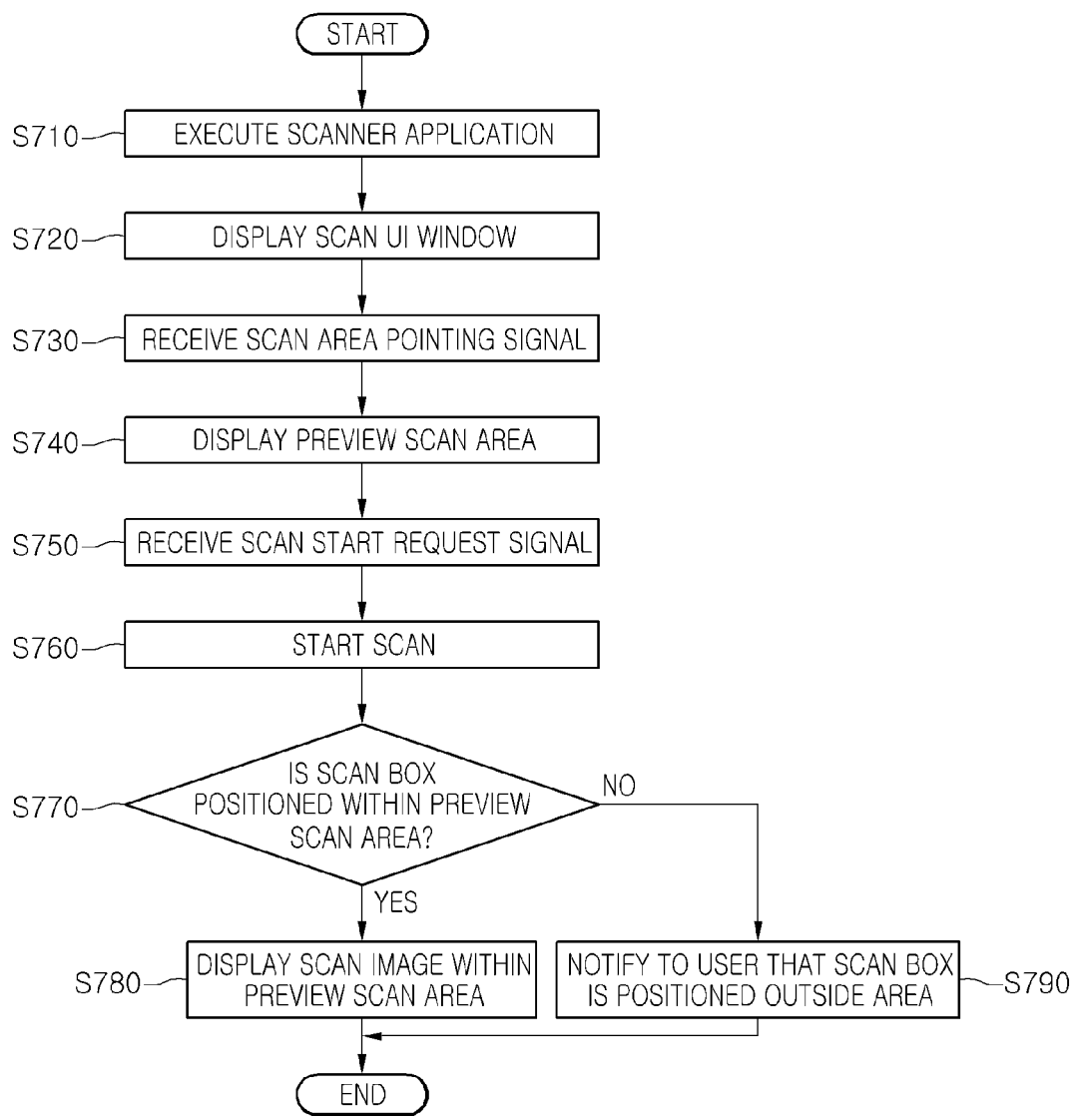
FIG. 7 is a flowchart showing another example method for displaying a scan image.

Hereinafter, referring to FIGS. 7 to 12, an example method for displaying a scan image will be described. FIG. 7 shows an example method for displaying a scan image. FIGS. 8 to 12 show a screen providing an example scan UI window displaying a preview scan area for acquiring a scan image.

First, referring to FIG. 7, the control unit 110 of the display apparatus 100 executes the scanner application (S710). The execution program of the scanner application may be stored in the storage unit 130 and the scan UI window is displayed by the execution of the scanner application (S720).

Next, the control unit 110 receives a scan area pointing signal pointing a scan area of the scan target object from the input apparatus (S730). A preview scan area corresponding to the received scan area pointing signal is displayed on the scan UI window (S740).

Herein, the scan area pointing signal may be generated through a click signal for each of a plurality of points of the scan target object. For example, when the input apparatus 200 generates a signal to click any one of the left and right buttons of the function input unit 240 while moving to four points 540a to 540d of the scan target object, four points 540a to 540d of the scan target object are displayed on the scan UI window 500 as shown in FIG. 8A and when the receiving of the scan area pointing signal is completed, a preview scan area 541 in which four points 540a to 540d corresponding to the scan area pointing signal are linked with each other is displayed as shown in FIG. 8B.

Meanwhile, the scan area pointing signal may be generated through a click signal and a drag signal for a predetermined point of the scan target object. For example, when the input apparatus 200 generates the signal to click any one of the left and right buttons of the function input unit 240 at a predetermined point 550*a* of the scan target object and receives an operation to drag in a predetermined direction from the predetermined point 550*a*, the predetermined point 550*a* of the scan target object and a drag operation indicator 550*b* from the predetermined point 550*a* are displayed on the scan UI window 500 as shown in FIG. 9A and when the receiving of the scan area pointing signal is completed, a preview scan area 551 corresponding to the drag operation indicator 550*b* corresponding to the scan area pointing signal is displayed on the scan UI window 500 as shown in FIG. 9B.

Figure 10:
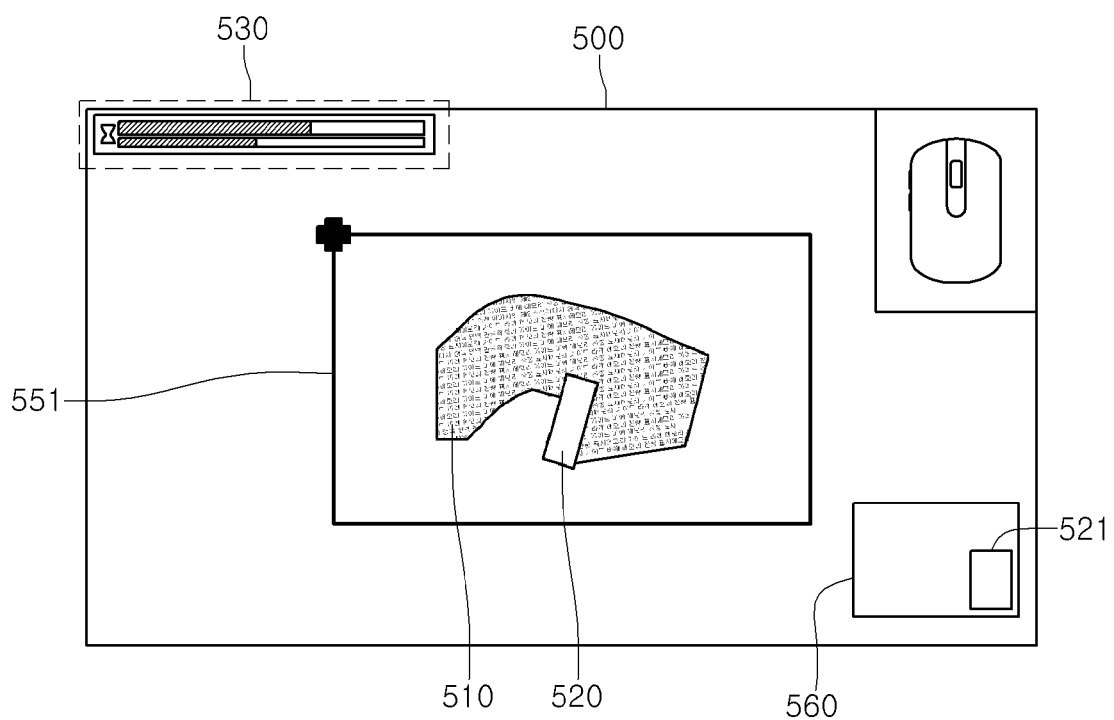

Meanwhile, as shown in FIG. 10, a scan guide map 560 in which the preview scan area 551 and the scan box 520 are downscaled at a predetermined rate may be displayed at one portion of the scan UI window 500. A downscaling scan box 521 through which the relative position of the scan box 520 can be determined within the preview scan area 551 may be displayed in the scan guide map 560. As a result, the user can easily judge where the scan box 520 is positioned within the preview scan area 551. In particular, when the preview scan area 551 is designated to be larger than the scan UI window 500, the relative position of the scan box 520 within the preview scan area 551 can be determined more easily through the scan guide map 560.

Meanwhile, a scan start request signal is received from the input apparatus 200 (S750) and a scan operation for acquiring the scan image from the scan target object is performed according to the scan start request signal (S760).

Further, the control unit 110 of the display apparatus 100 judges whether the scan box 520 corresponding to the position of the input apparatus 200 is positioned within the preview scan area 551 through the positional data transmitted from the input apparatus 200 (S770).

As the judgment result of step S770, when the scan box 520 is positioned within the preview scan area 551, a scan image of a scan target object corresponding to the preview scan area 551 is acquired and the acquired scan image is displayed on the scan UI window 500 (S780).

Figure 11:
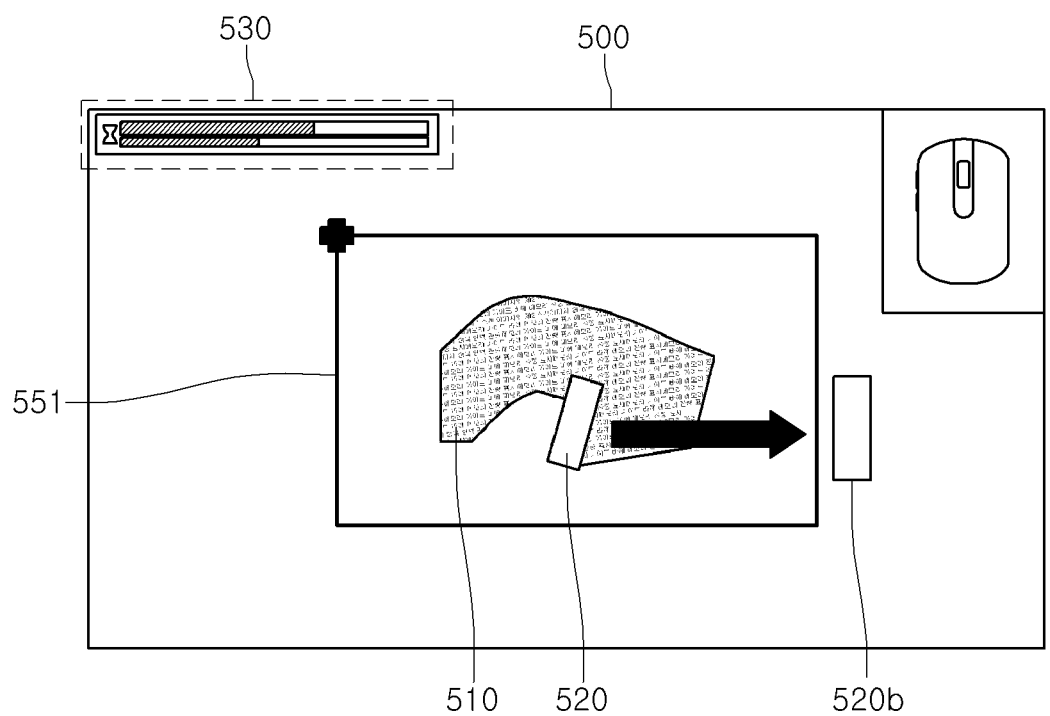

As the judgment result of step S770, when the scan box 520 is not positioned within the preview scan area 551, a notification message indicating that the scan box 520 is outside the preview scan area 551 is outputted to the user (S790). For example, as shown in FIG. 11, when the position of the scan box 520*b* moves to an area other than the preview scan area 551, the notification message is outputted to the user. The notification message may be outputted in various methods. The display of the scan box may be changed or a warning message may be displayed. Further, the input apparatus 200 may be vibrated by outputting a predetermined sound or transmitting a signal related to predetermined vibration to the input apparatus 200 to thereby output the notification message to the user.

Figure 12:
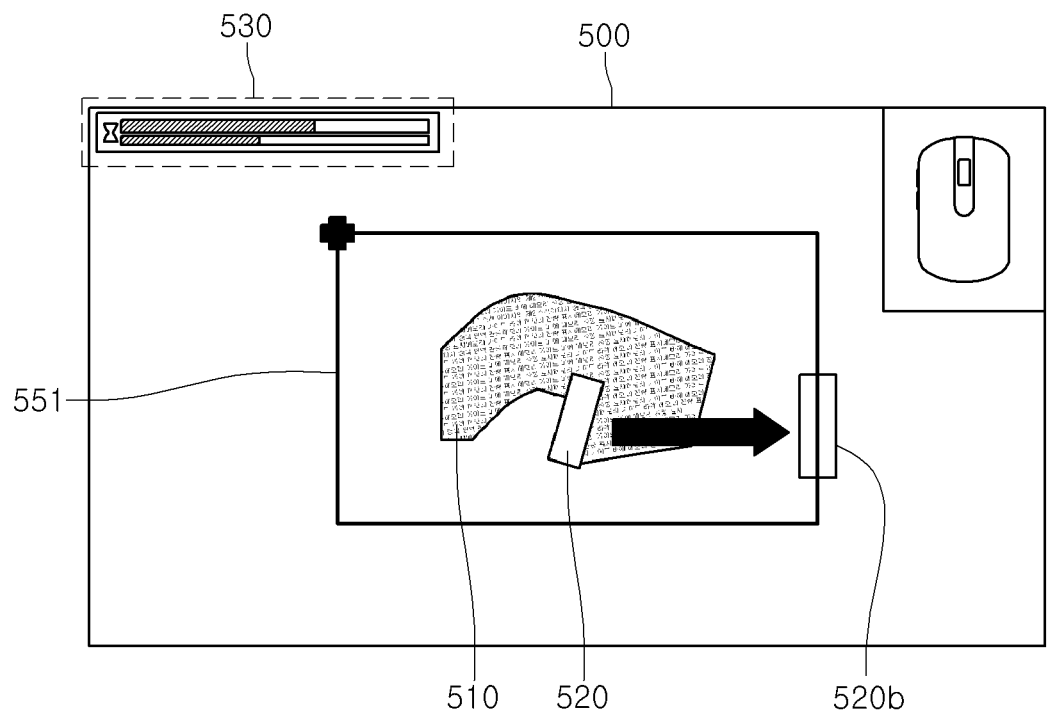

In addition, as shown in FIG. 12, when a part of the scan box 520*b* is positioned outside the preview scan area 551, a scan image of a scan target object corresponding to the part of the scan box 520*b* may not be acquired.

That is, the partial area of the scan box 520*b* corresponding to the area outside the preview scan area 551 may not be scanned.

Figure 13:
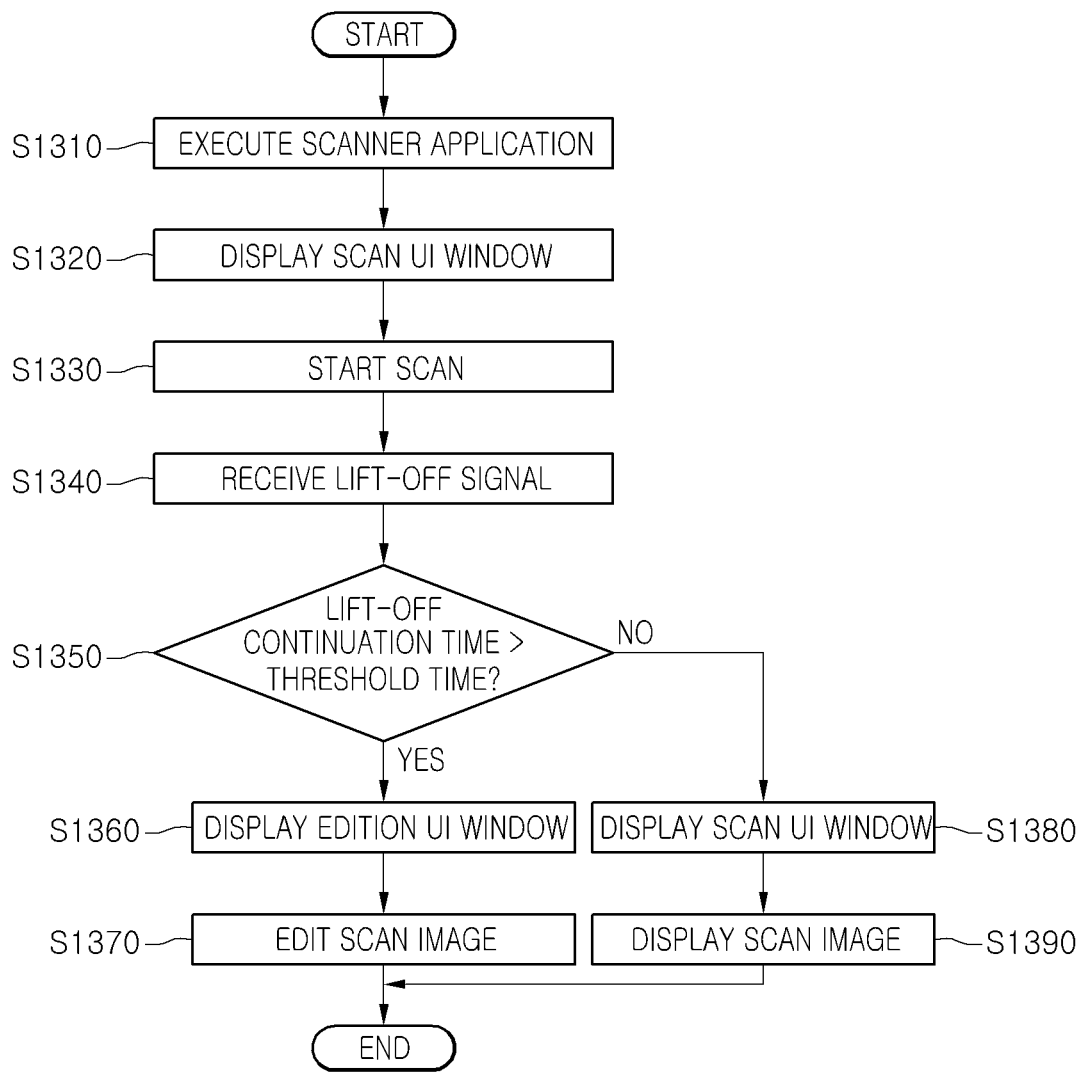
FIG. 13 is a flowchart showing an example method for displaying a scan image or an edition image.
Figure 15:
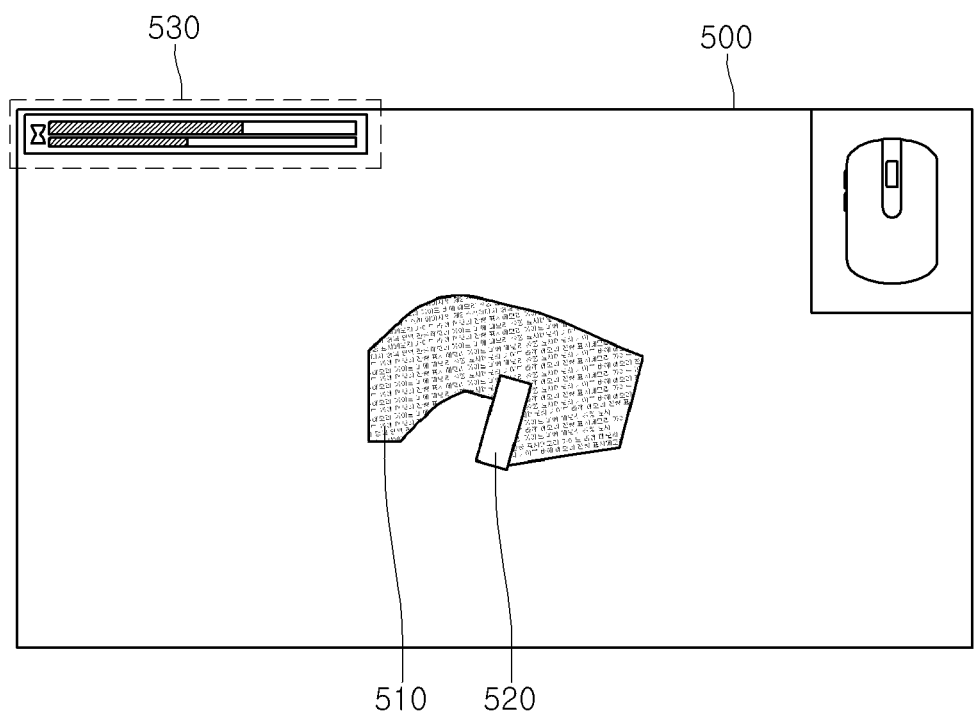
FIG. 15 is a diagram showing a screen providing an example scan UI window on which a scan image is displayed.
Figure 16:
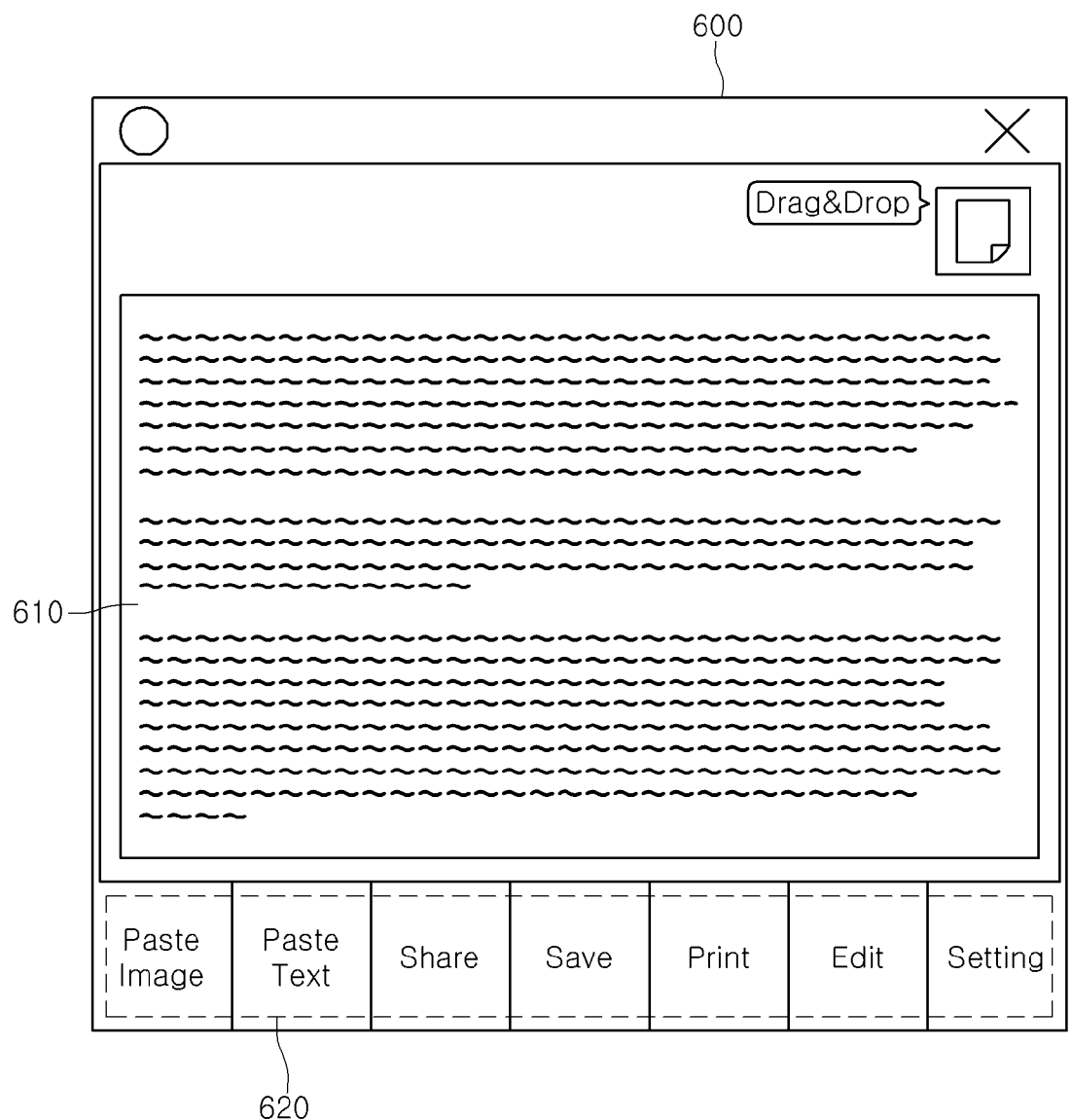
FIG. 16 is a diagram showing a screen providing an example edition UI window on which an edition image is displayed.

Hereinafter, referring to FIGS. 13 to 16, an example method for displaying a scan image or an edition image will be described below. FIG. 13 shows an example method for displaying a scan image or an edition image. FIG. 14 shows an example state of an input apparatus when a lift-off signal is generated. FIG. 15 shows a screen providing an example scan UI window on which the scan image. FIG. 16 shows a screen providing an example edition UI window on which the edition image is displayed.

First, referring to FIG. 13, the control unit 110 of the display apparatus 100 executes the scanner application (S1310). The execution program of the scanner application may be stored in the storage unit 130 and the scan UI window is displayed by the execution of the scanner application (S1320). The transmitted scan start request signal is received through the communication interface unit 150 of the display apparatus 100 and the scan for acquiring the scan image from the scan target object starts by entering the scan mode according to the scan start request signal (S1330).

In the scan mode state, when the input apparatus 200 is spaced apart from the scan target object by a predetermined distance or more, the control unit 250 of the input apparatus 200 generates a predetermined lift-off signal and transmits the generated lift-off signal to the display apparatus 200. The display apparatus 200 receives the lift-off signal (S1340). As shown in FIG. 14A, the input apparatus 200 performs the acquiring of the scan image of the scan target object 10, that is, the scan operation. Meanwhile, as shown in FIG. 14B, when the input apparatus 200 is spaced apart from the scan target object 10 by a predetermined distance, the lift-off signal is generated. Herein, when the predetermined distance is one mm or more, the lift-off signal may be generated.

The control unit 110 of the display apparatus 100 compares a previously stored threshold time with a continuation time of the received lift-off signal (S1350) and as the comparison result, when the continuation time of the lift-off signal is less than the predetermined threshold time, it is judged that the scan mode is continued and as shown in FIG. 15, the scan UI window 500 displayed while performing the scan operation is displayed (S1380). Thereafter, the scan image 510 and the scan box 520 acquired by performing the scan operation are displayed on the scan UI window 500 (S1390).

As the comparison result, the continuation time of the received lift-off signal and the predetermined threshold time are compared with each other and when the continuation time of the lift-off signal is more than the predetermined threshold time, an edition UI window 600 including an edition image 610 for editing the acquired scan image and an edition setting window 620 having a plurality of functions for editing the edition image is displayed as shown in FIG. 16 (S1360).

Herein, the edition image represented a scan image acquired from the scan target object and decided for edition.

The edition image is displayed on the edition UI window 600 to switch the scan mode to the edition mode and the edition image 610 displayed on the edition UI window 600 is edited by using any one of the plurality of functions displayed on the edition setting window 620 (S1370).

Figure 17:
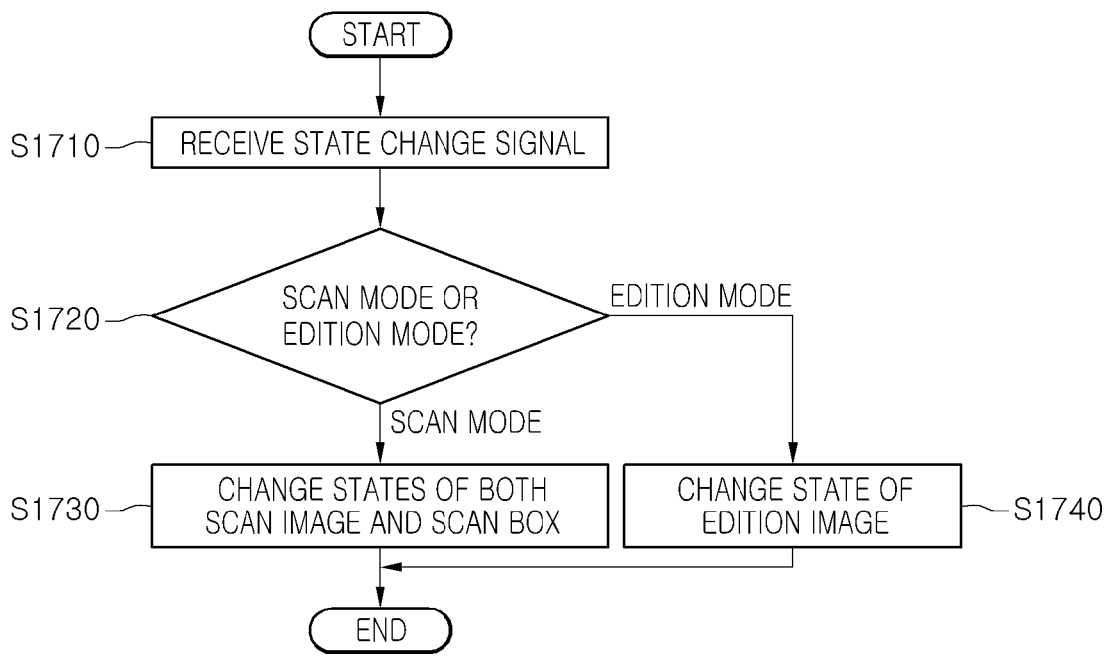
FIG. 17 is a flowchart showing an example method for displaying a scan image depending on a state change signal of an input apparatus.

Hereinafter, referring to FIGS. 17 to 19, an example method for displaying a scan image depending on a state change signal of an input apparatus will be described below. FIG. 17 shows an example method for displaying a scan image depending on the state change signal of the input apparatus. FIG. 18 shows a screen providing an example scan UI window on which a scan image is displayed depending on the state change signal of the input apparatus. FIG. 19 shows a screen providing an example edition UI window on which an edition image is displayed depending on the state change signal of the input apparatus.

First, the input apparatus 200 generates a state change state by inputting buttons of the function input unit 240 and transmits the generated state change signal to the display apparatus 100. The display apparatus 100 receives the state change signal (S1710). Herein the state change signal may be a zoom-in/out signal or a wheel input signal through the wheel button of the buttons of the function input unit 240.

Meanwhile, the control unit 110 of the display apparatus 100 judges the scan mode or the edition mode at the time when the state change signal is inputted (S1720).

As the judgment result, in the case of the scan mode at the time when the state change signal is inputted, that is, in the case of the scan UI window 500 including the scan image 510 and the scan box 520 as shown in FIG. 18A, any one of the sizes or directions of the scan image 510 and the scan box 520 that are displayed is adjusted and displayed together according to the state change signal (S1730).

For example, when the state change signal is the zoom-in signal through the wheel button of the input apparatus, the sizes of the scan image 510 and the scan box 520 shown in FIG. 18A may be together upscaled and displayed together at a predetermined rate, as shown in FIG. 18B.

Further, when the state change signal is the zoom-out signal through the wheel button of the input apparatus 200, the sizes of the scan image 510 and the scan box 520 may be together downscaled and displayed at a predetermined rate.

Further, when the state change signal is the wheel input signal through the wheel button of the input apparatus 200, the directions of the scan image 510 and the scan box 520 may be together rotated and displayed at a predetermined angle.

As the judgment result, in the case of the edition mode at the time when the state change signal is inputted, that is, in the case of the edition UI window 600 including the edition image 610 and the edition setting window 630 as shown in FIG. 19A, the state of the displayed edition image 610 is adjusted and displayed.

For example, when the state change signal is the zoom-in signal through the wheel button of the input apparatus, the size of the edition image 610 shown in FIG. 19A may be upscaled and displayed together, as shown in FIG. 19B.

Further, when the state change signal is the zoom-out signal through the wheel button of the input apparatus 200, the size of the edition image 610 may be together downscaled and displayed at a predetermined rate.

Meanwhile, the function of the zoom-in/out signal through the wheel button of the input apparatus 200 may be changed according to user setting. That is, the resolution of the edition image 610 may be changed and displayed to correspond to the zoom-in/out signal through the wheel button of the input apparatus 200.

Figure 20:
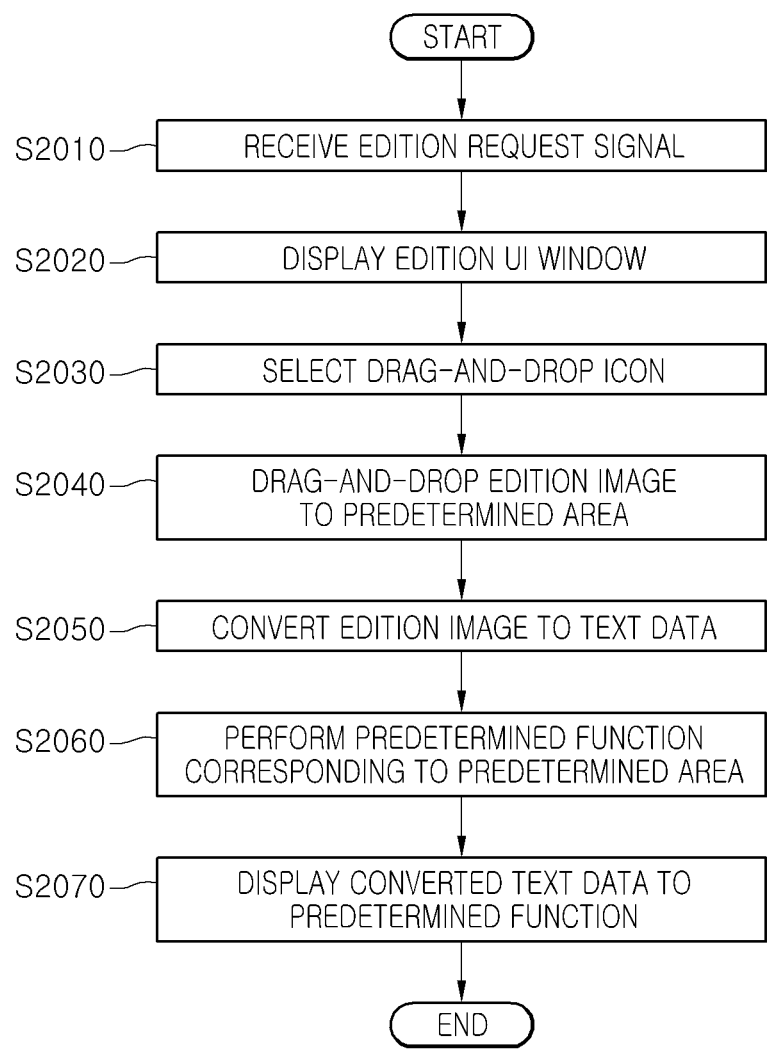
FIG. 20 is a flowchart showing an example method for editing a scan image.
Figure 21:
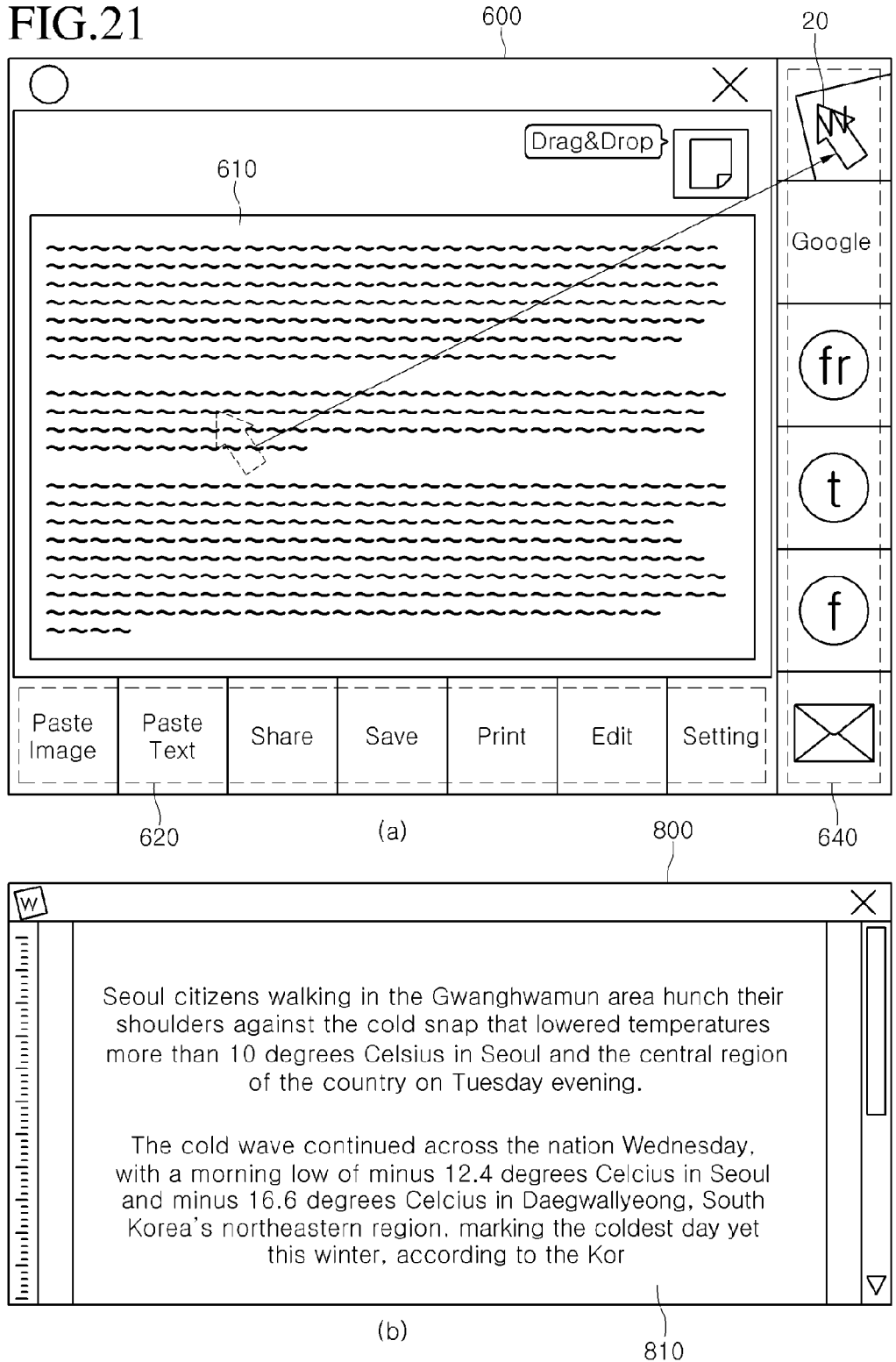
FIGS. 21 to 24 are diagrams showing a screen providing an example edition UI window for editing a scan image.

Hereinafter, referring to FIGS. 20 to 24, an example method for editing a scan image will be described below. FIG. 20 shows an example method for editing a scan image. FIGS. 21 to 24 show a screen providing an example edition UI window for editing a scan image.

Referring to FIG. 20, the control unit 110 of the display apparatus 100 receives an edition request signal from the input apparatus 200 through the communication interface unit 150 (S2010). The edition request signal may be generated by receiving the scanner function selecting button 241 of the input apparatus 200.

The edition UI window 600 is displayed to correspond to the edition request signal (S2020). The edition image 610 and the edition setting window 620 for editing the edition image and a plurality of functional icons performing a plurality of functions are displayed at a predetermined area 640 of the edition UI window 600 (see FIG. 21).

Herein, the plurality of functional icons may be icons for executing an electronic document function, an e-mail function, and a social network service function.

The user selects a drag-and-drop icon at one portion of the edition UI window 600 (S2030). The selection of the drag-and-drop icon allows the edition image to be dragged and dropped to any one of a plurality of areas in the edition UI window 600. Meanwhile, the selection of the drag-and-drop icon may be omitted.

That is, a drag-and-drop operation for the edition image 610 may be performed without selecting an additional drag-and-drop icon in the edition UI window 600.

Meanwhile, the user selects the edition image 610 through a pointer 20 such as the mouse and thereafter, may locate the selected edition image 610 at the predetermined area 640 (S2040).

When the edition image 610 is dragged through the pointer 20 and thereafter, the edition image 610 is dropped to the area where any one of the plurality of functional icons is displayed, the edition image 610 is converted into image data and text data (S2050) and at the same time, a functional icon corresponding to the area to which the edition image 610 is dropped is executed (S2060).

Further, a function corresponding to the executed functional icon is executed and at the same time, the converted text data may be displayed in a format corresponding to the executed function (S2070).

Herein, the predetermined area may be an area where the functional icon is displayed.

For example, as shown in FIG. 21A, when the edition image 610 is dragged and dropped to an area where a functional icon related with a word file function among the plurality of functional icons is displayed, the word file function is executed to thereby display a word file window 800 and at the same time, text data 810 converted from the edition image on the word file window 800, as shown in FIG. 21B.

Meanwhile, the predetermined area may be an area where the executed predetermined function is displayed.

Figure 22:
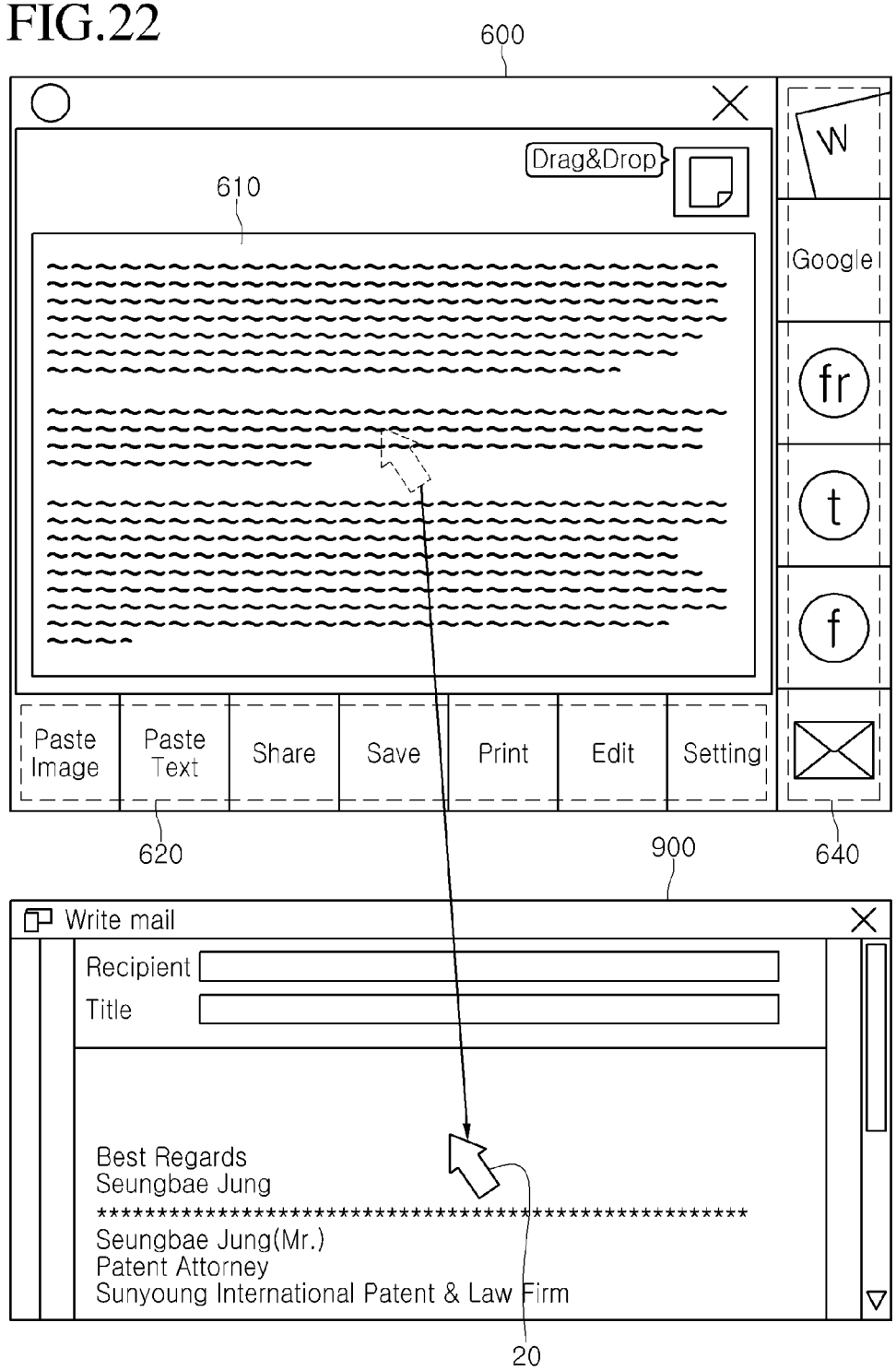
Figure 23:
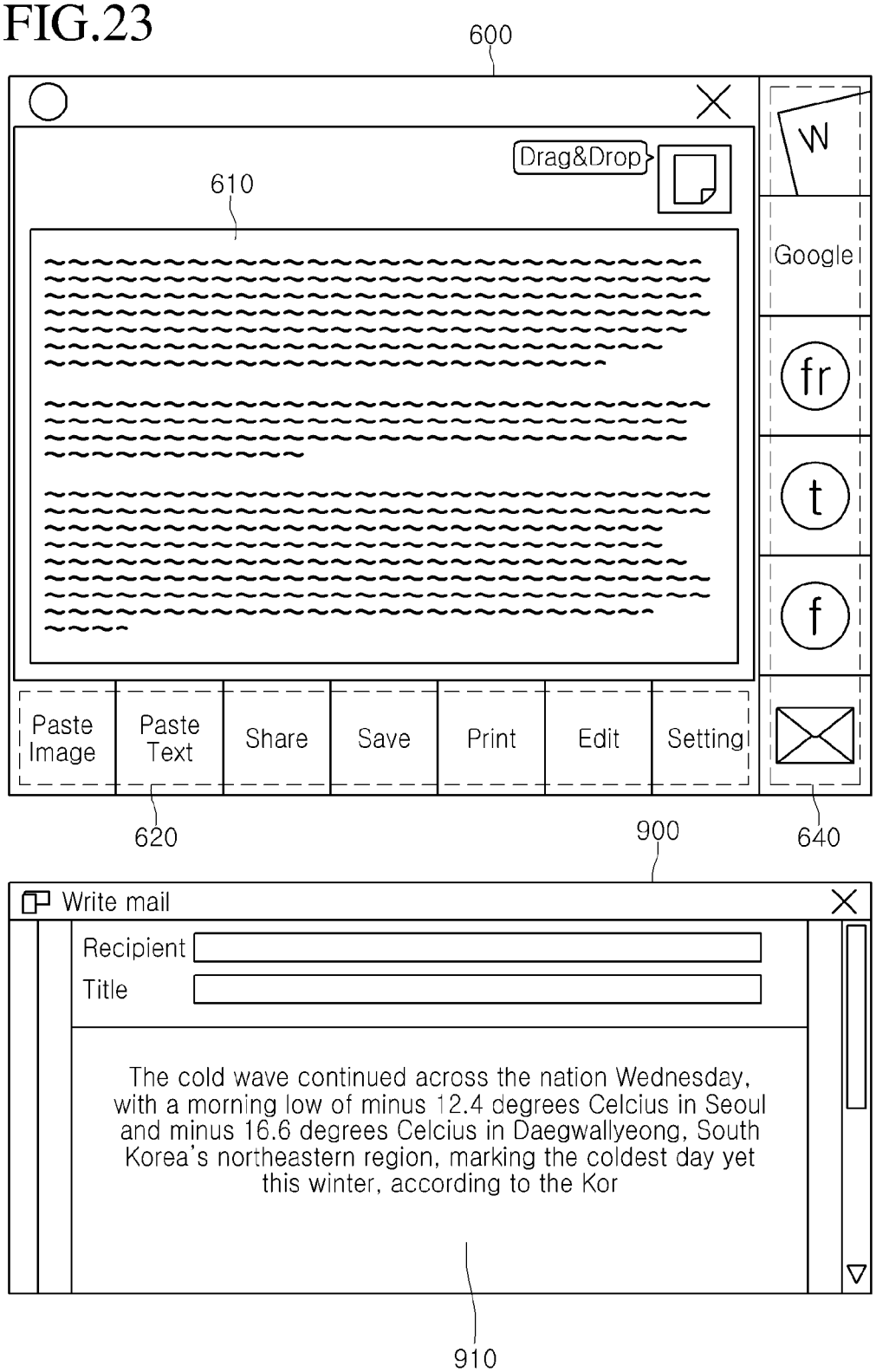

For example, as shown in FIG. 22, when the e-mail function is executed by selecting an icon related with the e-mail function among the plurality of functional icons, an e-mail window 900 is displayed. Thereafter, when the edition image 610 displayed on the edition UI window 600 is dragged through the point 20 and dropped to the area where the executed predetermined function is displayed, that is, the e-mail window 900, the text data 910 converted from the edition image may be displayed on the e-mail window 900 as shown in FIG. 23.

Figure 24:
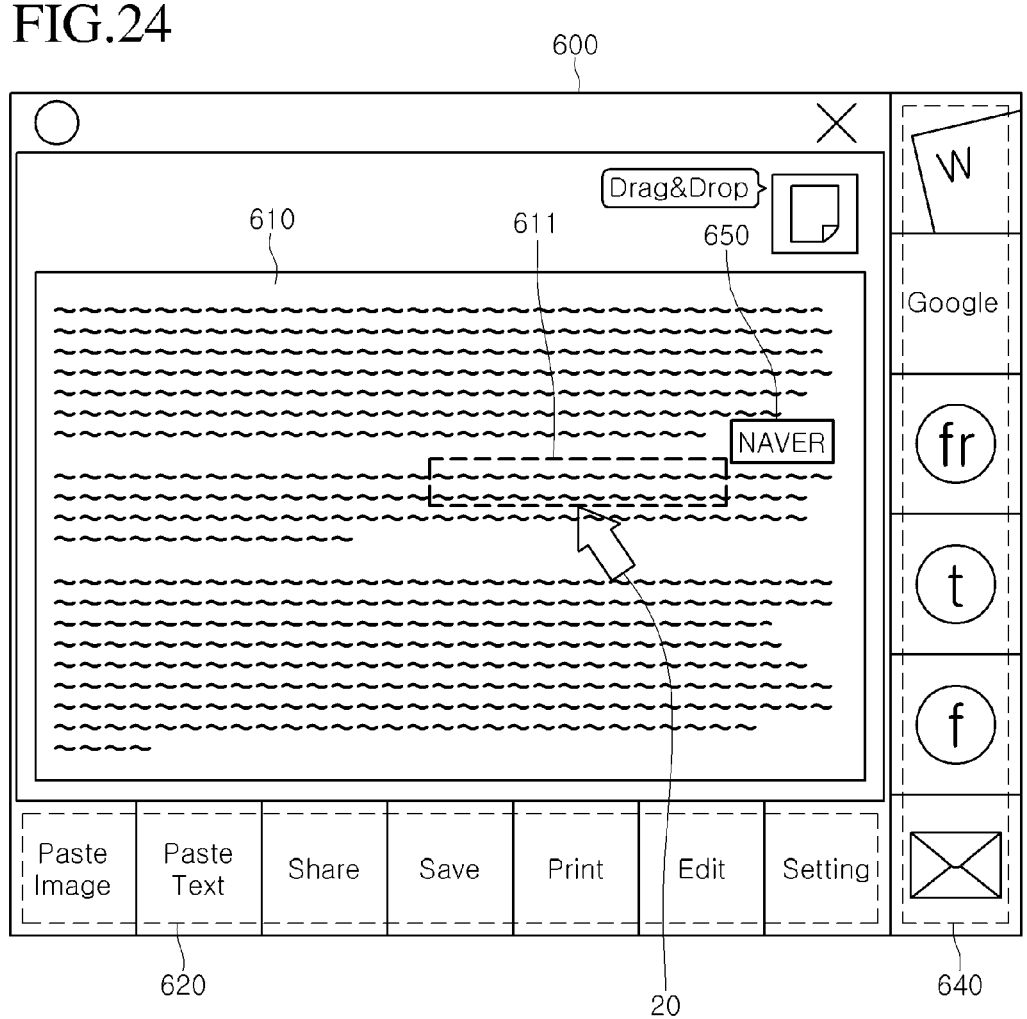

Meanwhile, as shown in FIG. 24, a predetermined character string 611 is selected among the text data converted from the edition image 610 displayed on the edition UI window 600 through the pointer 20, a search icon 650 may be displayed at one portion of the selected predetermined character string 611 to correspond to the selection of the predetermined character string 611. Thereafter, when an input to select the search icon 650 is received, the selected predetermined character string is searched by accessing a search site corresponding to the search icon 650 to display a search result.

In addition, although not shown in the drawings, a translation icon may be displayed instead of the search icon 650. In this case, when an input to select the translation icon is received, the selected character string is translated by executing a translation program corresponding to the translation icon to display a translation result.

Hereinafter, another example input apparatus and an image correction method thereof will be described with reference to FIGS. 25 to 29.

Figure 25:
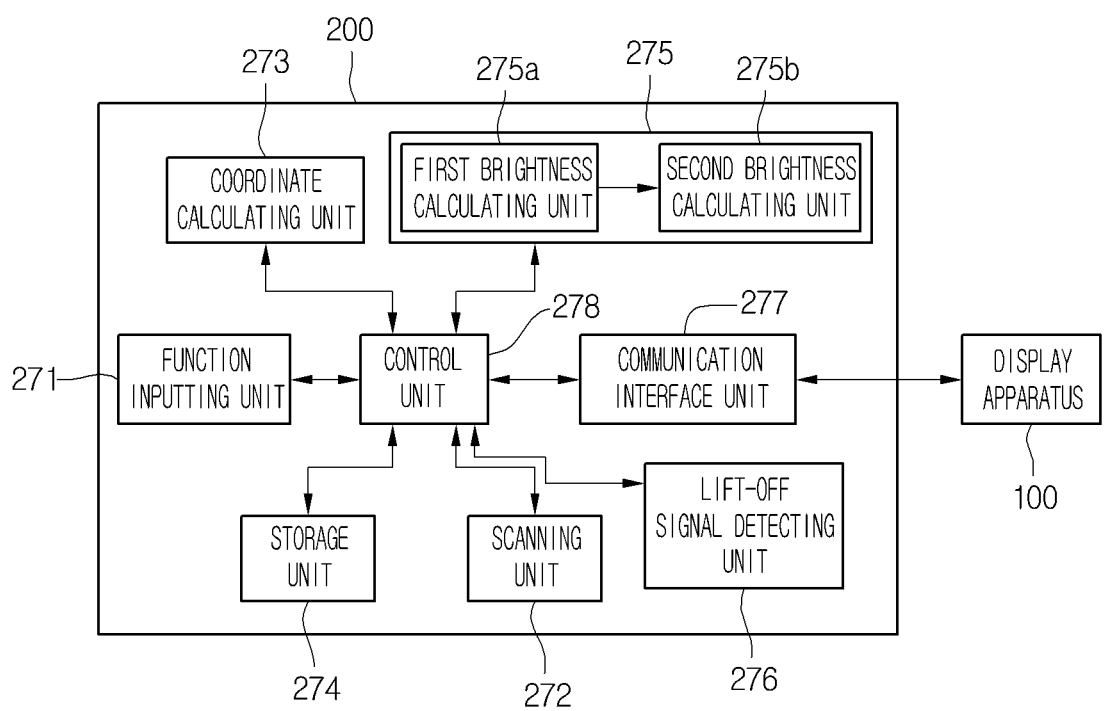
FIG. 25 is a block diagram showing another example input apparatus.
Figure 26:
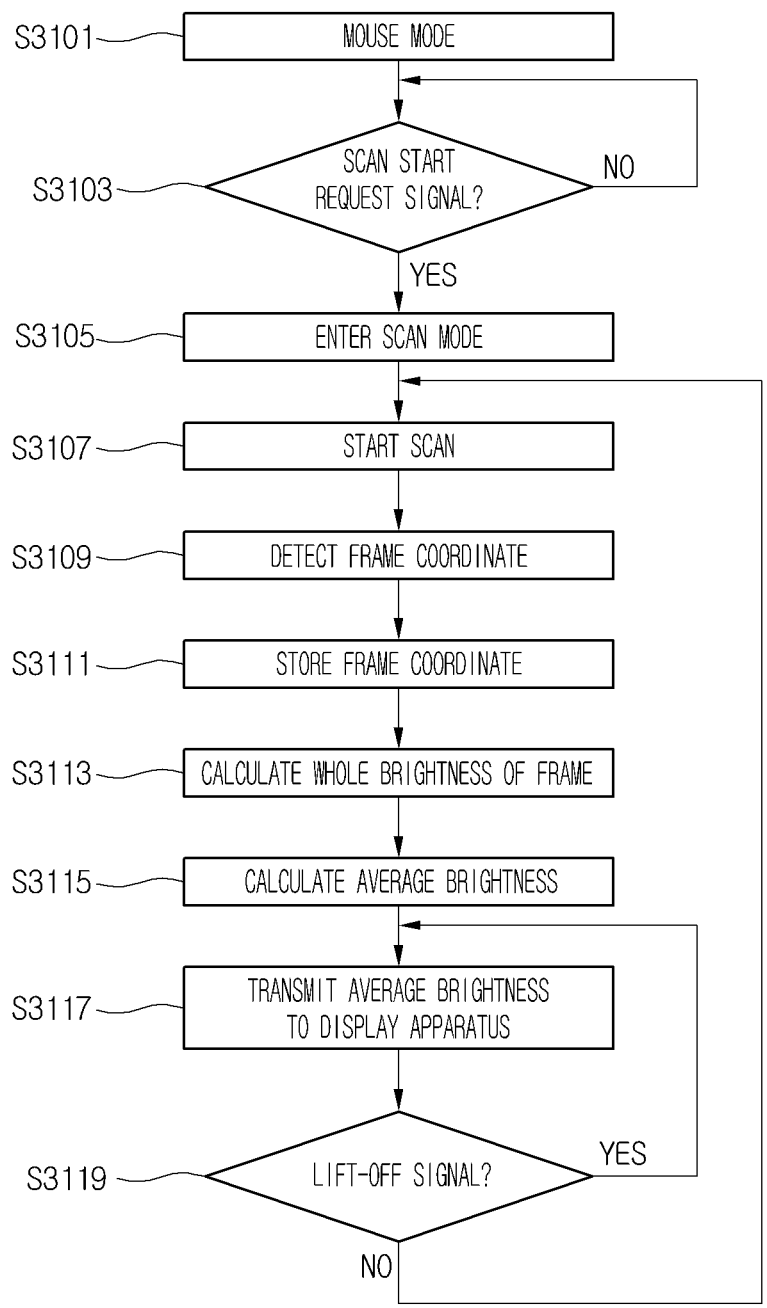
FIG. 26 is a flowchart showing an example method for transmitting information of an input apparatus.
Figure 27:
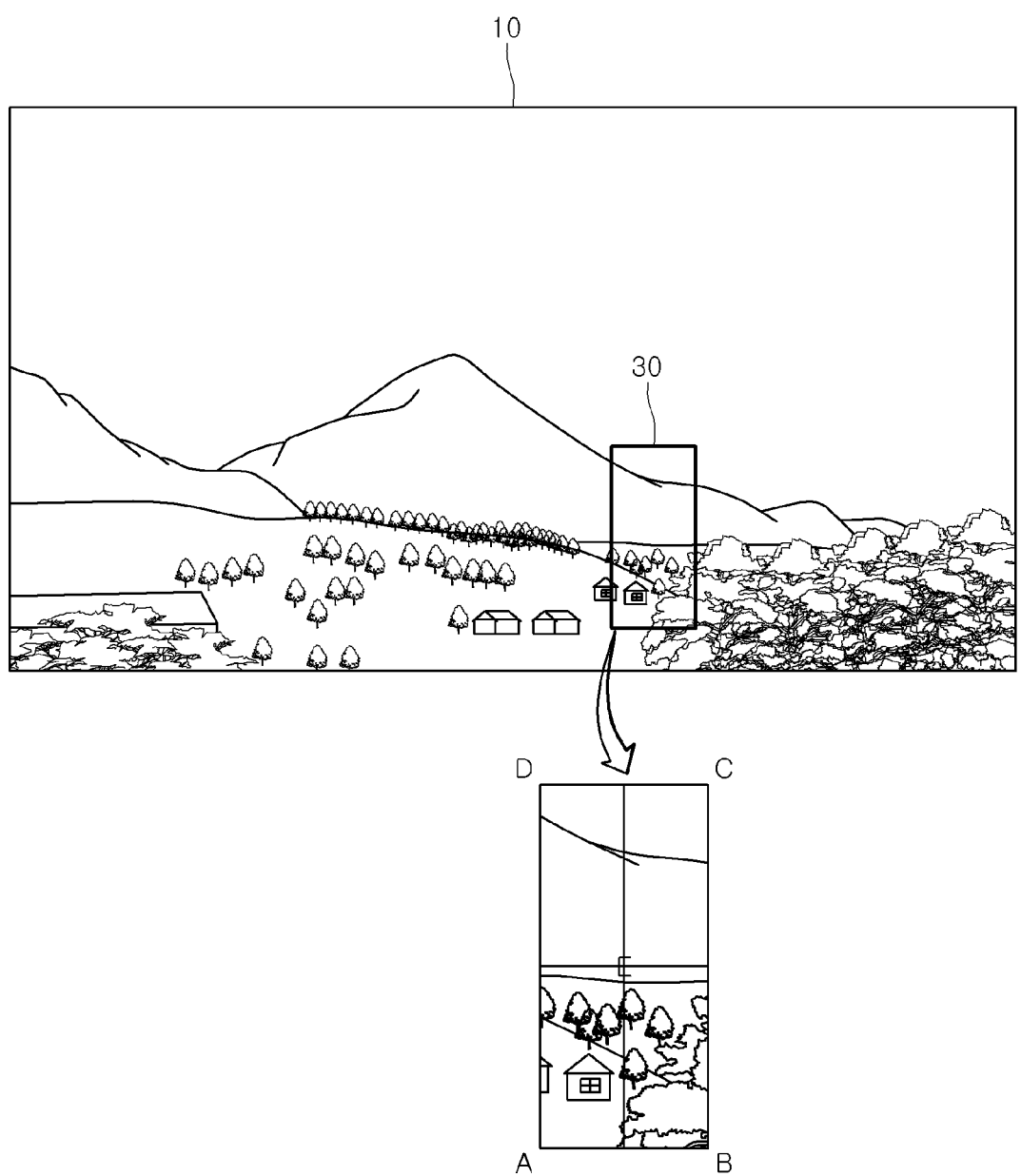
FIG. 27 is a view showing a procedure for calculating coordinates of a frame.
Figure 29:
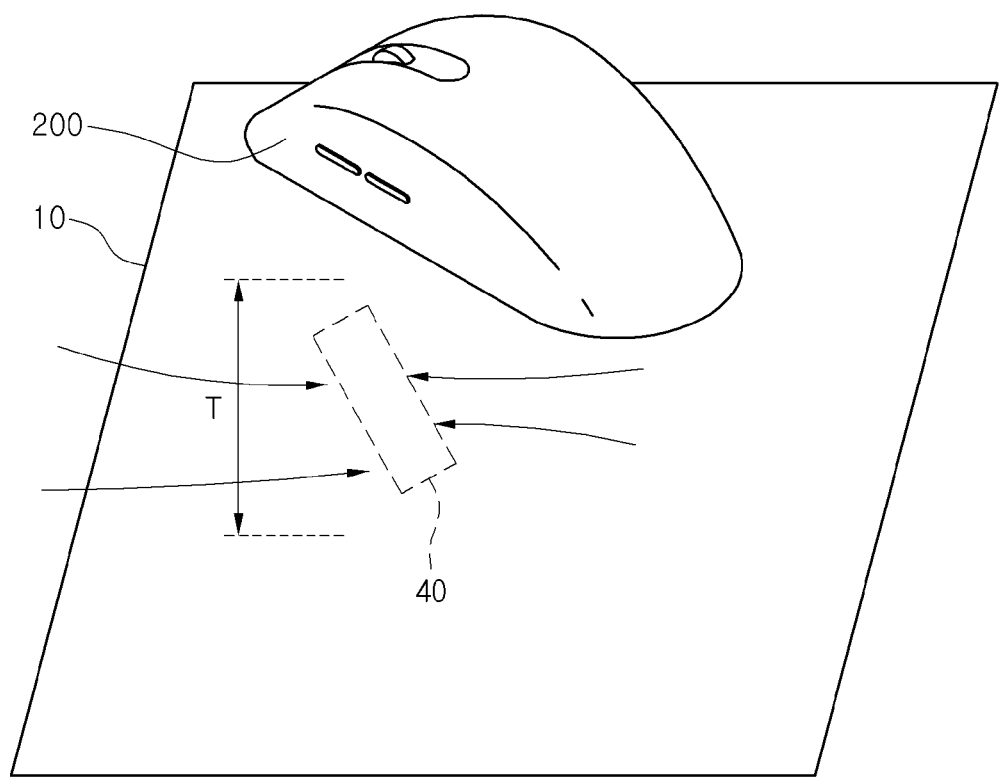
FIG. 29 is a view showing a situation where a lift-off signal is detected during scan operation.

FIG. 25 is a block diagram showing another example input apparatus, FIG. 26 is a flowchart showing an example method for transmitting information of an input apparatus, FIG. 27 is a view showing a procedure for calculating coordinates of a frame, FIG. 28 is a view showing a change of a scan image before and after an example image correction method is applied, and FIG. 29 is a view showing a situation where a lift-off signal is detected during scan operation.

Referring to FIG. 25, the input apparatus 200 may include a function inputting unit 271, a scanning unit 272, a coordinate detecting unit 273, a storage unit 274, a brightness calculating unit 275, a lift-off signal detecting unit 276, a communication interface unit 277, and a control unit 278.

The function inputting unit 271 may receive an input signal to perform an operation corresponding to a specific function of the input apparatus 200. That is, if the function inputting unit 271 receives an input signal that requests the operation of a mouse mode or a scan mode, the input apparatus 200 may enter the corresponding operation mode. The function inputting unit 271 may include a scanner function selecting button, a wheel button, and left and right buttons located to the left and right about the wheel button.

The scanning unit 272 may acquire scan images corresponding to predetermined areas of the scan target object by radiating light to the predetermined areas of the scan target object and detecting light reflected therefrom. In this case, a unit screen of the acquired scan image may signify the frame.

The coordinate detecting unit 273 can detect a plurality of coordinates corresponding to a plurality of pixels constituting the frame.

In particular, the coordinate detecting unit 273 can detect a central coordinate and edge coordinates of the frame. According to one embodiment, the coordinate detecting unit 273 can detect only the central coordinate. In addition, the coordinate detecting unit 273 can detect all edge coordinates or only one specific edge coordinate of the frame.

The storage unit 274 may detect the central coordinate and edge coordinates of the frame detected from the coordinate detecting unit 273.

The brightness calculating unit 275 can calculate the whole brightness of the frame and the average brightness of the frame by using the detected coordinates corresponding to the pixels. The brightness calculating unit 275 may include a first brightness calculating unit 275a and a second brightness calculating unit 275b.

The first brightness calculating unit 275a can calculate the whole brightness of the frame and the method of calculating the whole brightness of the frame will be described later in detail with reference to FIG. 26.

The second brightness calculating unit 275b can calculate the average brightness of the frame and the method of calculating the average brightness of the frame will be described later in detail with reference to FIG. 26.

The lift-off signal detecting unit 276 can detect the lift-off signal, which is generated when the input apparatus 200 is spaced apart from the scan target subject by a predetermined distance or more. The lift-off signal detecting unit 276 may include a gyro sensor.

The communication interface unit 277 can transmit the central coordinate of the frame, the edge coordinates of the frame, the whole brightness of the frame, the average brightness of the frame and the acquired scan image to the display apparatus 100 through wired/wireless communication.

The control unit 278 may control general operations of the input apparatus 200. For example, the control unit 278 may control a scan image of a scan target object acquired from the scanning unit 272 and the central coordinate and edge coordinates of the frame acquired from the coordinate detecting unit 273 to be transmitted to external apparatuses through the communication interface unit 277 and may control the scan image and positional data to be stored in the storage unit 274.

In addition, the control unit 278 may control signals associated with various functions inputted by the user through the function input unit 271 to be transmitted to the external apparatuses.

FIG. 26 illustrates the flowchart showing an example method for correcting an image.

Referring to FIG. 26, at first, the input apparatus 200 operates in the mouse mode (S3101). The mouse mode is performed to control the operation of the display apparatus, in which a command is selected or a program is executed by using a cursor that moves corresponding to the input apparatus 200 moving on a surface of a desk.

Then, the input apparatus 200 receives a scan start request signal (S3103).

According to one embodiment, the scan start request signal may be received through the scanner function selecting button 241 described with reference to FIG. 2A. That is, if the user presses the scanner function selecting button 241 one time, the mode of the input apparatus 200 may be changed from the mouse mode to the scan mode. The scan mode is performed to acquire the scan image through the pixel of the scan target object received by radiating the light.

Although the scan start request signal can be generated through the scanner function selecting button 241, the disclosure is not limited thereto, but the scan start request signal can be generated in various ways by selecting a specific application in the display apparatus.

Upon receiving the scan start request signal, the input apparatus 200 enters the scan mode (S3105).

Then, the input apparatus 200 scans the scan target object (S3107). The input apparatus 200 can acquire the scan image of the scan target object through the scanning unit 272. The scanning unit 272 may acquire the scan images corresponding to predetermined areas of the scan target object by radiating light to the predetermined areas of the scan target object and detecting light reflected therefrom.

According to one embodiment, as shown in FIG. 2B, the scan area of the scanning unit 272 may have a rectangular shape, but the disclosure is not limited thereto.

The scan target object represents an object containing information which the user intends to input/store in the input apparatus 200 and may include a document in which characters, figures, and the like are displayed. Further, the predetermined area of the scan target object represents a two-dimensional (2D) area having a predetermined area unlike the existing line scan area.

The input apparatus 200 may detect the coordinates corresponding to the pixels constituting the frame (S3109).

The input apparatus 200 may detect the central coordinate and edge coordinates of the frame. The frame may be a unit screen of the scan image acquired through the input apparatus 200. According to one embodiment, if the scan area has a rectangular shape, the frame may also have a rectangular shape and the edge coordinates of the frame may be four vertex coordinates of the rectangular shape.

FIG. 27 shows a scan target object 10 and one frame 30 corresponding to the scan area, which is currently scanned by the input apparatus 200. Edges of the frame are denoted as A, B, C and D and the center of the frame is denoted as E. In this case, the edge coordinates and the central coordinate of the frame may be expressed as A(x1, y1), B(x2, y2), C(x3, y3), D(x4, y4) and E(x5, y5), respectively.

According to one embodiment, the input apparatus 200 can detect the central coordinate and the edge coordinates of the frame through the coordinate detecting unit 273.

According to one embodiment, the coordinate detecting unit 273 can detect the coordinates corresponding to the pixels constituting the frame 30.

According to one embodiment, the coordinate detecting unit 273 can detect the central coordinate and the edge coordinates of the frame by using a laser sensor. The laser sensor can detect the central coordinate and the edge coordinates of the frame by radiating light to the scan target object and detecting light reflected therefrom.

According to one embodiment, the laser sensor may detect only the central coordinate of the frame. That is, since the frame has the regular size, the coordinate detecting unit 273 can calculate the edge coordinates based on the relative position between the central coordinate and the edge coordinates if the central coordinate of the frame is obtained.

The input apparatus 200 stores the detected coordinates of the frame (S3111). The input apparatus 200 can store the detected coordinates of the frame in the storage unit 274. The storage unit 274, for example, may include at least one type of storage medium of a flash memory type, a hard disk type, a multimedia card micro type, a card type memory (e.g., an SD or XD memory, or the like), a RAM, and a ROM (EEPROM, or the like).

The input apparatus 200 calculates the whole brightness of the frame which is a unit screen of the scan image currently acquired (S3113). The input apparatus 200 may calculate the whole brightness of the frame by using the first brightness calculating unit 275a. The first brightness calculating unit 275a can calculate the whole brightness of the frame by using a plurality of coordinate points included in one frame. The coordinate points may correspond to the pixels constituting one frame.

The first brightness calculating unit 275a may calculate the whole brightness of the frame according to following equation 1.

$$F = \sum_{k=0}^{n} I_k(x, y) \quad \text{Equation 1}$$

In Equation 1, Ik(x,y) is a coordinate corresponding to one coordinate point included in the frame, n represents a number of coordinate points or pixels included in one frame. The number of pixels constituting one frame may vary depending on the resolution of the scan image to be acquired. That is, the number of pixels constituting one frame may be increased when the scan image having the high resolution is acquired than the scan image having the low resolution.

The first brightness calculating unit 275a may calculate the whole brightness F of the frame by adding up all brightness corresponding to the coordinate points constituting the frame.

The input apparatus 200 calculates the average brightness of the frame by using the calculated whole brightness of the frame (S3115). The input apparatus 200 may calculate the average brightness of the frame by using the second brightness calculating unit 275b. The second brightness calculating unit 275b may calculate the average brightness S(B) of the frame according to following equation 2.

$$S(B) = \frac{B}{n} \quad \text{Equation 2}$$

That is, the second brightness calculating unit 275b may calculate the average brightness S(B) of the frame by dividing the whole brightness of the frame by the number n of the coordinate points constituting the frame.

The input apparatus 200 transmits the calculated average brightness to the display apparatus 100 (S3117). The input apparatus 200 may transmit the calculated average brightness to the display apparatus 100 through the communication interface unit 277. The communication interface unit 277 may transmit various input signals, image signals, sound signals or data signals to external apparatuses, in particular, to the display apparatus 100 through wired/wireless communication.

When the communication interface unit 277 performs wired communication with the external apparatuses, the communication interface unit 277 may be constituted by a serial, a PS/2, a USB, and the like and when the communication interface unit 277 performs wireless communication with the external apparatuses, the communication interface unit 277 may be constituted by radio frequency identification (RFID), infrared data association (IrDA), ultra wideband (UWB), zigbee, digital living network alliance (DLNA), and the like.

Upon receiving information about the calculated average brightness, the display apparatus 100 may apply the received average brightness to the corresponding scan image. That is, the display apparatus 100 receives the information about the average brightness of the frame from the input apparatus 200 to correct the whole brightness of the scan image into the average brightness.

FIG. 28 illustrates a change of the scan image before and after the image correction method is applied. Referring to the scan image of one frame after the image correction, the image has higher brightness in each adjacent region K of A, B, C and D points, which are edges of the frame, as compared with the brightness of the image before the image correction. The adjacent region K may vary depending on the light radiated from the input apparatus 200 and the movement direction of the input apparatus 200.

Meanwhile, the input apparatus 200 may check whether the lift-off signal is generated (S3119). The lift-off signal may be generated when the input apparatus 200 is spaced apart from the scan target object by a predetermined distance T or more. The predetermined distance T may be 1 mm, but this is illustrative purpose only.

According to one embodiment, the input apparatus 200 may check whether the lift-off signal is generated through the lift-off signal detecting unit 276. According to one embodiment, the lift-off signal detecting unit 276 may include a gyro sensor. The gyro sensor detects the input apparatus 200 moving in the direction vertical to the plane of the scan target object, that is, the gyro sensor detects the displacement of the input apparatus 200 with respect to x, y and z axes.

Referring to FIG. 29, the lift-off signal may be generated when the input apparatus 200 is spaced apart from the scan target object 10 by the predetermined distance T or more. In this case, the scan image may be unclear in a predetermined scan area 40 due to light radiated thereto from the outside other than the light radiated from the input apparatus 200.

Referring again to FIG. 26, if it is judged that the lift-off signal is generated (S3119), the input apparatus 200 transmits information about the average brightness, which is calculated before the lift-off signal is generated, to the display apparatus 100. Thus, the average brightness calculated before the lift-off signal is generated can be applied to the scan image even if the input apparatus 200 is lifted off, so the scan target object can be stably scanned.

Meanwhile, if it is judged that the lift-off signal is not generated (S3119), the input apparatus 200 performs the scan operation in the scan mode.

According to the image correction method of the embodiment, the scan image having the uniform brightness can be obtained by solving the problem that specific portions of the scan image become dark due to non-uniform brightness of the scan image caused by the limited lighting of the input apparatus 200.

Hereinafter, an input apparatus and a method of acquiring a scan image by using the input apparatus according to another embodiment will be described in detail with reference to FIGS. 30 to 32.

Figure 30:
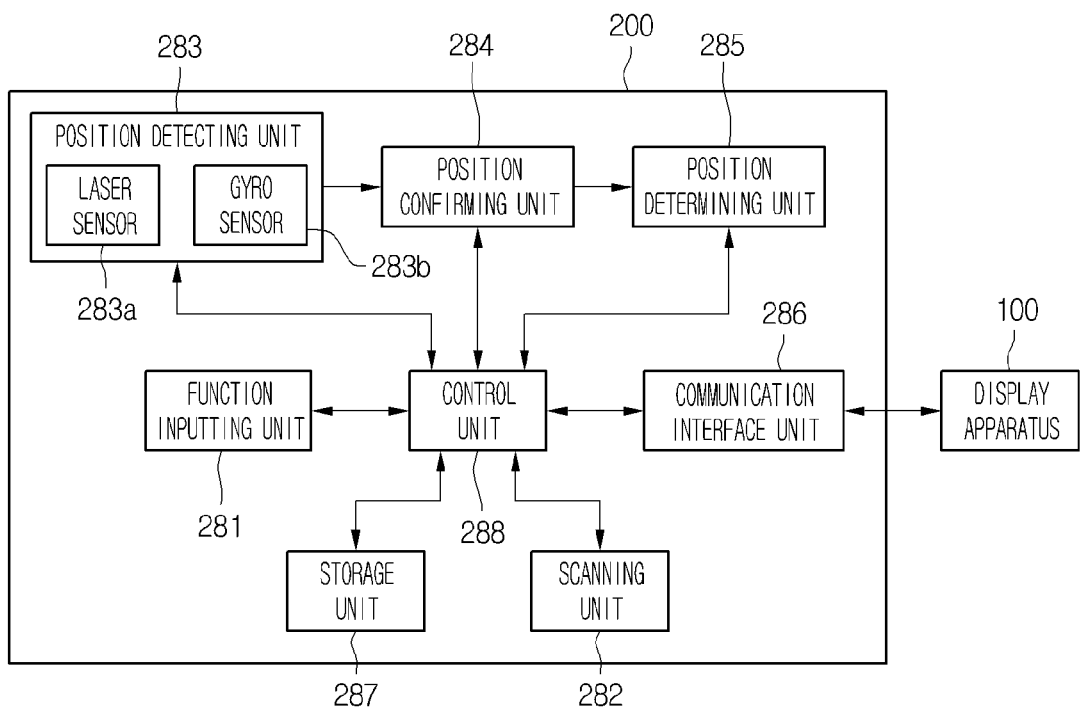
FIG. 30 is a block diagram showing another example input apparatus.
Figure 31:
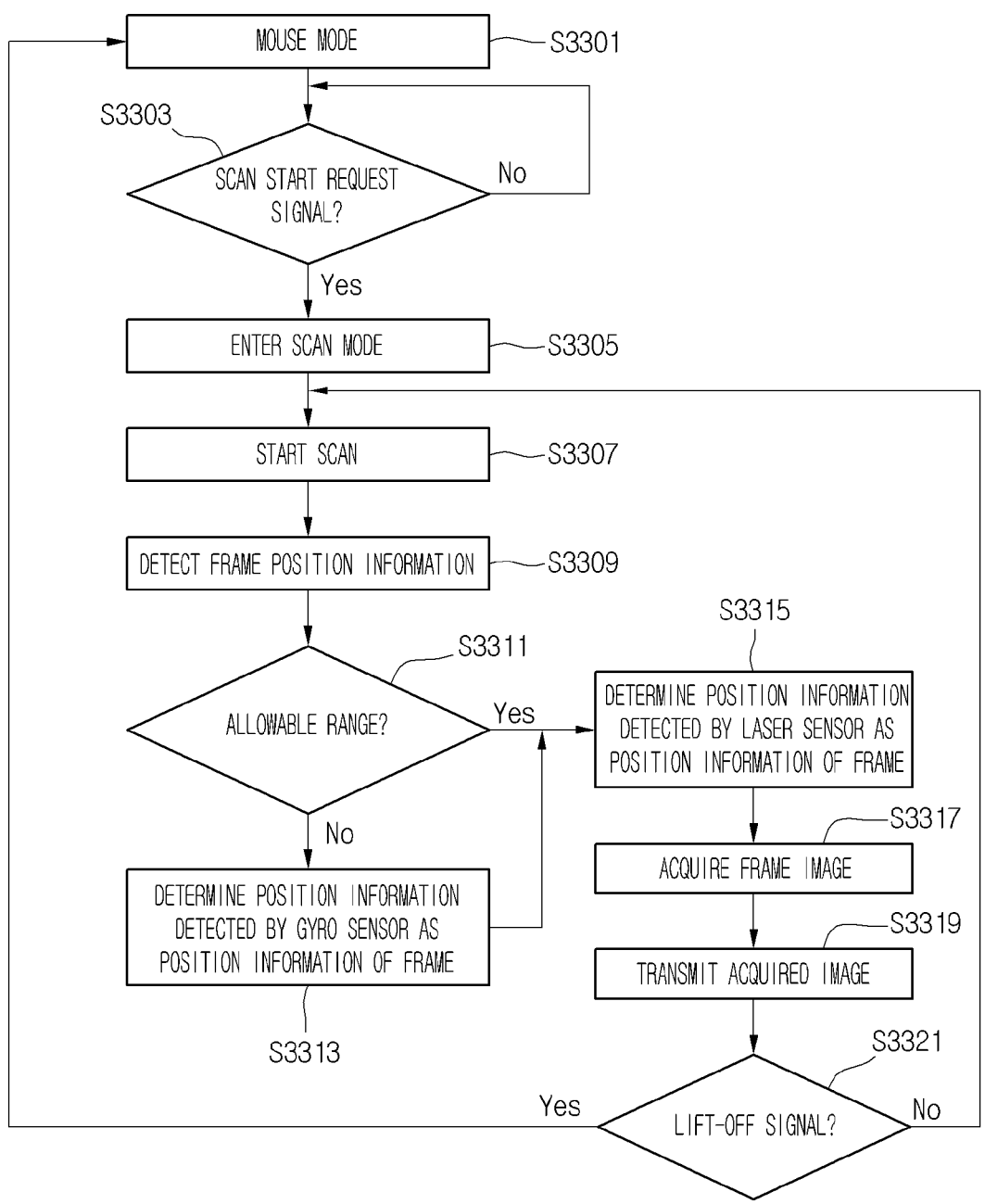
FIG. 31 is a flowchart showing an example method for acquiring a scan image.
Figure 32:
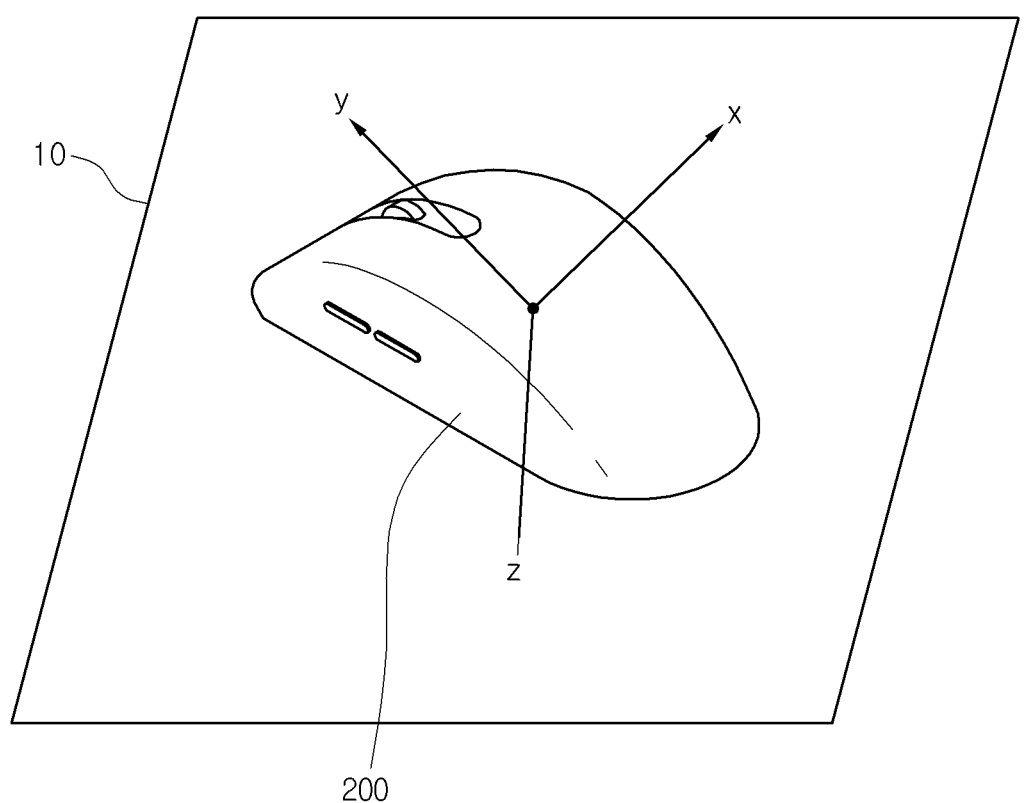
FIG. 32 is a view showing a principle of a gyro sensor.
Figure 33:
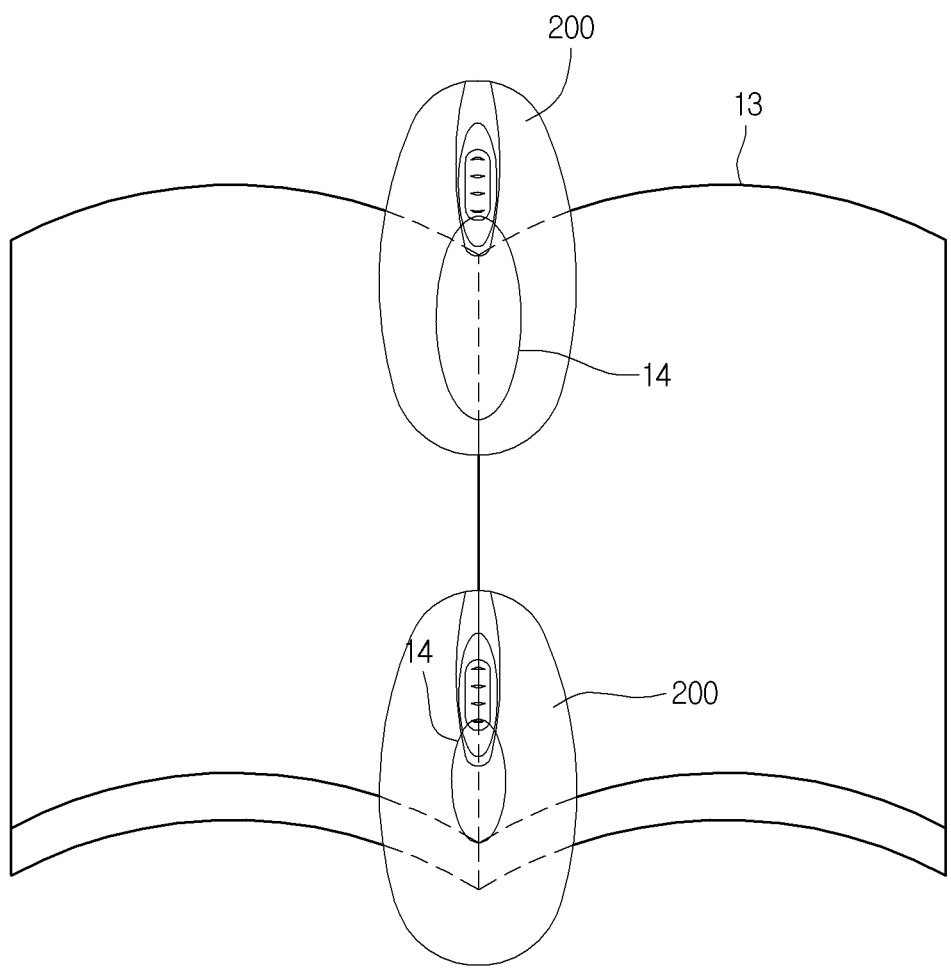
FIG. 33 is a view showing a procedure for acquiring an image of a scan target object by using another example input apparatus.

FIG. 30 is a block diagram of another example input apparatus, FIG. 31 is a flowchart showing an example method for acquiring a scan image, FIG. 32 is a view showing a principle of a gyro sensor and FIG. 33 is a view showing a procedure for acquiring an image of a scan target object by using another example input apparatus.

Referring to FIG. 30, the input apparatus 200 may include a function inputting unit 281, a scanning unit 282, a position detecting unit 283, a position confirming unit 284, a position determining unit 285, a communication interface unit 286, a storage unit 287, and a control unit 288.

The function inputting unit 281 may receive an input signal to perform an operation corresponding to a specific function of the input apparatus 200. That is, if the function inputting unit 281 receives an input signal that requests the operation of a mouse mode or a scan mode, the input apparatus 200 may enter the corresponding operation mode. The function inputting unit 281 may include a scanner function selecting button, a wheel button, and left and right buttons located to the left and right about the wheel button.

The scanning unit 282 may acquire scan images corresponding to predetermined areas of the scan target object by radiating light to the predetermined areas of the scan target object and detecting light reflected therefrom. In this case, a unit screen of the acquired scan image may signify the frame.

The position detecting unit 283 may detect position of the frame serving as the unit screen of the image of the scan target object. According to one embodiment, the position detecting unit 283 may include a laser sensor 283a and a gyro sensor 283b.

The laser sensor 283a can detect position information of the frame by radiating light to the scan target object and detecting light reflected therefrom.

The gyro sensor 283b can detect position information of the frame by using the rotational angle of an object about one axis of the input apparatus 200.

The gyro sensor 283b can measure the angular velocity according to the movement of the input apparatus 200. The measured angular velocity may be used for increasing or reducing the frame rate, which will be described later.

The position detecting unit 283 can detect position information of the frame by using both of the laser sensor 283a and the gyro sensor 283b.

The laser sensor 283a may be spaced apart from the gyro sensor 283b by a predetermined distance.

The position confirming unit 284 can confirm whether the position information of the frame detected by the laser sensor 283a is within an allowable range. The allowable range may signify the position range required for the input apparatus 200 to normally acquire the image of the scan target object. That is, the position confirming unit 284 compares the position information of the latest frame with the position information of the previous frame, which is detected just before the latest frame, to confirm whether the position information of the latest frame is within the allowable range.

If the position information of the frame detected by the laser sensor 283a is out of the allowable range, the position determining unit 285 may determine the position information detected by the gyro sensor 283b as the position information of the frame.

In addition, if the position information of the frame detected by the laser sensor 283a is within the allowable range, the position determining unit 285 may determine the position information detected by the laser sensor 283a as the position information of the frame.

The communication interface unit 286 may transmit the image of the scan target object, which is acquired based on the position information of the frame, to the external apparatus (e.g., display apparatus 100).

When the communication interface unit 286 performs wired communication with the external apparatus, the communication interface unit 286 may be constituted by a serial, a PS/2, a USB, and the like and when the communication interface unit 286 performs wireless communication with the external apparatus, the communication interface unit 286 may be constituted by radio frequency identification (RFID), infrared data association (IrDA), ultra wideband (UWB), zigbee, digital living network alliance (DLNA), and the like.

The storage unit 287 stores the position information of the frame detected by the laser sensor 283a or the gyro sensor 283b. The storage unit 287 may store the angular velocity of the input apparatus 200 measured by the gyro sensor 283b and the frame rate corresponding to the angular velocity.

The control unit 288 may control general operations of the input apparatus 200. The operation of the control unit 288 will be described later in detail.

Referring to FIG. 31, at first, the input apparatus 200 operates in the mouse mode (S3301). The mouse mode is performed to control the operation of the display apparatus, in which a command is selected or a program is executed by using a cursor that moves corresponding to the input apparatus 200 moving on a surface of a desk.

Then, the input apparatus 200 receives a scan start request signal (S3303).

According to one embodiment, the scan start request signal may be received through the scanner function selecting button 241 described with reference to FIG. 2A. That is, if the user presses the scanner function selecting button 241 one time, the mode of the input apparatus 200 may be changed from the mouse mode to the scan mode. The scan mode is performed to acquire the scan image through the pixel of the scan target object received by radiating the light.

Although the scan start request signal can be generated through the scanner function selecting button 241, the disclosure is not limited thereto, but the scan start request signal can be generated in various ways by selecting a specific application in the display apparatus.

Upon receiving the scan start request signal, the input apparatus 200 enters the scan mode (S3305).

Then, the input apparatus 200 scans the scan target object by receiving external force capable of moving the input apparatus 200 (S3307). The external force capable of moving the input apparatus 200 may be applied to the input apparatus 200 from the user, but the disclosure is not limited thereto.

The input apparatus 200 can acquire the scan image of the scan target object through the scanning unit 282. The scanning unit 282 may acquire the scan images corresponding to predetermined areas of the scan target object by radiating light to the predetermined areas of the scan target object and detecting light reflected therefrom.

According to one embodiment, as shown in FIG. 2B, the scan area of the scanning unit 282 may have a rectangular shape, but the disclosure is not limited thereto. That is, the scan area may have various shapes.

The scan target object represents an object containing information which the user intends to input/store in the input apparatus 200 and may include a document in which characters, figures, and the like are displayed. Further, the predetermined area of the scan target object represents a two-dimensional (2D) area having a predetermined area unlike the existing line scan area.

The input apparatus 200 may detect the position information of the frame through the position detecting unit 283 (S3309). The frame may signify the unit screen of the scan target object scanned through the input apparatus 200. According to one embodiment, the position detecting unit 283 can detect the position information of the frame using at least one laser sensor 283*a*. In detail, the laser sensor 283*a* radiates the laser beam to the scan target object to detect the position information of the frame by using the light reflected therefrom. The laser sensor 283*a* may detect the position information of the frame by detecting the coordinates corresponding to the pixels constituting the frame. The laser sensor 283*a* may detect the position information of the frame by detecting only the central coordinate and edge coordinates of the frame.

The laser sensor 283*a* can detect only the central coordinate and edge coordinates of the frame. According to one embodiment, if the scan area of the input apparatus 200 has a rectangular shape, the frame may also have a rectangular shape and the edge coordinates of the frame may be four vertex coordinates of the rectangular shape, which will be described below with reference to FIG. 27.

FIG. 27 shows a scan target object 10 and one frame 30 corresponding to the scan area, which is currently scanned by the input apparatus 200. Edges of the frame are denoted as A, B, C and D and the center of the frame is denoted as E. In this case, the edge coordinates and the central coordinate of the frame may be expressed as A(x1, y1), B(x2, y2), C(x3, y3), D(x4, y4) and E(x5, y5), respectively.

The laser sensor 283*a* may detect the position information of the frame by detecting the central coordinate E(x5, y5) and edge coordinates A(x1, y1), B(x2, y2), C(x3, y3) and D(x4, y4) of the frame. According to one embodiment, since the frame has the regular size, the laser sensor 283*a* may detect the position information of the frame by detecting only the central coordinate E(x5, y5).

According to another embodiment, the position detecting unit 283 may detect the position information of the frame by using the gyro sensor 283*b*. The gyro sensor 283 indicates the rotational angle of the object about one axis as a numerical value by measuring the angular velocity of the object while the object is moving. The principle of the gyro sensor 283*b* will be described in detail with reference to FIG. 31.

Referring to FIG. 32, when the input apparatus 200 scans the scan target object 10, the gyro sensor detects the angular velocity of the scan target object 10 to detect the movement of the input apparatus 200. As shown in FIG. 32, the gyro sensor can detect the position information of the frame by detecting the movement of the input apparatus 200 in the x-axis direction, y-axis direction vertical to the x-axis direction and z-axis direction vertical to the x-axis direction and y-axis direction.

Referring again to FIG. 30, the gyro sensor 283*b* may be spaced apart from the laser sensor 283*a* by a predetermined distance.

According to one embodiment, the input apparatus 200 can detect position information of the frame by using both of the laser sensor 283*a* and the gyro sensor 283*b*.

The position confirming unit 284 checks whether the position information of the frame detected by the laser sensor 283*a* is within an allowable range (S3311). The allowable range may signify the position range required for the input apparatus 200 to normally acquire the image of the scan target object. That is, the position confirming unit 284 compares the position information of the latest frame with the position information of the previous frame, which is detected just before the latest frame, to confirm whether the position information of the latest frame is within the allowable range.

If the position information of the frame detected by the laser sensor 283*a* is out of the allowable range, the position determining unit 285 may determine the position information detected by the gyro sensor 283*b* as the position information of the frame (S3313). In other words, if it is determined that the position information of the frame detected by the laser sensor 283*a* is not accurate, the position determining unit 285 may determine the position information detected by the gyro sensor 283*b*, other than the laser sensor 283*a*, as the position information of the frame.

In detail, as shown in FIG. 33, when the user scans a book 13 by using the input apparatus 200, the laser sensor 283 may not acquire the accurate position information of the frame from a folding part 14 of the book 13. If the input apparatus 200 is located at the folding part 14 of the book 13, since the book 13, which is the scan target object, is spaced apart from the input apparatus 200 by a predetermined distance, the laser sensor 283*a* cannot detect the accurate position information of the frame based on the laser beam radiated to and reflected from the scan target object or cannot detect the position information of the frame.

That is, according to the embodiment, if it is determined that the position information detected by the laser sensor 283*a* is inaccurate or the laser sensor 283*a* cannot detect the position information of the frame, the position information detected by the gyro sensor 283*b* is determined as the position information of the frame so that the image of the scan target object can be stably acquired.

In addition, unlike the related art using two laser sensors 283*a* arranged at a predetermined interval, the embodiment adopts only one laser sensor 283*a*, so the size of the input apparatus 200 may not be limited when designing the input apparatus 200.

The description will be made by referring again to FIG. 30.

If the position information of the frame detected by the laser sensor 283*a* is within the allowable range, the position determining unit 285 determines the position information detected by the laser sensor 283*a* as the position information of the frame (S3315).

After that, the input apparatus 200 acquires the scan image corresponding to the frame based on the position information of the frame (S3317) and transmits the acquired scan image to the display apparatus 100 (S3319).

Meanwhile, the gyro sensor 283*b* may check whether the lift-off signal is generated (S3321). The lift-off signal may be generated when the input apparatus 200 is spaced apart from the scan target object by a predetermined distance T or more. The predetermined distance T may be 1 mm, but this is illustrative purpose only.

If it is determined that the lift-off signal is generated, the input apparatus 200 operates in the mouse mode (S3301).

In addition, if it is determined that the lift-off signal is not generated, the input apparatus 200 operates in the scan mode to perform the scan operation.

Hereinafter, a method of adjusting the frame rate of the input apparatus 200 according to another embodiment will be described with reference to FIG. 34.

Figure 34:
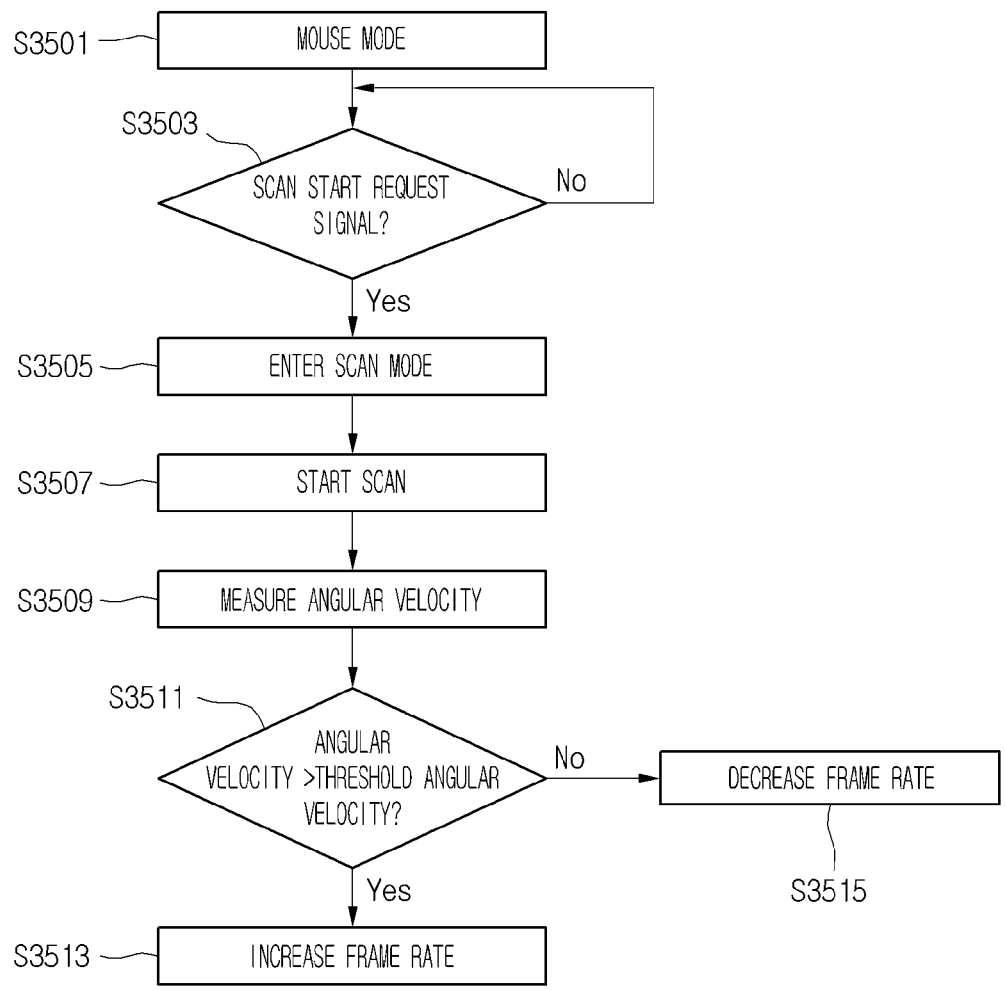
FIG. 34 is a flowchart showing an example method for adjusting a frame rate of an input apparatus.

FIG. 34 is a flowchart showing an example method for adjusting the frame rate of the input apparatus 200.

Referring to FIG. 34, the input apparatus 200 operates in the mouse mode (S3501). The mouse mode is performed to control the operation of the display apparatus, in which a command is selected or a program is executed by using a cursor that moves corresponding to the input apparatus 200 moving on a surface of a desk.

Then, the input apparatus 200 receives a scan start request signal (S3503).

Although the scan start request signal can be generated through the scanner function selecting button 241 described with reference to FIG. 2A, the disclosure is not limited thereto, but the scan start request signal can be generated in various ways by selecting a specific application in the display apparatus.

Upon receiving the scan start request signal, the input apparatus 200 enters the scan mode (S3505).

Then, the input apparatus 200 scans the scan target object by receiving external force capable of moving the input apparatus 200 (S3507). The external force capable of moving the input apparatus 200 may be applied to the input apparatus 200 from the user, but the disclosure is not limited thereto.

The gyro sensor 283b measures the angular velocity of the input apparatus 200 (S3509). That is, the gyro sensor 283b can measure the angular velocity according to the movement of the input apparatus 200 when the input apparatus 200 moves to scan the scan target object.

The control unit 288 checks whether the measured angular velocity exceeds the threshold angular velocity. According to one embodiment, the threshold angular velocity may be a reference value to increase or reduce the frame rate. In addition, the frame rate is an index representing the number of digital image signals that are converted from the images acquired by the input apparatus 200 per second. In detail, if the frame rate is 60, the image focused on an imaging device is photographed 60 times per second to convert the image into the digital image signals.

If the measured angular velocity exceeds the threshold angular velocity, the control unit 288 increases the frame rate of the input apparatus 200 (S3513). Thus, since the frame rate is increased, the image of the scan target object can be stably acquired even if the angular velocity of the input apparatus 200 is increased. The frame rate may be increased corresponding to the measured angular velocity. In detail, the storage unit 287 may store the angular velocity and the frame rate corresponding to the angular velocity, and the control unit 288 may control the input apparatus 200 to have the frame rate corresponding to the angular velocity by searching for the storage unit 287.

If the measured angular velocity does not exceed the threshold angular velocity, the control unit 288 reduces the frame rate of the input apparatus 200 (S3515). That is, the frame rate is reduced as the angular velocity of the input apparatus 200 is reduced, so that the memory capacity of the input apparatus 200 can be effectively used. The frame rate may be reduced corresponding to the measured angular velocity. In detail, the storage unit 287 may store the angular velocity and the frame rate corresponding to the angular velocity, and the control unit 288 may control the input apparatus 200 to have the frame rate corresponding to the angular velocity by searching for the storage unit 287.

Hereinafter, an input apparatus and a control method thereof according to another embodiment will be described with reference to FIGS. 35 to 38.

If necessary, the description about FIGS. 1 to 34 will be incorporated in the description of the input apparatus and the control method thereof according to another embodiment.

Figure 35:
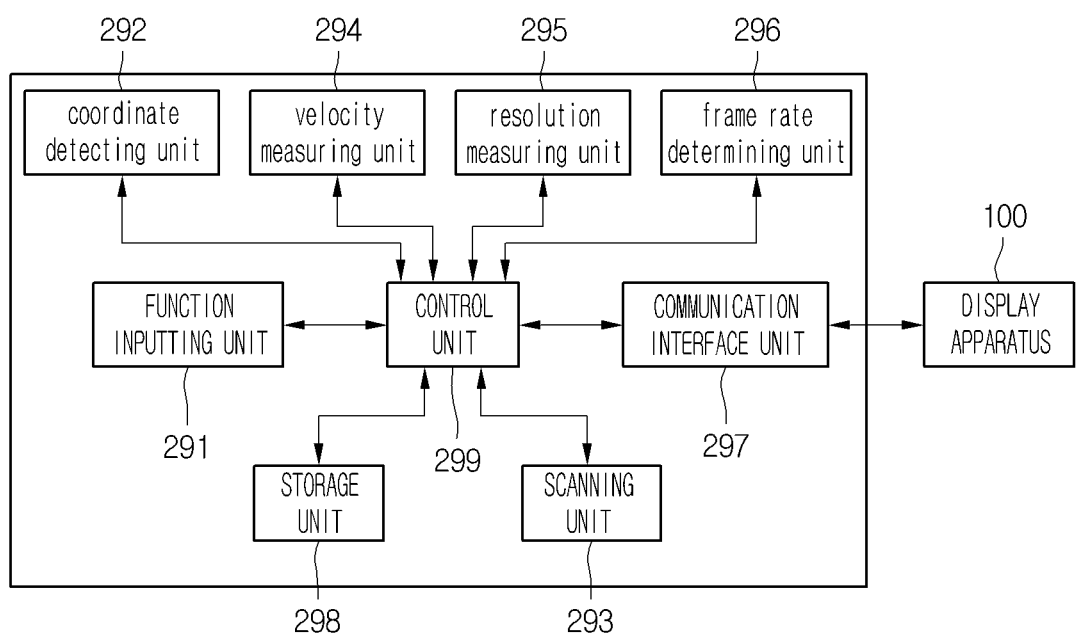
FIG. 35 is a block diagram showing another example input apparatus.
Figure 36:
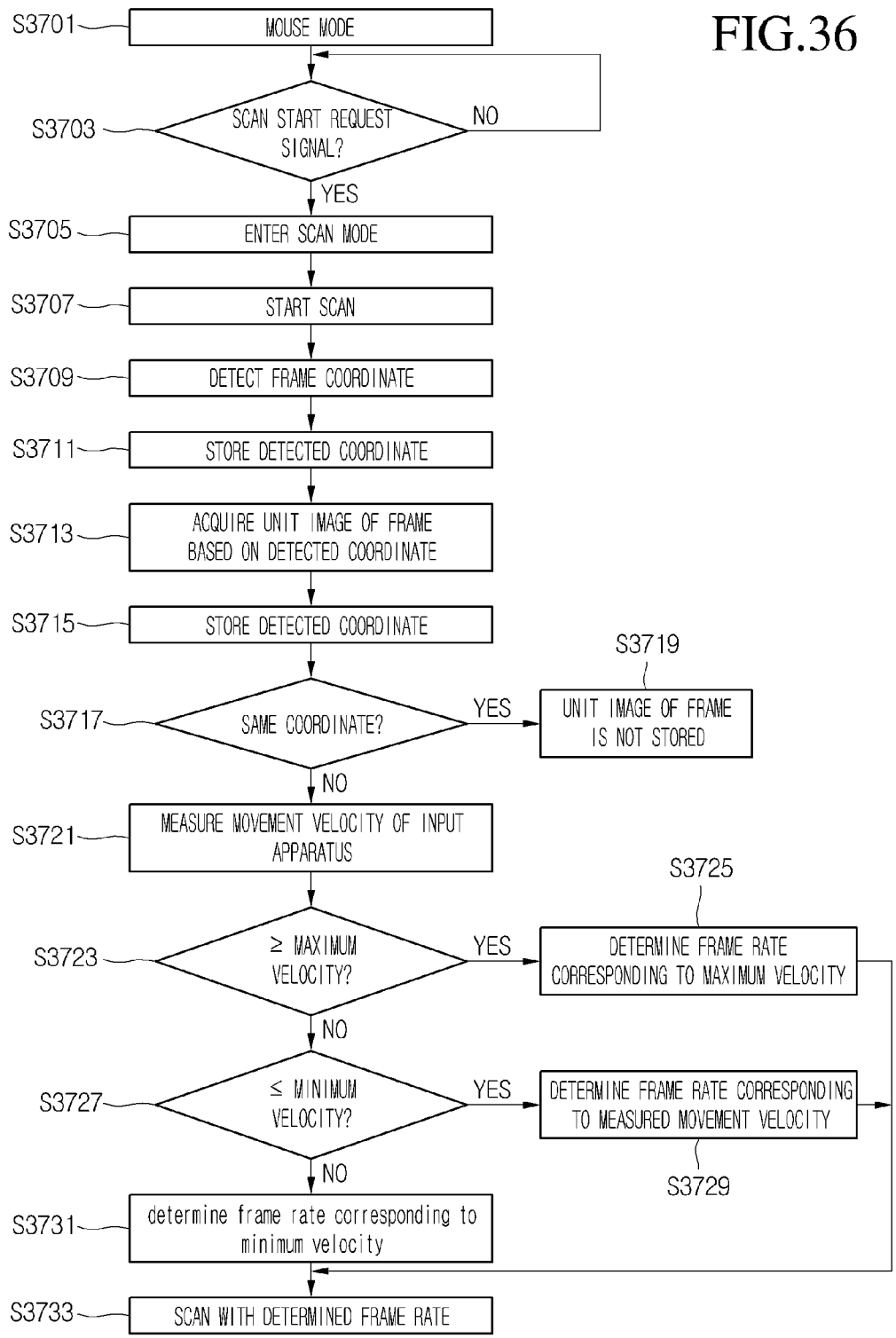
FIG. 36 is a flowchart showing an example method for controlling an input apparatus.
Figure 37:
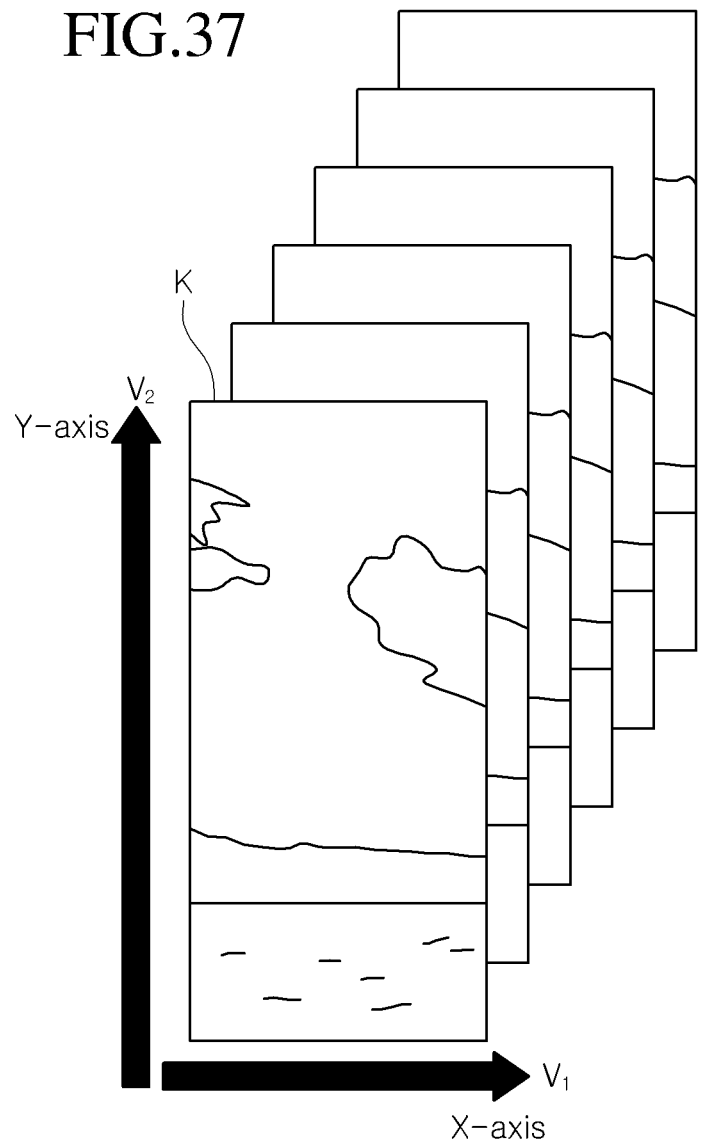
FIG. 37 is a view showing a procedure for measuring a movement velocity of an input apparatus.

FIG. 35 is a block diagram showing another example input apparatus, FIG. 36 is a flowchart showing an example method for controlling the input apparatus, FIG. 37 is a view showing a procedure for measuring a movement velocity of the input apparatus, and FIG. 38 is a view to explain an algorithm code for implementing the method for controlling the example input apparatus.

Referring to FIG. 35, the input apparatus 200 may include a function inputting unit 291, a coordinate detecting unit 292, a scanning unit 293, a velocity measuring unit 294, a resolution measuring unit 295, a frame rate determining unit 296, a communication interface unit 297, a storage unit 298 and a control unit 299.

The function inputting unit 291 may receive an input signal to perform an operation corresponding to a specific function of the input apparatus 200. That is, if the function inputting unit 291 receives an input signal that requests the operation of a mouse mode or a scan mode, the input apparatus 200 may enter the corresponding operation mode. The function inputting unit 291 may include a scanner function selecting button, a wheel button, and left and right buttons located to the left and right about the wheel button.

The coordinate detecting unit 292 can detect the coordinates of the frame. According to one embodiment, the coordinate detecting unit 292 may detect the coordinates of the frame by using the laser sensor, but the disclosure is not limited thereto. The procedure for detecting the coordinates of the frame will be described later.

The scanning unit 293 may acquire scan images corresponding to the predetermined areas of the scan target object based on the detected coordinates of the frame.

In detail, the scanning unit 293 may acquire the scan images corresponding to the predetermined areas of the scan target object by radiating light to the predetermined areas of the scan target object and detecting light reflected therefrom. In this case, a unit screen of the acquired scan image may signify the frame.

The velocity measuring unit 294 can measure the movement velocity of the input apparatus 200. According to one embodiment, the velocity measuring unit 294 can measure the movement velocity of the input apparatus 200 by using a velocity sensor. According to another embodiment, the velocity measuring unit 294 can measure the movement velocity of the input apparatus 200 by using an acceleration sensor.

The resolution measuring unit 295 can measure the resolution of the scan image acquired through the scanning unit 293.

The frame rate determining unit 296 can determine the frame rate according to the measured movement velocity of the input apparatus 200. The storage unit 298, which will be described later in more detail, may store the movement velocity and the frame rate corresponding to the movement velocity of the input apparatus 200 in the form of a lookup table, and the frame rate determining unit 296 can determine the frame rate corresponding to the movement velocity of the input apparatus 200 by searching for the storage unit 298.

The frame rate determining unit 296 can determine the frame rate based on the measured resolution of the scan image, which will be described later in more detail.

The communication interface unit 297 may transmit the image of the scan target object, which is acquired based on the detected coordinates of the frame, to the external apparatus (e.g., display apparatus 100).

When the communication interface unit 297 performs wired communication with the external apparatus, the communication interface unit 297 may be constituted by a serial, a PS/2, a USB, and the like and when the communication interface unit 297 performs wireless communication with the external apparatus, the communication interface unit 297 may be constituted by radio frequency identification (RFID), infrared data association (IrDA), ultra wideband (UWB), zigbee, digital living network alliance (DLNA), and the like.

The storage unit 298 may store the coordinate data of the frame, the unit image of the scan target object corresponding to the coordinate data and the resolution of the unit image.

In particular, the storage unit 298 may store the movement velocity of the input apparatus 200 and the frame rate corresponding to the movement velocity of the input apparatus 200 in the form of a lookup table.

The control unit 299 may control general operations of the input apparatus 200. The control unit 299 may correspond to the control unit 210 described with reference to FIG. 1.

Hereinafter, the control method for the input apparatus according to one embodiment will be described with reference to FIGS. 35 and 36.

Referring to FIG. 36, at first, the input apparatus 200 operates in the mouse mode (S3701). The mouse mode is performed to control the operation of the display apparatus, in which a command is selected or a program is executed by using a cursor that moves corresponding to the input apparatus 200 moving on a surface of a desk.

Then, the function input unit of the input apparatus 200 receives a scan start request signal (S3703).

According to one embodiment, the scan start request signal may be received through the scanner function selecting button 241 described with reference to FIG. 2A. That is, if the user presses the scanner function selecting button 241 one time, the mode of the input apparatus 200 may be changed from the mouse mode to the scan mode. The scan mode is performed to acquire the scan image through the pixel of the scan target object received by radiating the light.

Although the scan start request signal can be generated through the scanner function selecting button 241, the disclosure is not limited thereto, but the scan start request signal can be generated in various ways by selecting a specific application in the display apparatus.

Upon receiving the scan start request signal, the input apparatus 200 enters the scan mode (S3705). The scan mode is performed to control the operation of the input apparatus. In detail, if the input apparatus 200 moves on the surface of the scan target object, the image of the scan target object can be acquired according to the movement of the input apparatus 200 in the scan mode.

Then, the input apparatus 200 scans the scan target object by receiving external force capable of moving the input apparatus 200 (S3707). The external force capable of moving the input apparatus 200 may be applied to the input apparatus 200 from the user, but the disclosure is not limited thereto.

According to one embodiment, as shown in FIG. 2B, the scan area 211 may have a rectangular shape, but the disclosure is not limited thereto.

The scan target object represents an object containing information which the user intends to input/store in the input apparatus 200 and may include a document in which characters, figures, and the like are displayed. Further, the predetermined area of the scan target object represents a two-dimensional (2D) area having a predetermined area unlike the existing line scan area.

The coordinate detecting unit 292 of the input apparatus 200 detects the coordinates of the frame (S3709). According to one embodiment, the frame may signifies a unit screen of the scan target object corresponding to the scan area 221 shown in FIG. 2B. According to one embodiment, the coordinate detecting unit 292 may detect the central coordinate and the edge coordinates of the frame. If the scan area 211 has a rectangular shape as shown in FIG. 2B, the frame may also have a rectangular shape. In this case, the central coordinate of the frame is a central coordinate of the rectangular shape and the edge coordinates of the frame may be four vertex coordinates of the rectangular shape.

According to one embodiment, the coordinate detecting unit 292 may detect the coordinates of the frame by using the laser sensor, but the disclosure is not limited thereto. The laser sensor can detect the coordinates by radiating laser beam to the scan target object and detecting the light reflected therefrom.

The method for detecting the coordinates of the frame has been described with reference to FIG. 27, so the detailed description thereof will be omitted.

The storage unit 298 of the input apparatus 200 stores the detected coordinates (S3711). The storage unit 298, for example, may include at least one type of storage medium of a flash memory type, a hard disk type, a multimedia card micro type, a card type memory (e.g., an SD or XD memory, or the like), a RAM, and a ROM (EEPROM, or the like).

The scanning unit 293 of the input apparatus 200 acquires the unit image of the scan target object corresponding to the frame based on the detected coordinates (S3713).

The storage unit 298 of the input apparatus 200 stores the acquired unit image (S3715).

The control unit 299 of the input apparatus 200 checks whether the same coordinate of the frame is detected in the scan process (S3717).

If it is determined that the same coordinate of the frame is detected, the control unit 299 of the input apparatus 200 may not store the unit image of the scan target object, which is based on the corresponding coordinate of the frame (S3719). That is, when the same coordinate of the frame is detected, the unit image of the scan target object, which is based on the corresponding coordinate of the frame, may not be stored to prevent the capacity of the storage unit from being unnecessarily wasted. Referring to algorithm code of FIG. 38, during the scan mode of the input apparatus 200, the input apparatus 200 stores the detected coordinates of the frame in a buffer and, if the same coordinate of the frame is detected, the input apparatus 200 may not store the unit image of the scan target object, which is based on the corresponding coordinate of the frame, as expressed below.

```
while(Scan mode( )){
  Buffer(Xi,Yj)=InputImage(x,y);
  if(Buffer(Xi,Yj) == InputImage(x,y)){
  NotSaveAsChangedImage(ROI); }
```

If the same coordinate of the frame is not detected, the velocity measuring unit 294 of the input apparatus 200 measures the movement velocity of the input apparatus 200 (S3721). According to one embodiment, the velocity measuring unit 294 can measure the movement velocity of the input apparatus 200 by using a velocity sensor. According to another embodiment, the velocity measuring unit 294 can measure variation in the movement velocity of the input apparatus 200 by using an acceleration sensor.

If it is determined that the same coordinate of the frame is not detected, step S3721 may be performed after steps S3709 to S3715.

As shown in FIG. 37, the movement velocity of the input apparatus 200 may signify the average velocity between the movement velocity v1 in the x-axis direction and the movement velocity v2 in the y-axis direction when the input apparatus 200 scans the unit image K of the scan target object.

Referring again to FIG. 36, the control unit 399 of the input apparatus 200 checks whether the movement velocity of the input apparatus 200 is equal to or higher than a predetermined maximum velocity (S3723).

If the movement velocity of the input apparatus 200 is equal to or higher than the predetermined maximum velocity, the frame rate determining unit 296 of the input apparatus 200 determines the frame rate corresponding to the maximum velocity as the frame rate of the input apparatus (S3725). That is, the frame rate determining unit 296 may search for the frame rate corresponding to the maximum velocity from the storage unit 298 and may determine the searched frame rate as the frame rate of the input apparatus 200. The storage unit 298 may store the maximum velocity, the movement velocity and the frame rate corresponding to the movement velocity of the input apparatus 200 in the form of a lookup table.

If the frame rate is continuously increased according to the increase of the movement velocity of the input apparatus 200, the memory capacity may be significantly wasted. For this reason, the frame rate corresponding to the maximum velocity is determined as the frame rate of the input apparatus 200 when the movement velocity of the input apparatus 200 is equal to or higher than the predetermined maximum velocity.

The frame rate may signify the photographing frequency for the scan target object per second. The frame per second (fps) is used as a unit of the frame rate. That is, if the frame rate is 30 fps, the input apparatus 200 photographs the scan target object for 30 times per second and converts the image into the digital signals. If the frame rate is 60 fps, the data capacity is increased twice as compared with the frame rate 30 fps.

Referring to the algorithm code shown in FIG. 38, the frame rate corresponding to the maximum velocity may be found in the instruction MaxFrameRate=30; and the frame rate has the value of 30 fps. The 30 fps is illustrative purpose only.

In addition, step S3725 can be performed through the following instructions.

```
else if(FrameRate>MaxFrameRate)
    FramteRate=MaxFramteRate;
```

Meanwhile, the control unit 299 of the input apparatus 200 checks whether the measured movement velocity of the input apparatus 200 is equal to or less than a predetermined minimum velocity (S3727).

If the measured movement velocity of the input apparatus 200 is equal to or less than the predetermined minimum velocity, the frame rate determining unit 296 of the input apparatus 200 determines the frame rate corresponding to the minimum velocity as the frame rate of the input apparatus (S3729). Referring to the algorithm code shown in FIG. 38, the frame rate corresponding to the minimum velocity may be found in the instruction FixedFrameRate=5; and the frame rate has the value of 5 fps. The 5 fps is illustrative purpose only.

In addition, step S3727 can be performed through the following instructions.

```
if(FrameRate<FixedFrameRate)
    FrameRate=FixedFrameRate( );
```

That is, the frame rate determining unit 296 may search for the frame rate corresponding to the minimum velocity from the storage unit 298 and may determine the searched frame rate as the frame rate of the input apparatus 200.

Referring again to FIG. 36, if the movement velocity of the input apparatus 200 is equal to or higher than the predetermined minimum velocity, the frame rate determining unit 296 of the input apparatus 200 determines the frame rate corresponding to the measured movement velocity as the frame rate of the input apparatus (S3731). That is, the input apparatus 200 may search for the frame rate corresponding to the movement velocity of the input apparatus 200 from the storage unit 298 and may determine the searched frame rate as the frame rate of the input apparatus 200.

Referring to the algorithm code shown in FIG. 38, it can be found that the frame rate is adjusted according to the movement velocity of the input apparatus 200. In detail, the frame rate is increased as the movement velocity of the input apparatus 200 is increased and the frame rate is reduced as the movement velocity of the input apparatus 200 is reduced. This can be understood from the following instructions.

```
for(;;){
    Case (S(InputImage(x,y)++):
    then Z++;
        Case (S(InputeImage(x,y)--);
        then Z--;
```

As described above, the memory capacity can be effectively used and the image of the scan target object can be stably acquired by adjusting the frame rate according to the movement velocity of the input apparatus 200. That is, the frame rate is reduced as the movement velocity of the input apparatus 200 is reduced and the frame rate is increased as the movement velocity of the input apparatus 200 is increased, thereby effectively managing the memory capacity.

After that, the input apparatus 200 scans the scan target object based on the determined frame rate (S3733).

Hereinafter, the control method for the input apparatus according to another embodiment will be described with reference to FIG. 39 in association with FIGS. 1 to 38.

Figure 39:
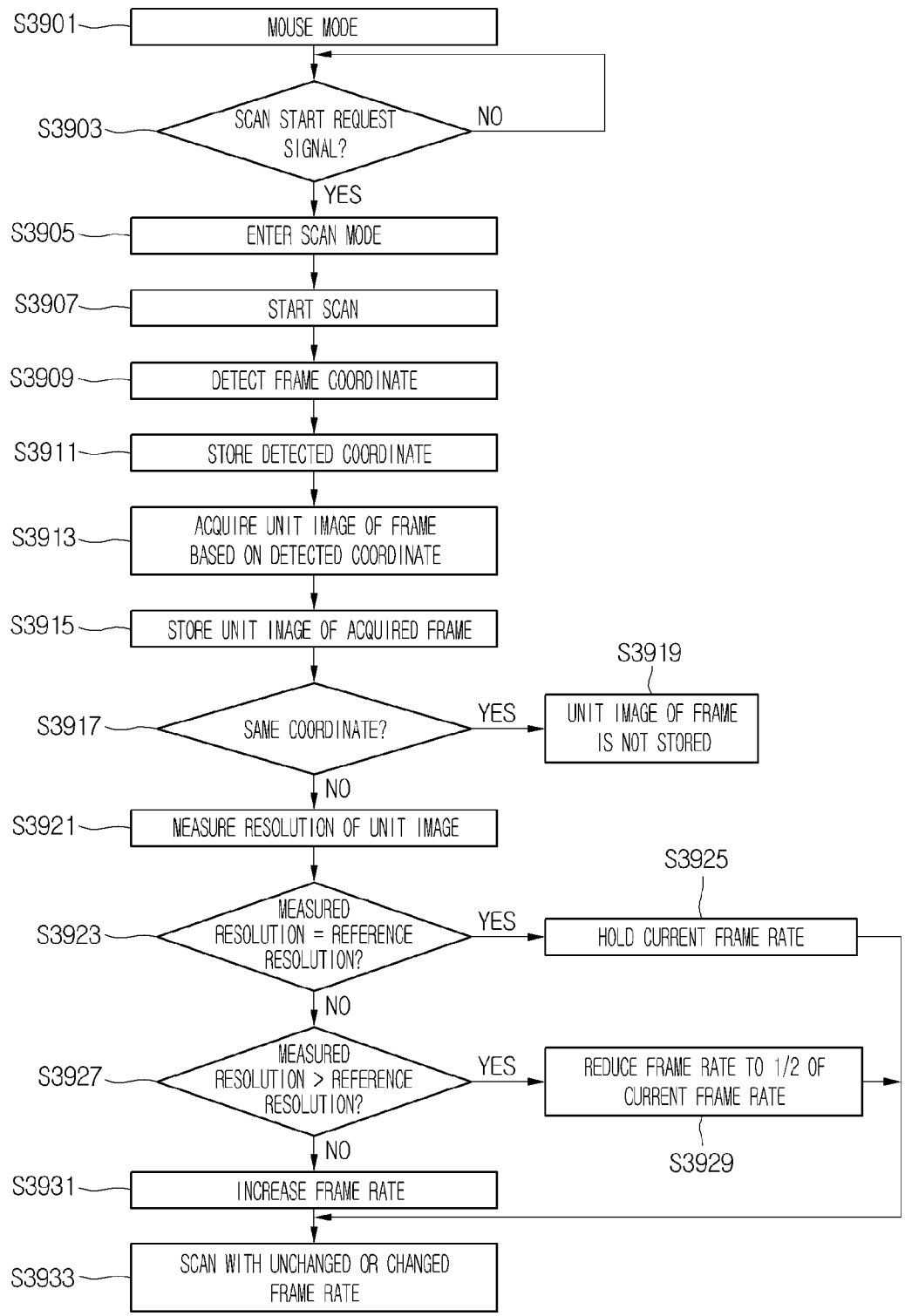
FIG. 39 is a flowchart showing an example method for controlling an input apparatus.

Referring to FIG. 39, at first, the input apparatus 200 operates in the mouse mode (S3901).

Then, the function input unit 291 of the input apparatus 200 receives the scan start request signal (S3903). The details of this step have been described above with reference to FIG. 38.

Upon receiving the scan start request signal, the input apparatus 200 enters the scan mode (S3905). The details of this step have been described above with reference to FIG. 38.

Then, the input apparatus 200 scans the scan target object by receiving external force capable of moving the input apparatus 200 (S3907). The details of this step have been described above with reference to FIG. 38.

The coordinate detecting unit 292 of the input apparatus 200 detects the coordinates of the frame (S3909). The details of this step have been described above with reference to FIG. 38.

The storage unit 298 of the input apparatus 200 stores the detected coordinates (S3911).

The scanning unit 293 of the input apparatus 200 acquires the unit image of the scan target object corresponding to the frame based on the detected coordinates (S3913).

The storage unit 298 of the input apparatus 200 stores the acquired unit image (S3915).

The control unit 299 of the input apparatus 200 checks whether the same coordinate of the frame is detected in the scan operation (S3917).

If the same coordinate of the frame is detected, the control unit 299 of the input apparatus 200 may not store the unit image of the scan target object, which is based on the corresponding coordinate of the frame (S3919).

If the same coordinate of the frame is not detected, the resolution measuring unit 295 of the input apparatus 200 measures the resolution of the stored unit image (S3921).

The resolution of the unit image may signify the index representing the accuracy of the image. In detail, the resolution of the unit image may signify the index notifying how many pixels or dots are used to express the image. The resolution of the unit image may be represented in the unit of DPI (dots per inch) which signifies the number of the pixels or dots contained in 1 inch (2.54 cm). Referring to the algorithm code shown in FIG. 38, the resolution of the unit image can be measured according to the following instructions.

```
DPI=EstimateDPI(CurrentFrame,Previous Recon-
    structedDPI);
```

The image quality shown in FIG. 38 may signify the resolution.

If it is determined that the same coordinate of the frame is not detected, step S3921 may be performed after steps S3909 to S3915.

Referring again to FIG. 39, the control unit 299 of the input apparatus 200 checks whether the measured resolution of the unit image is identical to the reference resolution (S3923).

If the measured resolution of the unit image is identical to the reference resolution, the control unit 299 of the input apparatus 200 holds the current frame rate (S3925). The current frame rate may be predetermined when the input apparatus 200 operates in the scan mode.

Referring to the algorithm code shown in FIG. 38, the frame rate can be adjusted according to the following instructions.

```
else if(DPI==CorrectDPI)
    FrameRate=FixedFrameRate( );
```

If the measured resolution of the unit image is not identical to the reference resolution, the control unit 299 of the input apparatus 200 checks whether the measured resolution of the unit image is higher than the reference resolution (S3927).

If the measured resolution of the unit image is higher than the reference resolution, the input apparatus 200 reduces the frame rate to the level of ½ based on the current frame rate (S3929).

Referring to the algorithm code shown in FIG. 38, the frame rate can be adjusted according to the following instructions.

```
if(DPI>CorrectDPI)
    FrameRate=FrameRate/2;
```

If the measured resolution of the unit image is lower than the reference resolution, the input apparatus 200 increases the frame rate (S3931).

Referring to the algorithm code shown in FIG. 38, the frame rate can be adjusted according to the following instructions.

```
else if(DPI<CorrectDPI)
    FrameRate=FrameRate+1;
```

As described above, the input apparatus 200 can effectively use the memory capacity and can stably acquire the image of the scan target object by adjusting the frame rate according to the resolution of the acquired unit image. That is, according to the control method for the input apparatus 200 of the embodiment, the frame rate is increased if the resolution of the acquired unit image is low to acquire the scan image having the reference resolution and the frame rate is reduced if the resolution of the acquired unit image is excessively high to prevent the waste of the memory capacity.

Then, the input apparatus 200 scans the scan target object based on the unchanged or changed (increased or reduced) frame rate (S3933).

Hereinafter, the control method for the input apparatus according to another embodiment will be described with reference to FIGS. 40 to 44.

In the following description, the description related to FIGS. 1 to 39 will be incorporated by reference.

Figure 40:
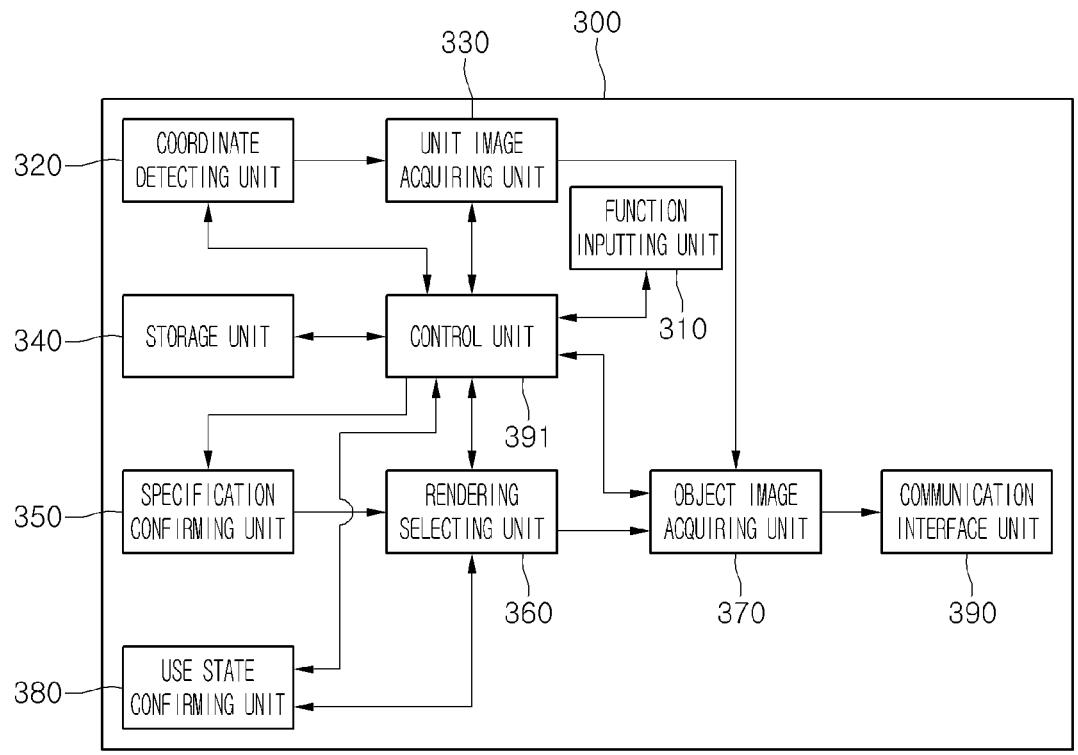
FIG. 40 is a block diagram showing another example input apparatus.
Figure 41:
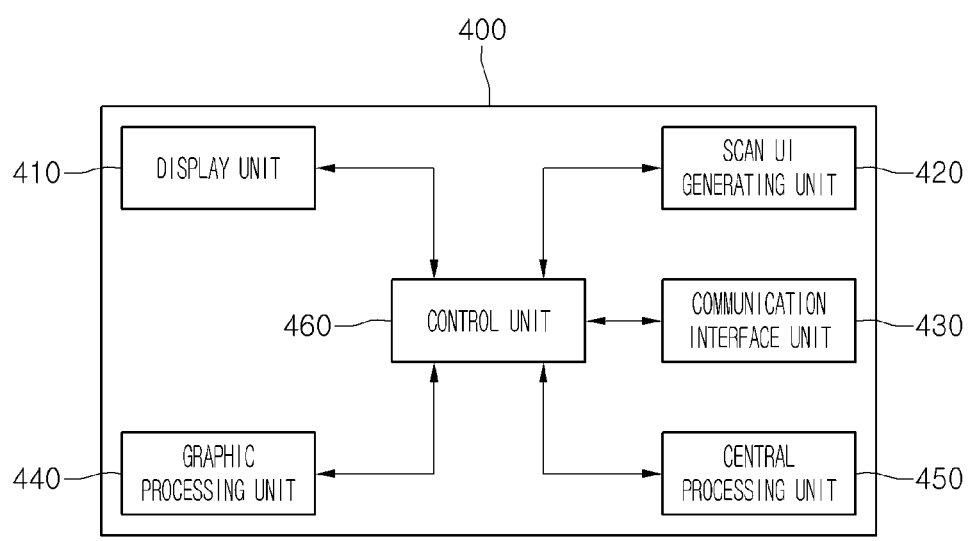
FIG. 41 is a block diagram showing a terminal to be connected to another example input apparatus.
Figure 42:
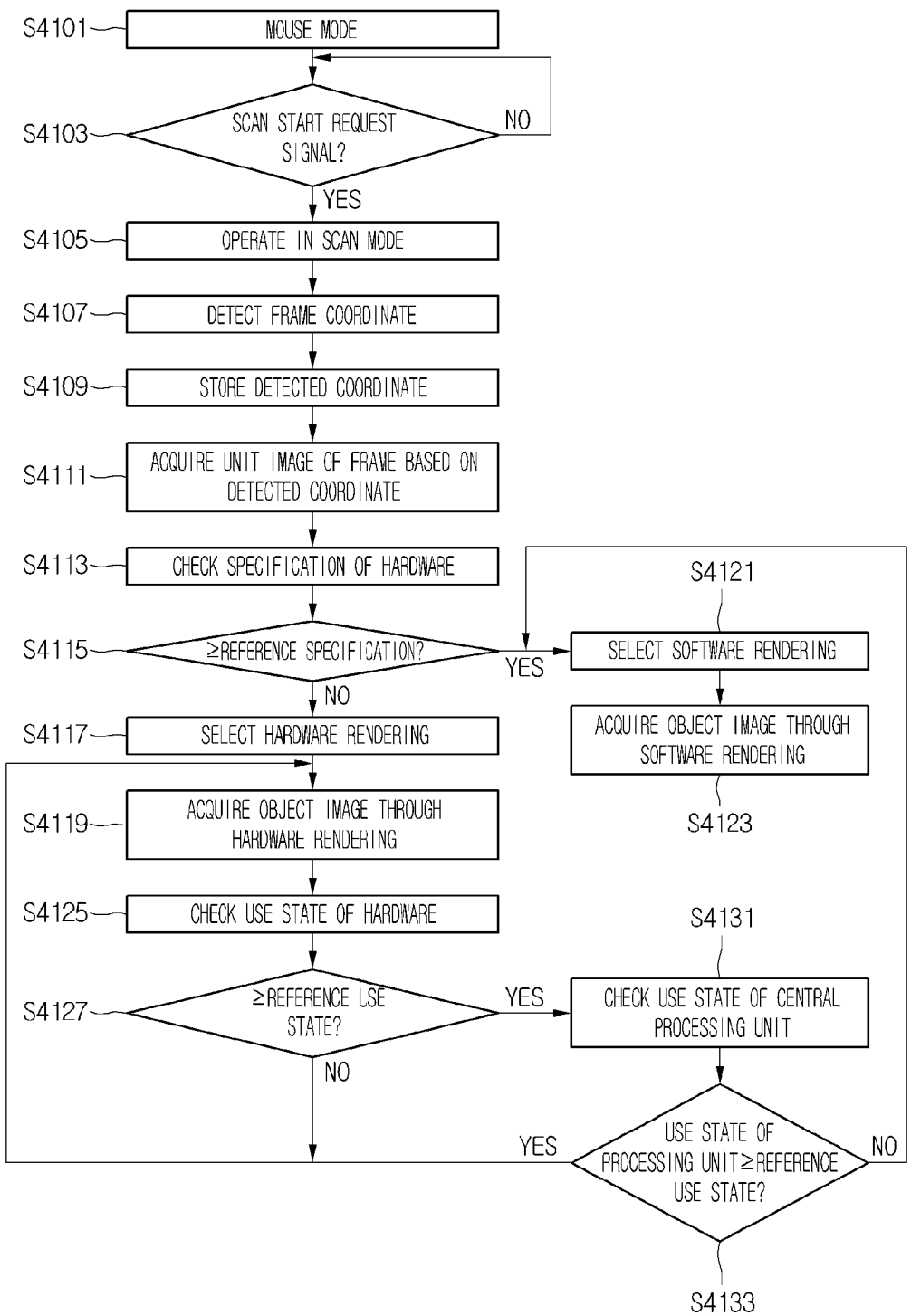
FIG. 42 is a flowchart showing an example method for controlling an input apparatus.

FIG. 40 is a block diagram showing another example input apparatus, FIG. 41 is a block diagram showing a terminal to be connected to another example input apparatus, FIG. 42 is a flowchart showing an example method for controlling an input apparatus, FIG. 43 is a view to explain a reference specification of a graphic processing unit, and FIG. 44 is a view to explain a selection of a rendering scheme based on a use ratio of a graphic processing unit and a use ratio of a central processing unit according to an example method for controlling an input apparatus.

Referring to FIG. 40, the input apparatus 300 may include a function inputting unit 310, a coordinate detecting unit 320, a unit image acquiring unit 330, a storage unit 340, a specification confirming unit 350, a rendering selecting unit 360, an object image acquiring unit 370, a use state confirming unit 380, a communication interface unit 390 and a control unit 391.

The function inputting unit 310 may include a scanner function selecting button, a wheel button, and left and right buttons located to the left and right about the wheel button.

If the user presses the scanner function selecting button, the input apparatus 300 generates the scan start request signal to enter the scan mode and an edition request signal to convert the scan mode into the edition mode.

The wheel button and the left/right buttons may generate the signals corresponding to the functions allocated for the scan mode and the edition mode, respectively.

The function inputting unit 310 may correspond to the function inputting unit 240 shown in FIGS. 1 and 2.

The coordinate detecting unit 320 may detect the coordinates of the frame, which is the unit image of the scan target object, according to the movement of the input apparatus 300. According to one embodiment, the coordinate detecting unit 320 may include the laser sensor, but the disclosure is not limited thereto.

The unit image acquiring unit 330 can acquire the unit image of the scan target object corresponding to the frame based on the detected coordinates.

The storage unit 340 may store the coordinates of the frame detected by the coordinate detecting unit 320 and the unit images of the scan target object corresponding to the coordinates of the frame.

The specification confirming unit 350 can confirm the specification of a terminal 400 connected to the input apparatus 300. In detail, the specification confirming unit 350 can confirm the specification of a graphic processing unit 440 included in the terminal 400.

The specification confirming unit 350 can confirm the version of the application program interface of the terminal 400 as well as the specification of the graphic processing unit 440.

The rendering selecting unit 360 may select the hardware rendering or the software rending according to the specification of the terminal 400 confirmed by the specification confirming unit 350.

The rendering selecting unit 360 may select the hardware rendering or the software rending according to the use state of the graphic processing unit 440 and the use state of a central processing unit 450 confirmed by the use state confirming unit 380, which will be described later in detail.

The object image acquiring unit 370 merges the unit images of the scan target object according to the rendering scheme selected by the rendering selecting unit 360 to obtain the completed image of the scan target object.

The use state confirming unit 380 can confirm the use states of the graphic processing unit 440 and the central processing unit 450 of the terminal 400, which will be described later in detail.

The communication interface unit 390 can transmit various input signals, images and sound signals collected in the input apparatus 300 to a communication interface unit 430 through wired/wireless communication.

The control unit 391 may control general operations of the input apparatus 300. The operation of the control unit 391 will be described later in detail.

Referring to FIG. 41, the terminal 400 may include a display unit 410, a scan UI generating unit 420, the communication interface unit 430, the graphic processing unit 440, the central processing unit 450 and a control unit 460.

According to one embodiment, the terminal 400 may be a computer, a digital TV, or a portable terminal, but the disclosure is not limited thereto.

The display unit 410 may convert various image signals, data signals, onscreen display (OSD) signals, and the like into R, G, and B signals, respectively to generate driving signals. To this end, the display unit 410 may adopt a plasma display panel (PDP), a liquid crystal display (LCD), an organic light emitting diode display (OLED), a flexible display, a three-dimensional (3D) display, and the like or is constituted by a touch screen to be used as an input apparatus in addition to an output apparatus.

The scan UI generating unit 420 generates a scan UI window and an edition UI window for displaying an implementation state of the scan driver program on a screen. The generated scan UI window and the edition UI window are displayed on the screen through the display unit 410 and a user controls the scan operation of the input apparatus 300 through the scan UI window. Further, various scan control commands are generated by operating various function setting buttons provided on the scan UI window. In addition, various edition control commands are generated by operating various function setting buttons provided on the edition UI window.

The communication interface unit 430 performs wired/wireless communication with external apparatuses to receive various input signals and image, sound, or data signals from the external apparatuses.

When the communication interface unit 430 performs wired communication with the external apparatuses, the communication interface unit 430 may be constituted by a serial, a PS/2, a USB, and the like and when the communication interface unit 430 performs wireless communication with the external apparatuses, the communication interface unit 150 may be constituted by radio frequency identification (RFID), infrared data association (IrDA), ultra wideband (UWB), zig-bee, digital living network alliance (DLNA), and the like The graphic processing unit 440 processes the image signals received from the input apparatus 300 to display the image of the scan target object on the display unit 410.

The graphic processing unit 440 may include a graphic control unit 441 to control general operations of the graphic processing unit 440 and a graphic memory 443 for storing the image signals received from the input apparatus 300.

The central processing unit 450 can process the operation of application programs to be executed in the terminal 400.

The control unit 460 may control general operations of the terminal 400. For example, the control unit 460 may control the communication interface unit 430 to receive various input signals input from the outside and to receive various data transmitted from the outside and may process the received input signals and received data to display the processed signals and data on the display unit 410. The detailed operation of the control unit 460 will be described later.

Hereinafter, a method of processing an image by using the input apparatus according to one embodiment will be described with reference to FIGS. 42 to 44.

The input apparatus 300 can make wired/wireless communication with the terminal 400 and the terminal 400 may include all configurations of the display apparatus 100 described with reference to FIG. 1.

First, the input apparatus 300 operates in the mouse mode (S4101).

After that, the function inputting unit 310 of the input apparatus 300 receives the scan start request signal (S4103).

Thus, the input apparatus 300 operates in the scan mode (S4105). That is, the input apparatus 300 may be placed in a state capable of scanning the scan target object.

The coordinate detecting unit 320 of the input apparatus 300 detects the coordinates of the frame, which is the unit image of the scan target object, according to the movement of the input apparatus 300 (S4107).

The storage unit 340 of the input apparatus 300 stores the detected coordinates (S4109).

The unit image acquiring unit 330 of the input apparatus 300 acquires the unit image of the scan target object corresponding to the frame based on the detected coordinates (S4111). As the input apparatus 300 scans the scan target object, the unit image acquiring unit 330 of the input apparatus 300 can acquire unit images corresponding to a plurality of frames.

After that, the specification confirming unit 350 of the input apparatus 300 confirms the specification of the terminal 400 (S4113). In detail, the specification confirming unit 350 can confirm the specification of the graphic processing unit 440 of the terminal 400 connected to the input apparatus 300. The graphic processing unit 440 converts the image data received from the input apparatus 300 into the image signals to display the images corresponding to the scan target object on the display unit 410 of the terminal. The graphic processing unit 440 may signify a graphic card.

According to one embodiment, the specification confirming unit 350 can confirm the version of the application program interface of the terminal 400 as well as the specification of the graphic processing unit 440. The application program interface may signify an Open GL (Open Graphics Library), which is a standard application program interface of 2-D or 3-D graphics.

Then, the control unit 391 of the input apparatus 300 checks whether the confirmed specification of the terminal 400 is identical to the reference specification (S4115). According to the reference specification as shown in FIG. 43, the graphic processing unit 440 must have a memory of 384 M or more when the graphic processing unit 440 of the terminal 400 is an embedded type, or must have a memory of 128 M or more when the graphic processing unit 440 of the terminal 400 is an external type, but this is illustrative purpose only. In addition, according to the reference specification, the Open GL of the terminal 400 must have a version of 1.4 or more, but this is illustrative purpose only.

If the confirmed specification of the terminal 400 satisfies the reference specification, the rendering selecting unit 360 selects the hardware rendering (S4117). The rendering may signify the procedure for producing the 2-D image by processing the unit images corresponding to a plurality of frames in consideration of predetermined modeling, motion, camera, texture mapping and lighting.

The rendering may be classified into radiosity, raytracing, scanline and phong depending on the mathematical algorithm employed thereto, and the final image may vary depending on the rendering scheme even if the final image is based on the same scene. The input apparatus 300 according to another embodiment may adopt all of the above rendering schemes.

The radiosity rendering is a scheme of making results most strongly representing reproduction characteristics of a photograph among rendering schemes. According to the radiosity rendering, the surface of a scan target object serves as a temporary light source, and the quantity of light reflected or refracted from the surface of the scan target object is computed according to the geometric characteristics of the surface.

The raytracing rendering is a scheme of computing the actual operation of a beam between a light source and reaching the eyes of a user.

The scanline rendering is a scheme of employing scanlines produced from the top to the bottom of an image. If the scanline rendering is used, a final image can be rapidly acquired.

The phong rendering is a scheme of acquiring a final image by individually computing the color of each pixel of the scan target object.

In addition, the rendering schemes may be classified into the software rendering scheme and the hardware rendering scheme according to the use state of software or hardware.

According to the hardware rendering scheme, unit images corresponding to a plurality of frames acquired by the input apparatus 300 are merged with each other by using a memory of the graphic processing unit 440, so that one final image is acquired. In a multi-tasking work, the performance of the terminal 400 can be effectively improved.

According to the software rendering scheme, the unit images corresponding to the frames are merged with each other through only the CPU 450 without the assistance of the graphic processing unit 440, so that one final image is acquired.

If the specifications of the confirmed terminal 400 satisfy the reference specifications, the rendering selecting unit 360 may select the hardware rendering scheme.

Thereafter, the object image acquiring unit 370 of the input apparatus 300 merges the unit images corresponding to the acquired frames through the hardware rendering scheme to acquire an image of a scan target object (S4119).

If the specifications of the confirmed terminal 400 are inferior to the reference specifications, the rendering selecting unit 360 of the input apparatus 300 may select the software rendering scheme (S4121).

After that, the object image acquiring unit 370 of the input apparatus 300 merges the unit images corresponding to the acquired frames through the software rendering scheme to acquire the image of the scan target object (S4123).

As described above, according to the control method of the input apparatus 300 of still another embodiment, the hardware rendering scheme or the software rendering scheme may be selected according to the reference specifications of the graphic processing unit 440 included in the terminal 400 connected with the input apparatus 300 and the Open GL version of the graphic processing unit 440.

Accordingly, when the graphic processing unit 440 of the terminal 400 cannot process images, or has the performance insufficient to process images, the image of the scan target object can be stably acquired through the software rendering scheme instead of the hardware rendering scheme. In other words, the hardware rendering scheme or the software rendering scheme is selected according to the reference specifications of the graphic processing unit 440 included in the terminal 400 connected with the input apparatus 300 and the Open GL version of the graphic processing unit 440, so that the color quality of the image of the scan target object can be prevented from being degraded, an image merge processing rate can be increased, and the scan range can be increased regardless of the capacity of the graphic memory 443 included in the graphic processing unit 440.

Referring again to FIG. 42, the use state confirming unit 380 of the input apparatus 300 confirms the use state of the graphic processing unit 440 of the terminal 400 (S4125). The graphic processing unit 440 may include a graphic control unit 441 and a graphic memory 443, and the use state of the graphic processing unit 440 may include the current use ratio of the graphic control unit 441 and the current use ratio of the graphic memory 443. According one the embodiment, the current use ratio of the graphic memory 443 may refer to the current use capacity of the graphic memory 443 (or the currently remaining capacity of the graphic memory 443.

According to one embodiment, the use state confirming unit 380 may confirm the use state of the graphic processing unit 440 in real time, or the use state of the graphic processing unit 440 at a predetermined period of time.

Thereafter, the control unit 391 of the input apparatus 300 determines if the confirmed use state of the graphic processing unit 440 exceeds the reference use state (S4127). According to one embodiment, the reference use state of the graphic processing unit 440 may refer to 40% of the current use ratio of the graphic control unit 441 and 50% of the current use ratio of the graphic memory 44, but this is illustrative purpose only. According to settings, the reference use state of the graphic processing unit 440 may refer to only one of 40% of the current use ratio of the graphic control unit 441 and 50% of the current use ratio of the graphic memory 443.

If the confirmed use state of the graphic processing unit 440 does not exceed the reference use state, the input apparatus 300 is maintained at step S4119 to acquire the image of the scan target object through the hardware rendering scheme. In detail, referring to FIG. 44, if the current use ratio of the graphic control unit 441 is 20%, and the current use state of the graphic memory 443 is 30%, the input apparatus 300 determines that the use state of the graphic processing unit 440 does not exceed the reference use state, so that the image of the scan target object can be acquired through the hardware rendering scheme.

In other words, when processing the image of the scan target object, the input apparatus 300 determines that the image of the scan target object can be sufficiently processed through only the graphic processing unit 440, so that the input apparatus 300 can acquire the image of the scan target object through the hardware rendering scheme.

Referring again to FIG. 42, if the confirmed use state of the graphic processing unit 440 exceeds the reference use state, the use state confirming unit 380 confirms the use state of the CPU 450 of the terminal 400 (S4131). In detail, referring to FIG. 44, if the use ratio of the graphic control unit 441 is 50%, and if the use ratio of the graphic memory 443 is 60%, the input apparatus 300 can determine the use state of the graphic processing unit 440 as exceeding the reference use state, and the use state confirming unit 380 can confirm the current use ratio of the CPU 450.

According to one embodiment, the use state confirming unit 380 may confirm the use state of the CPU 450 of the terminal 400 in real time or may confirm the use state of the CPU 450 at a predetermined period of time.

Referring to FIG. 42, the control unit 391 of the input apparatus 300 determines if a use ratio of the CPU 450 is equal to or greater than a reference use ratio, based on the confirmed use state of the CPU 450 (S4133).

If a current use ratio of the CPU 450 is equal to or greater than the reference use ratio, the input apparatus 300 is maintained at step S4119 to acquire the image of the scan target object through the hardware rendering scheme. According to one embodiment, the reference use ratio of the CUP 450 may be 70%, which is provided for the illustrative purpose.

In detail, referring to FIG. 44, if the current use ratio of the graphic control unit 441 is 50%, the use ratio of the graphic memory 443 is 60%, and the current use ratio of the CPU 450 is 80% which is equal to or greater than the reference use ratio, the input apparatus 300 can acquire the image of the scan target object through the hardware rendering scheme. In other words, even if the current use state of the graphic processing unit 440 exceeds the reference use state, when the use state of the CPU 450 exceeds the reference use state, the input apparatus 300 uses the hardware rendering scheme to prevent the CPU 450 from being overloaded.

Referring to FIG. 41, if the current use ratio of the CPU 450 is less than the reference use ratio, the input apparatus 300 selects the software rendering scheme (S4121) and then acquires the image of the scan target object through the software rendering scheme (S4123). In detail, referring to FIG. 44, if the current use ratio of the graphic control unit 441 is 50%, the current use ratio of the graphic memory 443 is 60%, and the current use ratio of the CPU 450 is 30%, the input apparatus 300 acquires the image of the scan target object through the software rendering scheme. In other words, even if the specifications of the graphic processing unit 440 satisfy the reference specifications, when the use state of the graphic processing unit 440 exceeds the reference use state, the input apparatus 300 may confirm the use ratio of the CPU 450 and acquire the image of the scan target object through the software rendering scheme. Accordingly, the computing rate of the image processing can be improved, and the scan range depending on the capacity of the graphic processing unit 440 can be improved The methods for displaying a scan image may be prepared as a program for executing the method in the computer to be stored in the computer-readable recording medium and examples of the computer-readable recording medium include a ROM, a RAM, a CD-ROM, a magnetic tape, a floppy disk, an optical data storage, and the like and in addition, include a type of a carrier wave (e.g., transmission through the Internet).

The computer-readable recording media are distributed on computer systems connected through the network, and thus the computer-readable recording media may be stored and executed as the computer-readable code by a distribution scheme. In addition, functional programs, codes, and code segments for implementing the method can be easily deduced by programmer skilled in the art.

Further, as described above, although various examples have been illustrated and described, the present disclosure is not limited to the above-mentioned examples and various modifications can be made by those skilled in the art without departing from the scope of the appended claims. In addition, these modified examples should not be appreciated separately from technical spirits or prospects.

What is claimed is:

1. An input apparatus, comprising:
a function input unit configured to receive a request for scanning;
a scanning unit configured to acquire a scan image of a target object through a scan area according to the request for scanning;
a position detecting unit configured to obtain information on a position of the scan image,
wherein the position detecting unit includes a laser sensor and a gyro sensor, and
wherein each of the laser sensor and the gyro sensor detects the information on the position of the scan image;
a communication interface unit configured to transmit the scan image and the information on the position of the scan image to a display device; and
a control unit configured to:
compare position information of a latest scan image detected by the laser sensor with position information of a previous scan image detected by the laser sensor, which is detected just before the latest scan image, to obtain a comparison result,
determine, based on the comparison result, whether the position information of the latest scan image is within an allowable range,
wherein the allowable range represents a position range required for the input apparatus to normally acquire the scan image,
determine position information detected by the gyro sensor as the position information of the scan image when the position information of the latest scan image is determined not to be within the allowable range, and
determine position information detected by the laser sensor as the position information of the scan image when the position information of the latest scan image is determined to be within the allowable range.

2. The input apparatus of claim 1, further comprising:
a specification confirming unit configured to confirm a specification of a terminal making communication with the input apparatus; and
a rendering selecting unit configured to select one of a hardware rendering and a software rendering according to the confirmed specification,
wherein the scanning unit acquires the scan image of the target object by merging a plurality of acquired scan images according to the selected rendering.

3. The input apparatus of claim 2, wherein the specification confirming unit confirms a specification of a graphic processing unit included in the terminal and the rendering selecting unit selects the hardware rendering when the specification of the graphic processing unit satisfies a reference specification and selects the software rendering when the specification of the graphic processing unit is lower than the reference specification.

4. The input apparatus of claim 2, further comprising:
a use state confirming unit configured to confirm use states of a graphic processing unit and a central processing unit included in the terminal, wherein the rendering selecting unit selects one of the hardware rendering and the software rendering according to the use states of the graphic processing unit and the central processing unit.

5. The input apparatus of claim 4, wherein the rendering selecting unit selects the software rendering when the use state of the graphic processing unit is higher than a reference use state and the use state of the central processing unit is less than the reference use state.

6. The input apparatus of claim 4, wherein the rendering selecting unit selects the hardware rendering when the use state of the graphic processing unit is higher than a reference use state and the use state of the central processing unit is higher than the reference use state.

7. The input apparatus of claim 1, further comprising:
a velocity measuring unit configured to measure a movement velocity of the input apparatus; and
a frame rate determining unit configured to determine a frame rate of the input apparatus according to the measured movement velocity.

8. The input apparatus of claim 7, further comprising:
a storage unit configured to store the measured movement velocity in correspondence with the frame rate of the input apparatus,
wherein the frame rate determining unit determines the frame rate by searching for the frame rate corresponding to the measured movement velocity from the storage unit.

9. The input apparatus of claim 8, wherein, when the measured movement velocity is equal to or higher than a predetermined maximum velocity, the frame rate determining unit determines the frame rate corresponding to the predetermined maximum velocity as the frame rate of the input apparatus.

10. The input apparatus of claim 8, wherein, when the measured movement velocity is equal to or lower than a predetermined minimum velocity, the frame rate determining unit determines the frame rate corresponding to the predetermined minimum velocity as the frame rate of the input apparatus.

11. The input apparatus of claim 7, further comprising:
a resolution measuring unit configured to measure a resolution of a scan image based on the acquired position information of the scan image.

12. The input apparatus of claim 11, wherein the frame rate determining unit adjusts the frame rate of the input apparatus according to the measured resolution.

13. The input apparatus of claim 12, wherein the frame rate determining unit holds the frame rate of the input apparatus to a current frame rate when the measured resolution is identical to a reference resolution.

14. The input apparatus of claim 12, wherein the frame rate determining unit reduces the frame rate of the input apparatus to a half of a current frame rate when the measured resolution is higher than a reference resolution.

15. A method of controlling an input apparatus having a laser sensor and a gyro sensor to perform a scan function, the method comprising:
receiving a request for scanning;
acquiring a scan image of a target object through a scan area according to the request for scanning;
obtaining information on a position of the scan image using the laser sensor and the gyro sensor of the input apparatus,
wherein each of the laser sensor and the gyro sensor detects the information on the position of the scan image;
transmitting the scan image and the information on the position of the scan image to a display device;
compare position information of a latest scan image detected by the laser sensor with position information of a previous scan image detected by the laser sensor, which is detected just before the latest scan image, to obtain a comparison result,
determining, based on the comparison result, whether the position information of the latest scan image is within an allowable range,
wherein the allowable range represents a position range required for the input apparatus to normally acquire the scan image;
determining position information detected by the gyro sensor as the position information of the scan image when the position information of the latest scan image is determined not to be within the allowable range; and
determining position information detected by the laser sensor as the position information of the scan image when the position information of the latest scan image is determined to be within the allowable range.

16. The method of claim 15, further comprising:
confirming a specification of a terminal making communication with the input apparatus; and
selecting one of a hardware rendering and a software rendering according to the confirmed specification,
wherein the scan image of the target object is acquired by merging a plurality of acquired scan images according to the selected rendering.

17. The method of claim 15, further comprising:
storing a movement velocity of the input apparatus in correspondence with a frame rate of the input apparatus;
measuring the movement velocity of the input apparatus; and
adjusting the frame rate of the input apparatus corresponding to the measured movement velocity.

* * * * *